US012491492B1

(12) United States Patent
Alneyadi et al.

(10) Patent No.: US 12,491,492 B1
(45) Date of Patent: Dec. 9, 2025

(54) PHOTOCATALYTIC DEGRADATION AND REMOVAL OF IMIDACLOPRID INSECTICIDE USING HYDROPHILIC MAGNETIC COVALENT ORGANIC FRAMEWORKS (COFs)

(71) Applicant: United Arab Emirates University, Al Ain (AE)

(72) Inventors: Shaikha Saif Alneyadi, Al Ain (AE); Mohammed Taleb Khamis Saif Alhassani, Al Ain (AE); Sultan Ali Jama, Al Ain (AE); Ali Saeed Saif Aleissaee, Al Ain (AE); Muneb Redwan Mukhtar, Al Ain (AE); Ibrahim Abdulrahim Ibrahim Almujaini, Al Ain (AE); Hamad Khalifa Mukhtar Ahmed Alblooshi, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 18/904,871

(22) Filed: Oct. 2, 2024

(51) Int. Cl.
*B01J 20/22* (2006.01)
*B01J 20/28* (2006.01)
(Continued)

(52) U.S. Cl.
CPC ....... *B01J 20/226* (2013.01); *B01J 20/28007* (2013.01); *B01J 20/28009* (2013.01);
(Continued)

(58) Field of Classification Search
CPC ............... B01J 20/226; B01J 20/28007; B01J 20/28009; B01J 20/28064; B01J 20/3236;
(Continued)

(56) References Cited

U.S. PATENT DOCUMENTS

2016/0243523 A1* 8/2016 Saini .................. B01J 20/28007
2019/0127252 A1* 5/2019 Lu .............................. C02F 1/48
(Continued)

OTHER PUBLICATIONS

Liu, S., Multifunctional covalent organic frameworks for photocatalytic oxidative hydroxylation of arylboronic acids and fluorescence sensing for Cu2+, Microporous and Mesoporous Materials 333 (2022) 111737 (Year: 2022).*

(Continued)

*Primary Examiner* — Chester T Barry
(74) *Attorney, Agent, or Firm* — MH2 Technology Law Group, LLP

(57) ABSTRACT

There is disclosed magnetic covalent organic frameworks (COFs) functionalized with $Fe_3O_4$ nanoparticles ($Fe_3O_4$@HMN-COF, $Fe_3O_4$@MAN-COF, and $Fe_3O_4$@SIN-COF) for the efficient removal and degradation of imidacloprid (IMI) from aqueous solutions. These COFs, incorporating nitrogen-rich frameworks and π-electron systems, enhance IMI adsorption through π-π interactions, hydrophobic interactions, and hydrogen bonding. The magnetic properties provided by $Fe_3O_4$ nanoparticles allow rapid separation from water using an external magnetic field. The COFs exhibit high surface areas, with BET surface areas reaching up to 910 $m^2/g$, and high adsorption capacities, up to 600 mg/g. The COFs also exhibit excellent stability, high surface area, and reusability, with minimal loss in performance over multiple cycles. Photocatalytic degradation of IMI is optimized under UV light, with $Fe_3O_4$@HMN-COF achieving 98.5% degradation efficiency under specific conditions. These magnetic COFs present a sustainable solution for remediating pesticide-contaminated water, demonstrating effectiveness in various real-world applications.

14 Claims, 59 Drawing Sheets

(51) Int. Cl.
  *B01J 20/32* (2006.01)
  *B01J 23/745* (2006.01)
  *B01J 31/16* (2006.01)
  *B01J 35/33* (2024.01)
  *B01J 35/39* (2024.01)
  *B01J 35/45* (2024.01)
  *B01J 35/61* (2024.01)
  *B01J 37/02* (2006.01)
  *C02F 1/28* (2023.01)
  *C02F 1/32* (2023.01)
  *C02F 1/72* (2023.01)
  *C02F 101/30* (2006.01)
  *C02F 101/38* (2006.01)

(52) U.S. Cl.
  CPC ..... *B01J 20/28064* (2013.01); *B01J 20/3236* (2013.01); *B01J 23/745* (2013.01); *B01J 31/1691* (2013.01); *B01J 35/33* (2024.01); *B01J 35/39* (2024.01); *B01J 35/45* (2024.01); *B01J 35/617* (2024.01); *B01J 37/0219* (2013.01); *B01J 37/0221* (2013.01); *C02F 1/288* (2013.01); *C02F 1/32* (2013.01); *C02F 1/725* (2013.01); *B01J 2231/005* (2013.01); *B01J 2531/002* (2013.01); *C02F 1/281* (2013.01); *C02F 1/285* (2013.01); *C02F 2101/306* (2013.01); *C02F 2101/38* (2013.01); *C02F 2305/08* (2013.01); *C02F 2305/10* (2013.01)

(58) Field of Classification Search
  CPC ...... B01J 23/745; B01J 31/1691; B01J 35/33; B01J 35/39; B01J 35/45; B01J 35/617; B01J 37/0219; B01J 37/0221; C02F 1/288; C02F 1/32; C02F 1/725
  See application file for complete search history.

(56) References Cited

U.S. PATENT DOCUMENTS

2021/0016245 A1* 1/2021 Pahwa ............... B01J 20/28045
2021/0346863 A1* 11/2021 Paranthaman ..... B01J 20/28083
2022/0323935 A1* 10/2022 Fairen-Jimenez ..... B01J 20/262

OTHER PUBLICATIONS

Liang, H., Immunosensing of carbohydrate antigen 19-9 based on covalent organic framework loaded Prussian blue as signal amplification platform, Microchemical Journal 201 (2024) 110567 (Year: 2024).*

Diamantis, S., Two new alkaline earth metal organic frameworks with the diamino derivative of biphenyl-4,40-dicarboxylate as bridging ligand: Structures, fluorescence and quenching by gas phase aldehydes, Polyhedron 153 (2018) 173-180 (Year: 2018).*

Aggarwal, S., Emerging trends in the development and applications of triazine-based covalent organic polymers: a comprehensive review, Dalton Trans., 2024, 53, 11601-11643 (Year: 2024).*

Wang, J., Two zinc coordination polymers constructed by 40-hydroxy-[1,10-biphenyl]-3,5-dicarboxylic acid (H2BDA) and 4-hydroxy-[1,10-biphenyl]-3,30,5,50-tetracarboxylic acid (H3BTA): Synthesis, structures and luminescence identifying properties, Polyhedron 167 (2019) 85-92 (Year: 2019).*

* cited by examiner

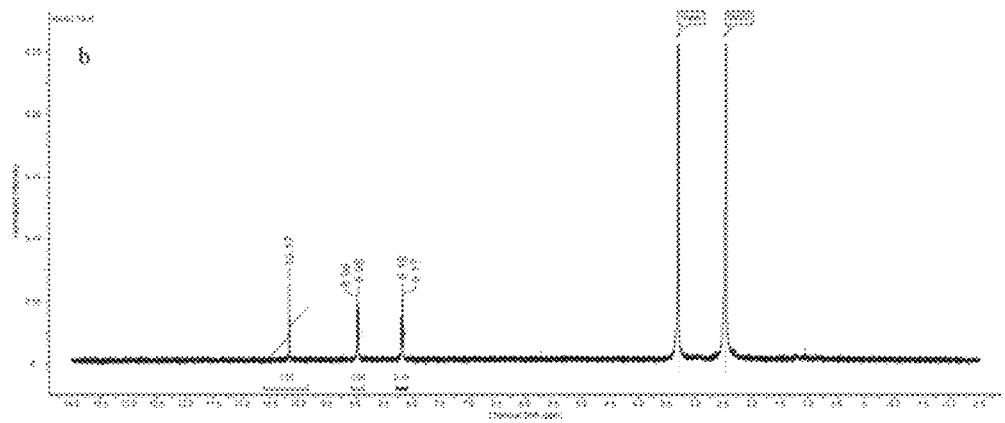
Fig. 2B - $^1$H-NMR spectrum for L1
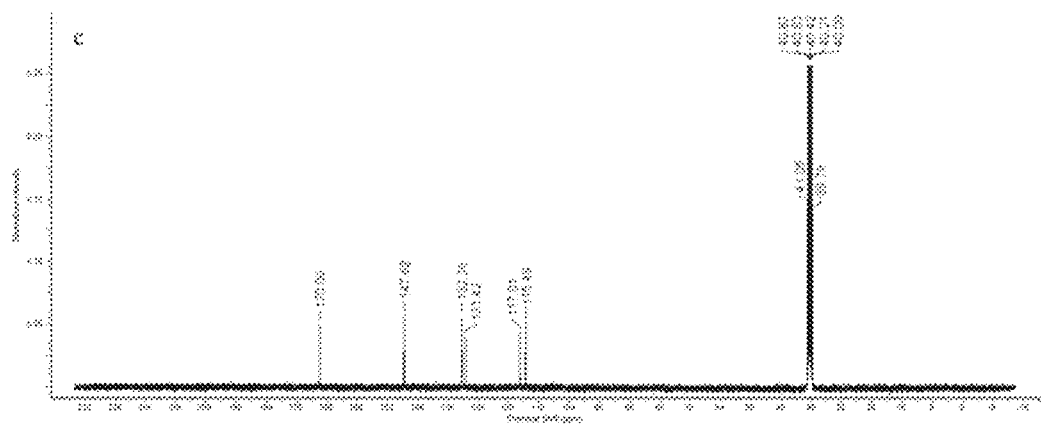
Fig. 2C - $^{13}$C-NMR spectrum for L1

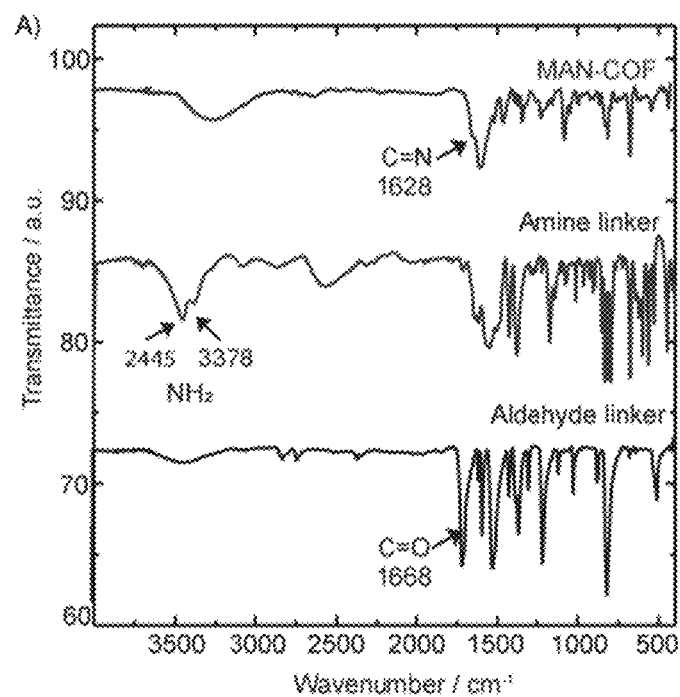
Fig. 7A - FTIR spectra of MAN-COF
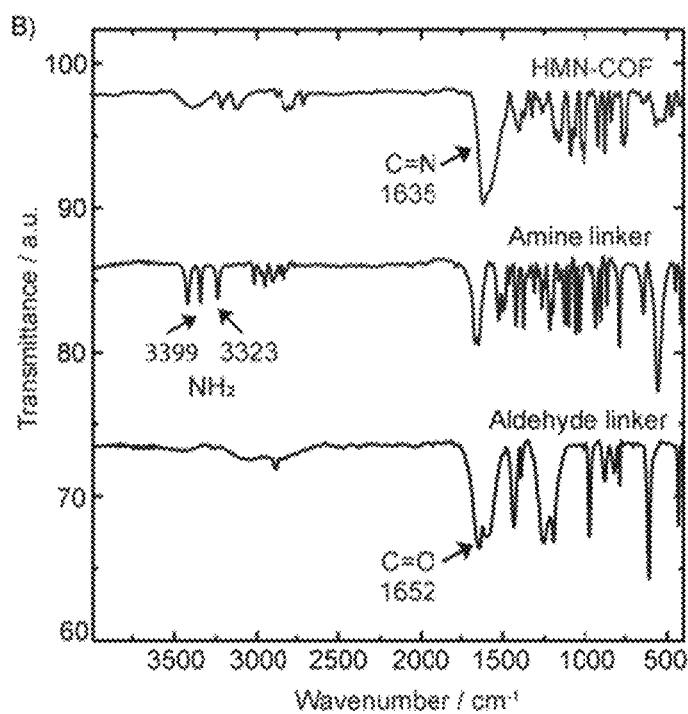
Fig. 7B - FTIR spectra of HMN-COF

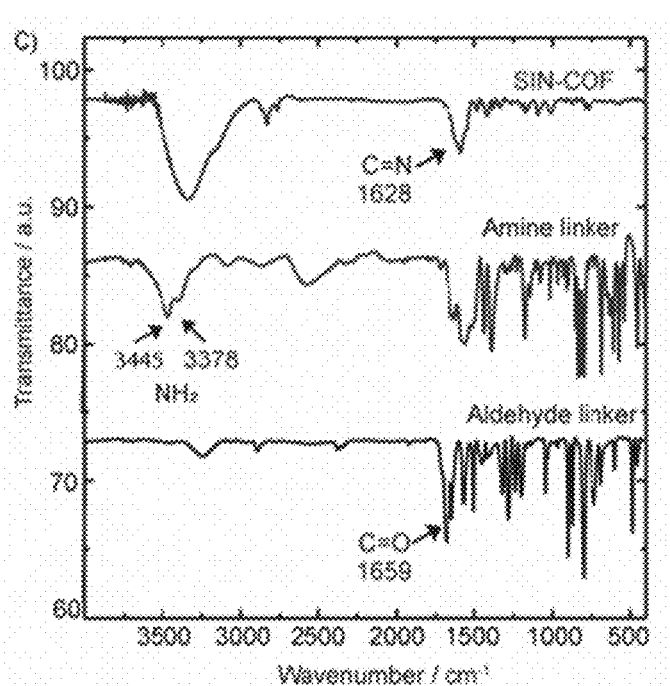
Fig. 7C - FTIR spectra of SIN-COF
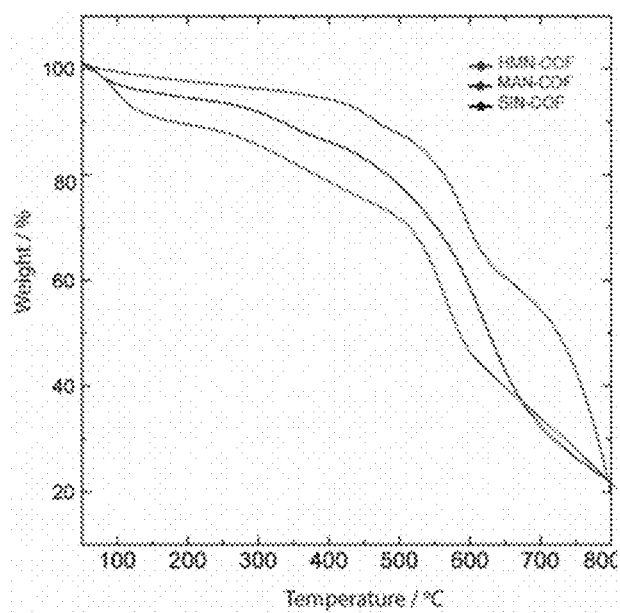
Fig. 8 - TGA curves of HMN-COF, MAN-COF, and SIN-COF

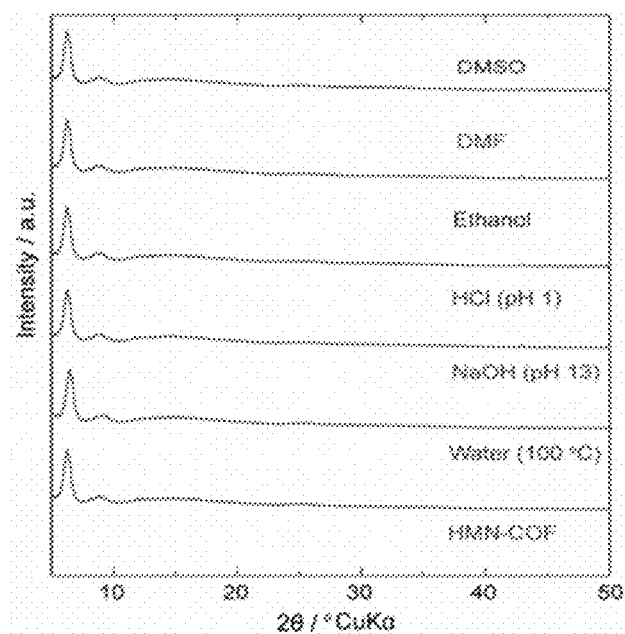
Fig. 9A - XRD patterns of HMN-COF after treatment with various solvents and conditions
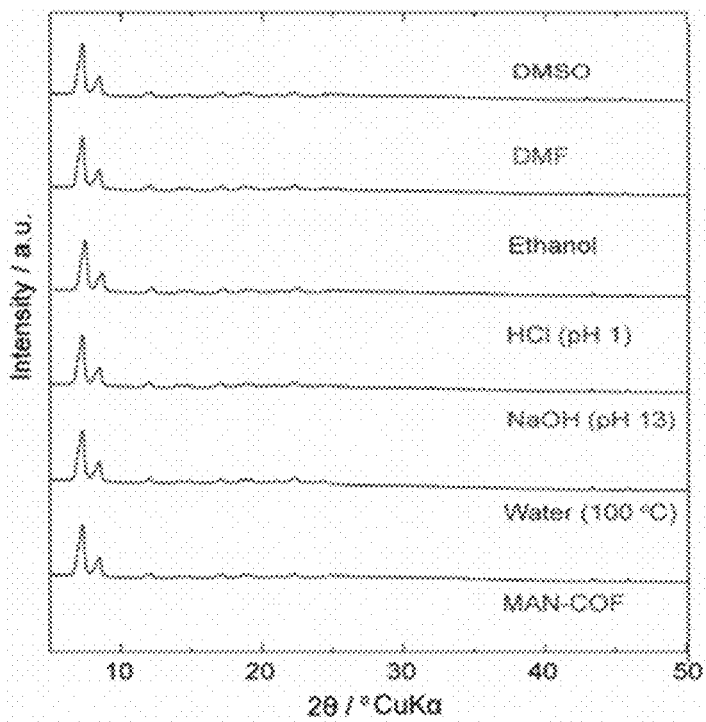
Fig. 9B - XRD patterns of MAN-COF after treatment with various solvents and conditions

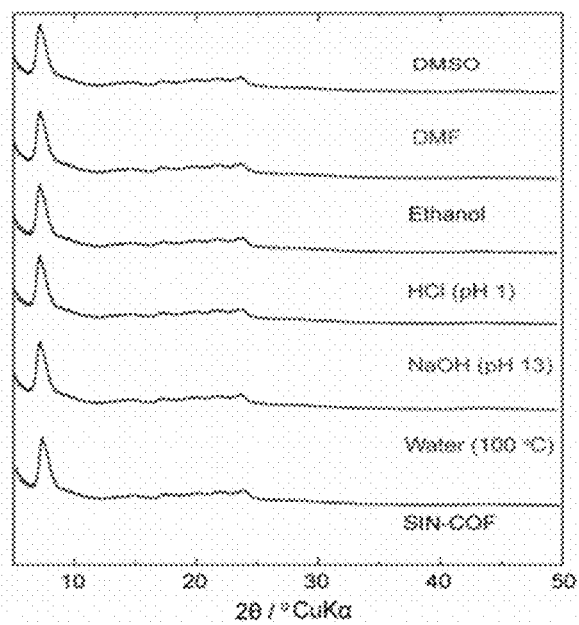
Fig. 9C - XRD patterns of SIN-COF after treatment with various solvents and conditions
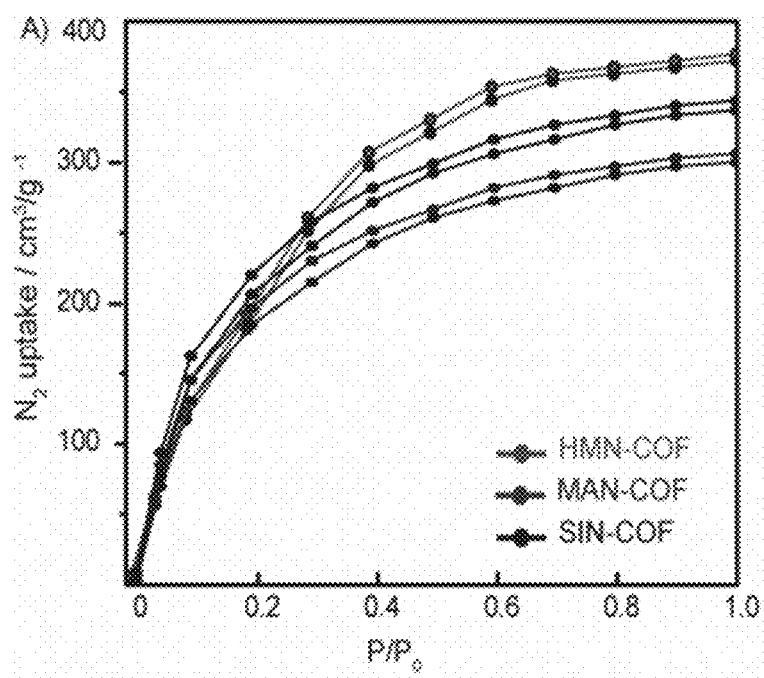
Fig. 10A - Nitrogen adsorption-desorption isotherms for HMN-COF, MAN-COF, and SIN-COF

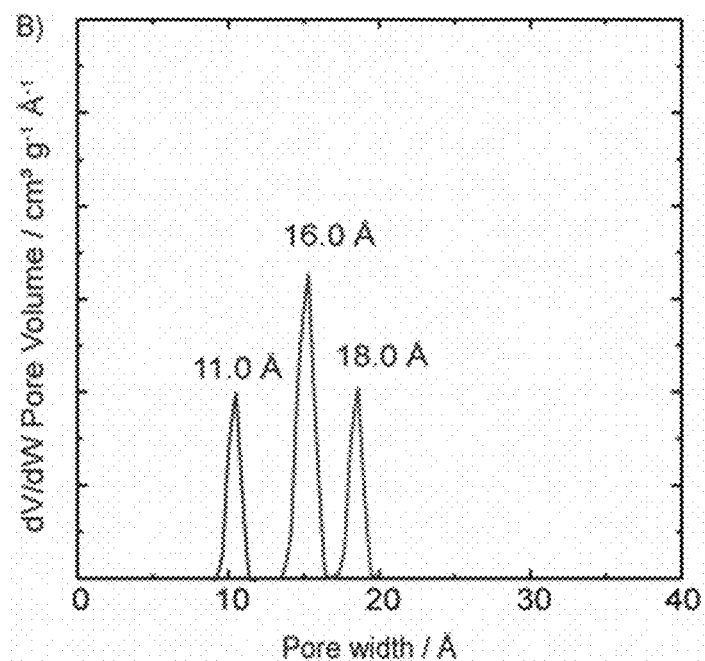
Fig. 10B - Pore size distribution of the COFs, showing distinct pore widths for each framework
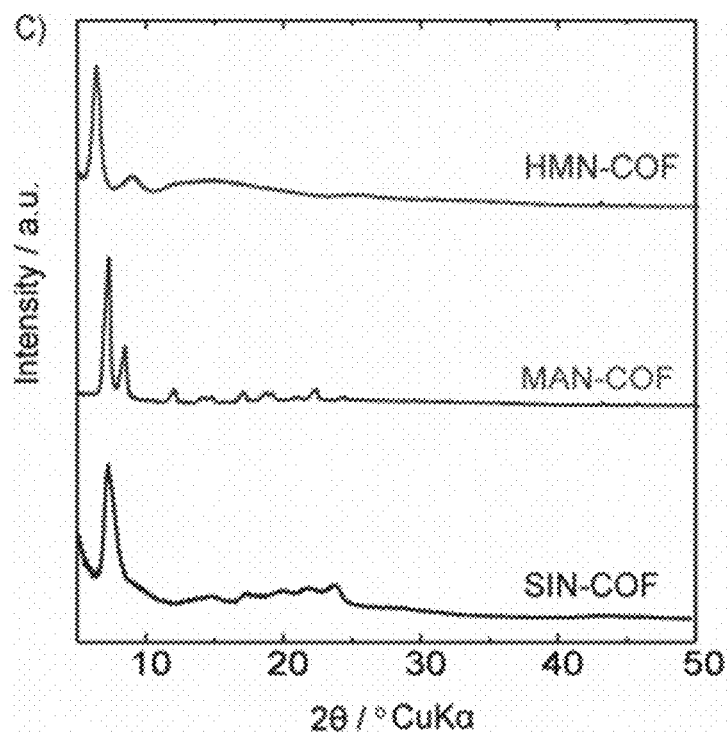
Fig. 10C - XRD patterns of HMN-COF, MAN-COF, and SIN-COF

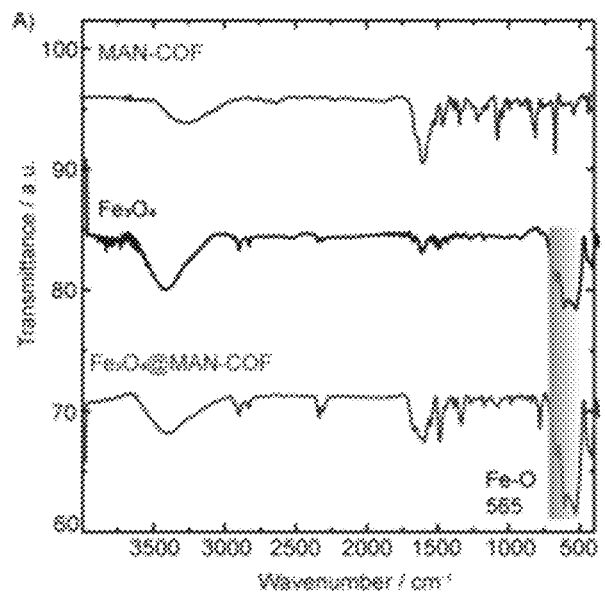
Fig. 11A - FTIR spectra of of MAN-COF, Fe$_3$O$_4$, and Fe$_3$O$_4$@MAN-COF
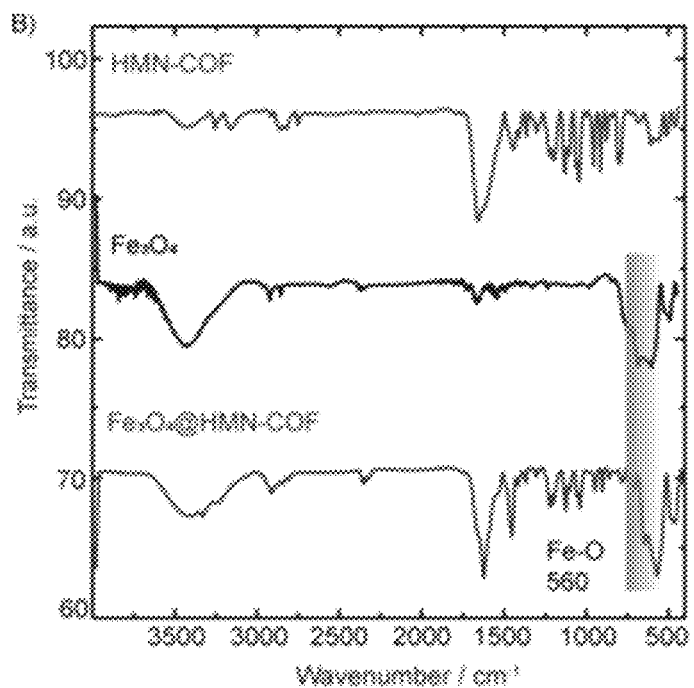
Fig. 11B - FTIR spectra of HMN-COF, Fe$_3$O$_4$, and Fe$_3$O$_4$@HMN-COF

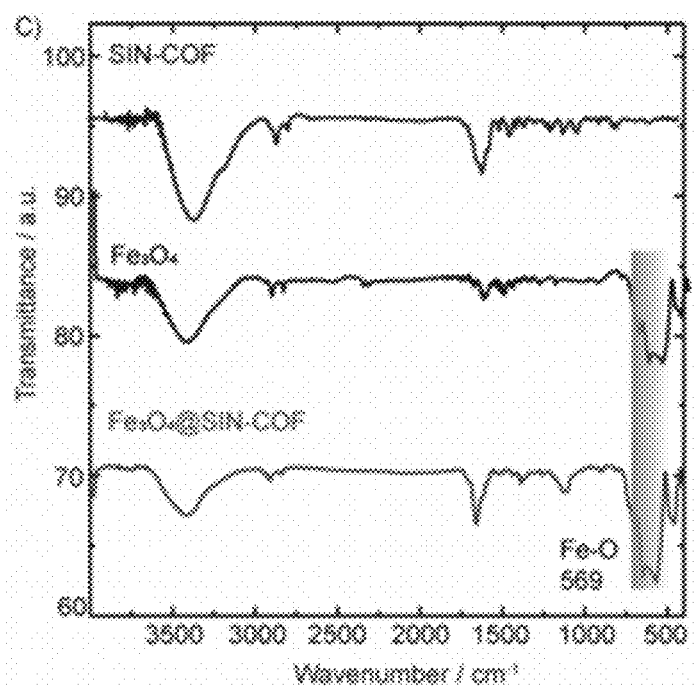
Fig. 11C - FTIR spectra of SIN-COF, $Fe_3O_4$, and $Fe_3O_4$@SIN-COF
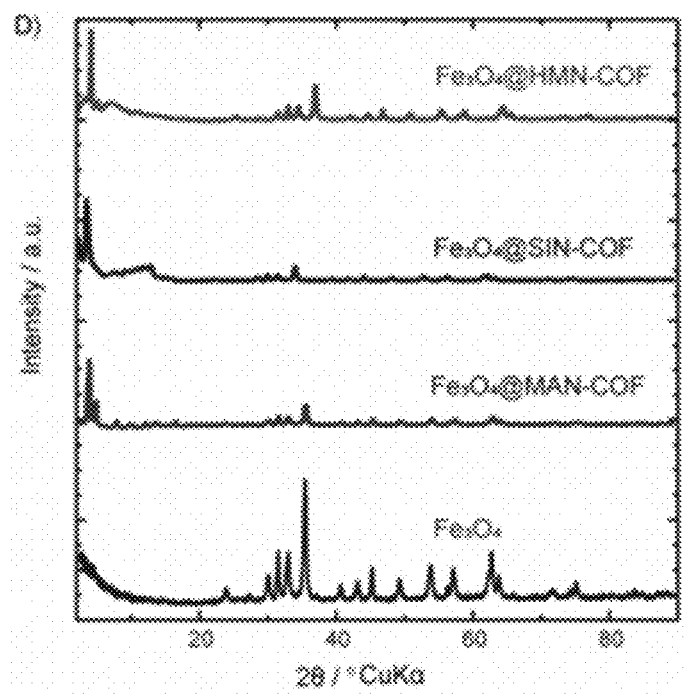
Fig. 11D - XRD patterns of $Fe_3O_4$ and $Fe_3O_4$-functionalized COFs ($Fe_3O_4$@HMN-COF, $Fe_3O_4$@MAN-COF, and $Fe_3O_4$@SIN-COF)

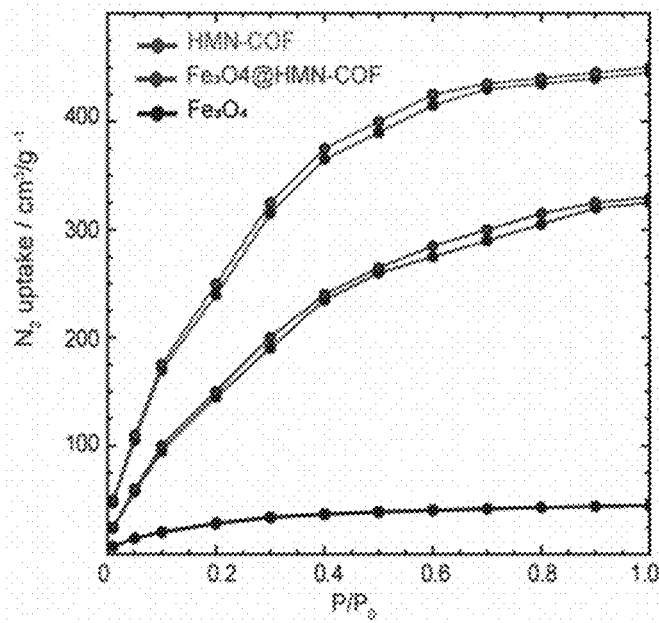
Fig. 12A - Nitrogen adsorption-desorption isotherms for HMN-COF and its respective $Fe_3O_4$-functionalized counterpart ($Fe_3O_4$@HMN-COF), compared to $Fe_3O_4$
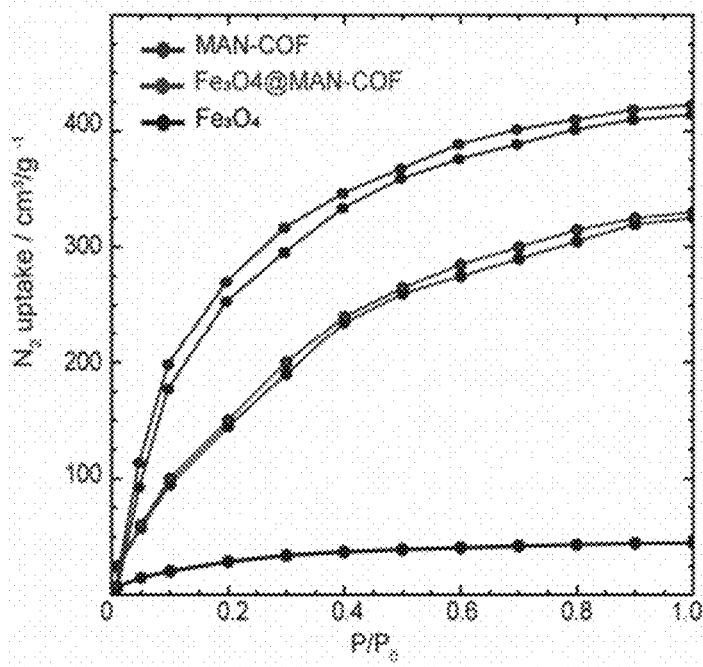
Fig. 12B - Nitrogen adsorption-desorption isotherms for MAN-COF and its respective $Fe_3O_4$-functionalized counterpart ($Fe_3O_4$@MAN-COF), compared to $Fe_3O_4$

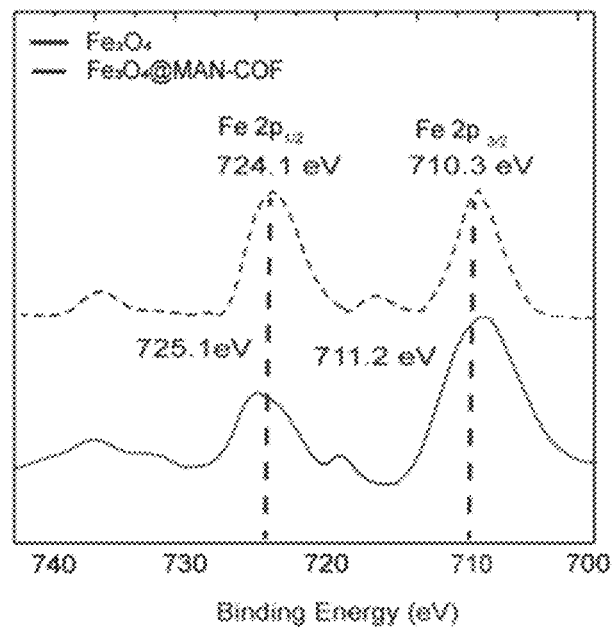
Fig. 14A - XPS spectra of Fe 2p for Fe$_3$O$_4$@MAN-COF
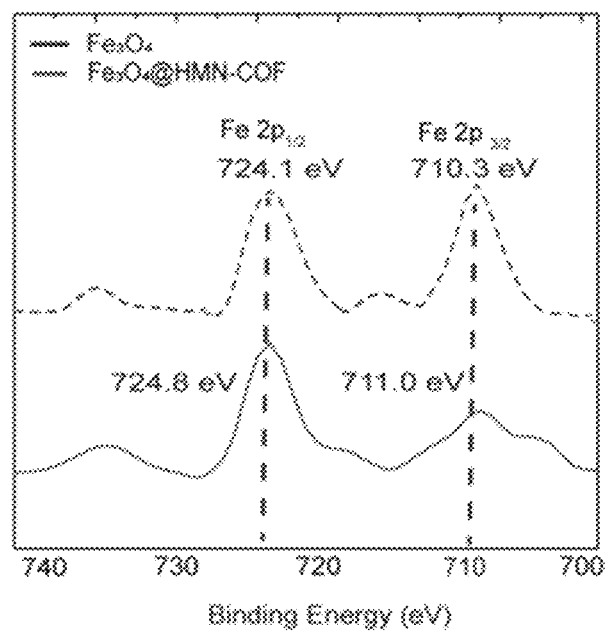
Fig. 14B - XPS spectra of Fe 2p for Fe$_3$O$_4$@HMN-COF

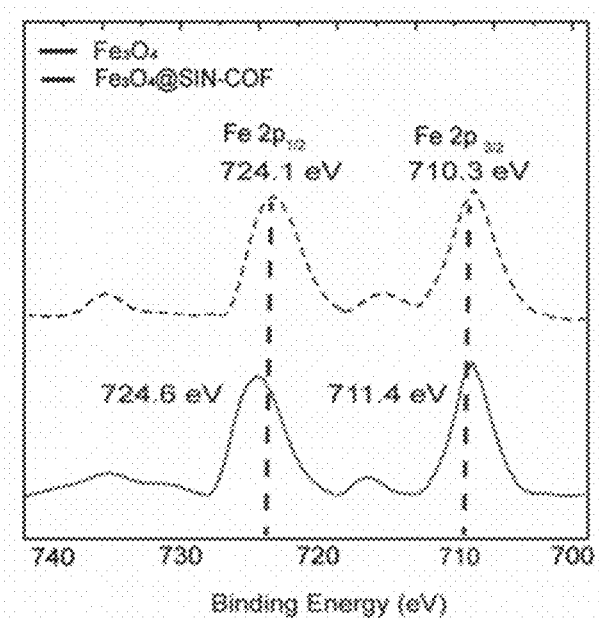
Fig. 14C - XPS spectra of Fe 2p for $Fe_3O_4$@SIN-COF
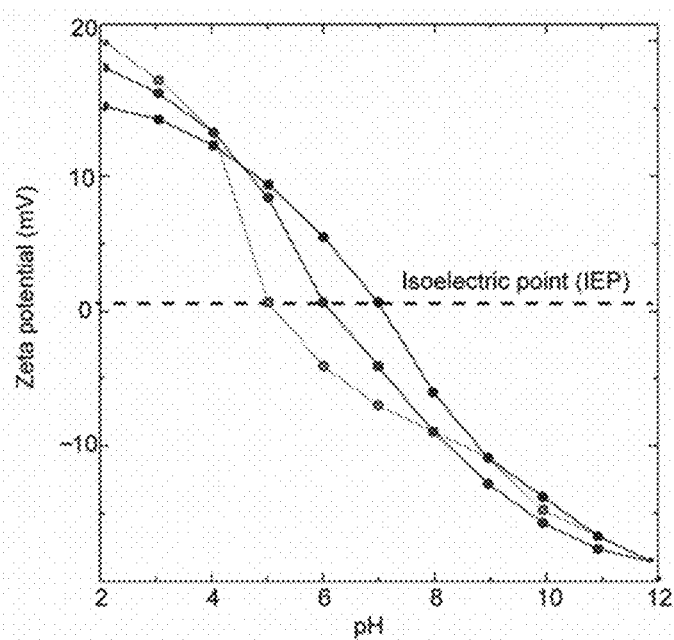
Fig. 15 - Zeta Potential vs. pH for $Fe_3O_4$@MAN-COF (red), $Fe_3O_4$@HMN-COF (green), and $Fe_3O_4$@SIN-COF (blue)

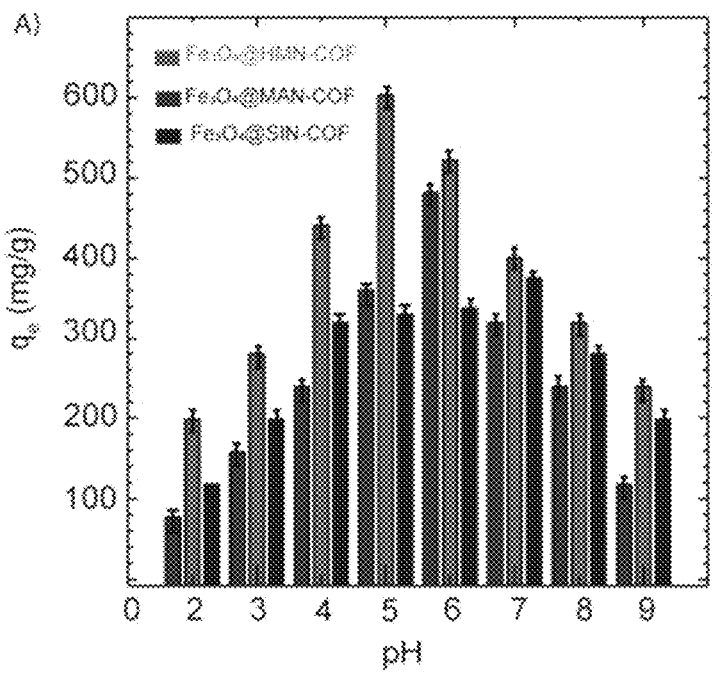
Fig. 16A - Effect of pH on the adsorption capacity ($q_e$) of $Fe_3O_4$@HMN-COF, $Fe_3O_4$@MAN-COF, and $Fe_3O_4$@SIN-CO
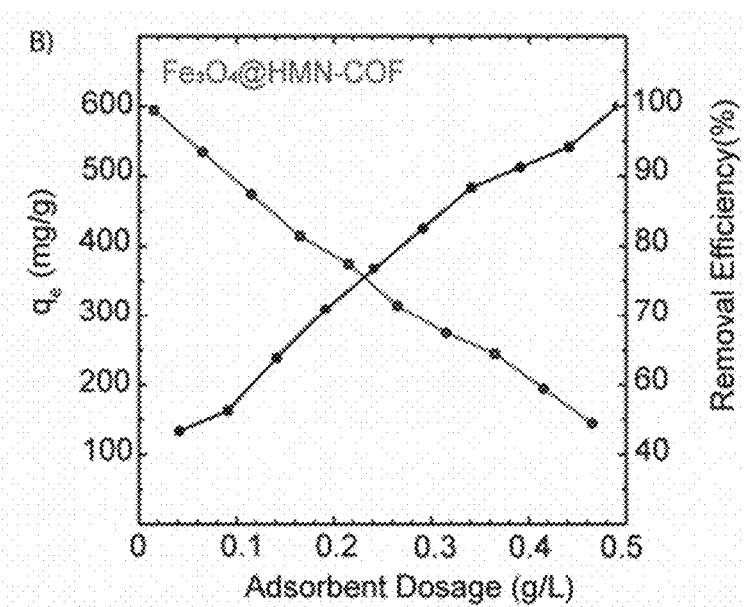
Fig. 16B - Graph showing relationship between adsorbent dosage, and adsorption capacity ($q_e$) and removal efficiency (%) for $Fe_3O_4$@HMN-COF

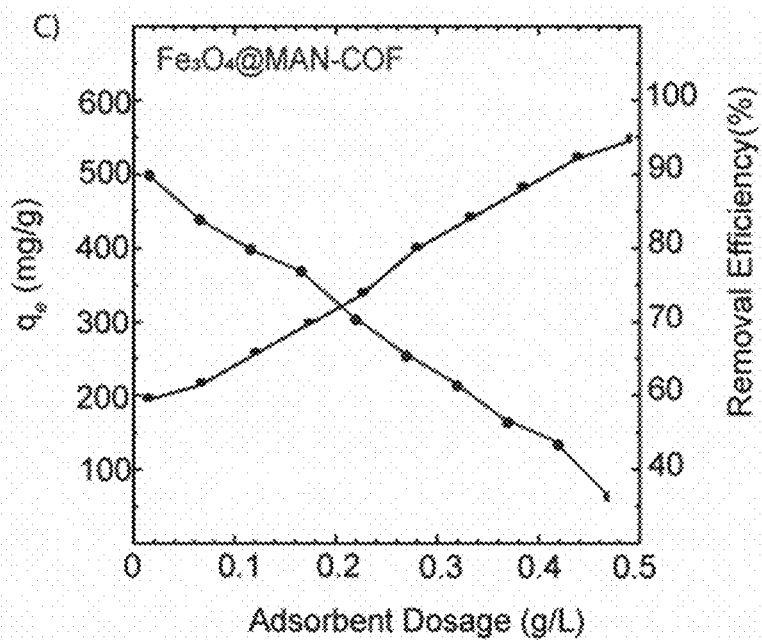
Fig. 16C - Graph showing relationship between adsorbent dosage, and adsorption capacity ($q_e$) and removal efficiency (%) for $Fe_3O_4$@MAN-COF
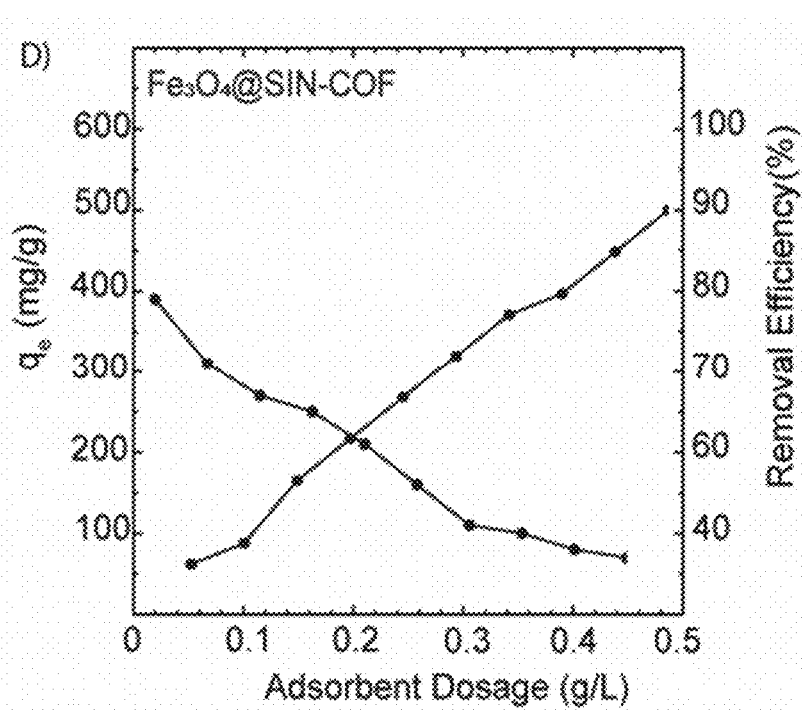
Fig. 16D - Graph showing relationship between adsorbent dosage, and adsorption capacity ($q_e$) and removal efficiency (%) for $Fe_3O_4$@SIN-COF

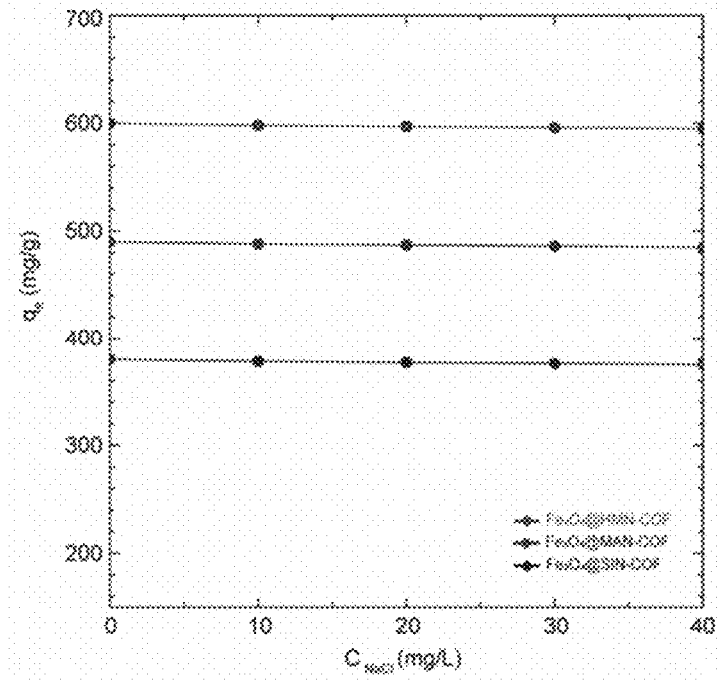
Fig. 17 - Adsorption capacity ($q_e$) of $Fe_3O_4$@HMN-COF, $Fe_3O_4$@MAN-COF, and $Fe_3O_4$@SIN-COF as a function of NaCl concentration ($C_{NaCl}$)
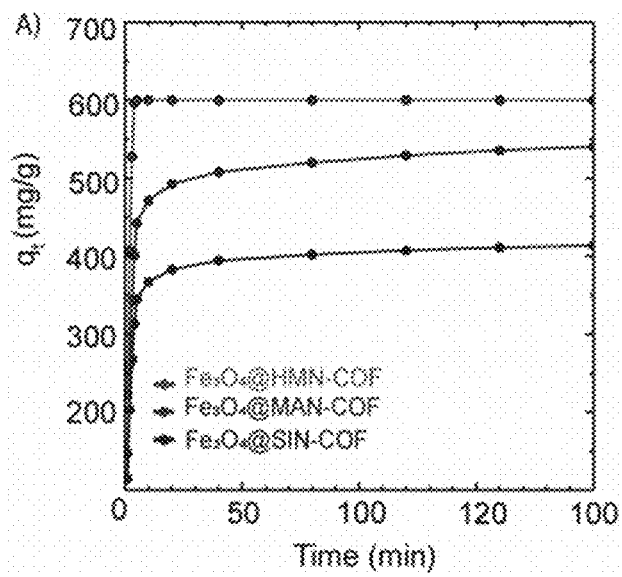
Fig. 18A - Adsorption kinetics of $Fe_3O_4$@HMN-COF, $Fe_3O_4$@MAN-COF, and $Fe_3O_4$@SIN-COF

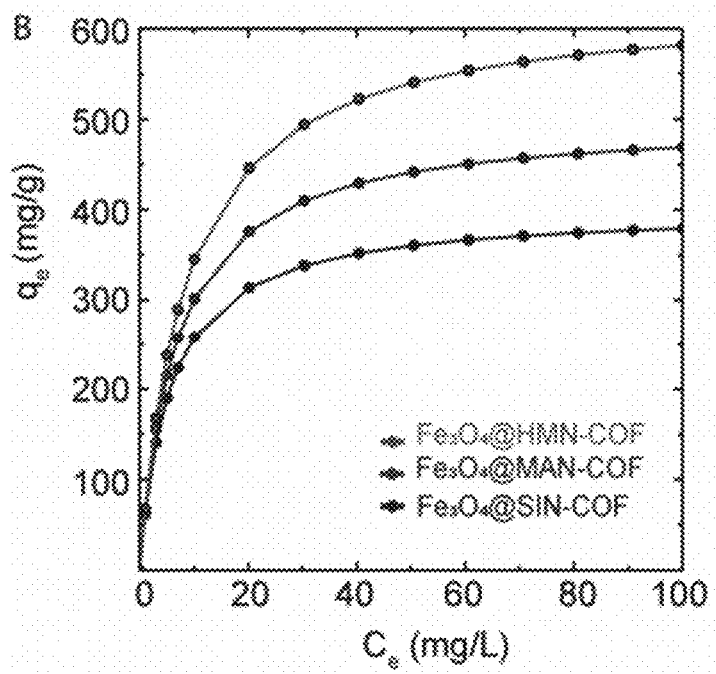
Fig. 18B - Adsorption isotherms of $Fe_3O_4$@HMN-COF, $Fe_3O_4$@MAN-COF, and $Fe_3O_4$@SIN-COF
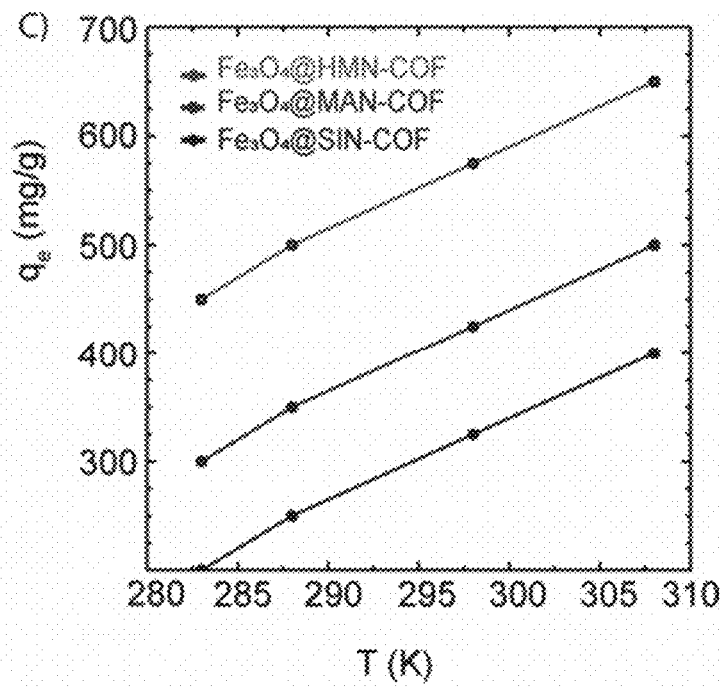
Fig. 18C - Effect of temperature on $q_e$ for $Fe_3O_4$@HMN-COF, $Fe_3O_4$@MAN-COF, and $Fe_3O_4$@SIN-COF

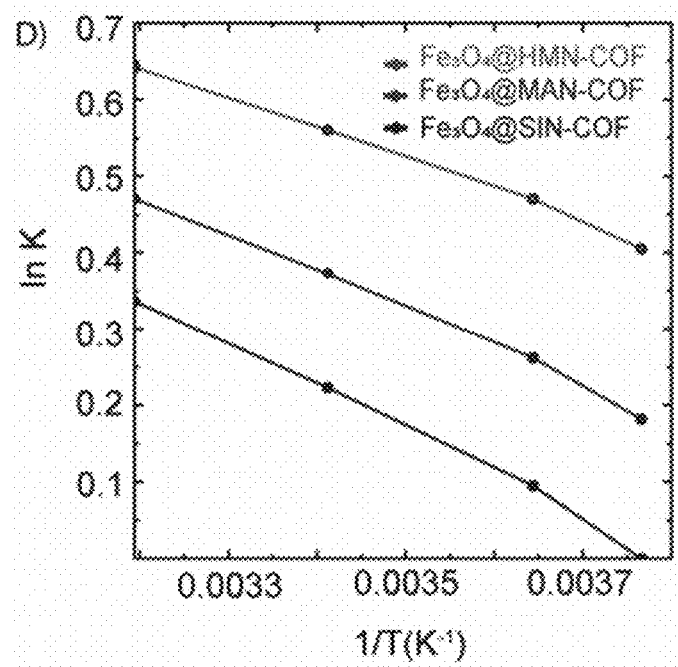
Fig. 18D - Van't Hoff plot of Fe₃O₄@HMN-COF, Fe₃O₄@MAN-COF, and Fe₃O₄@SIN-COF
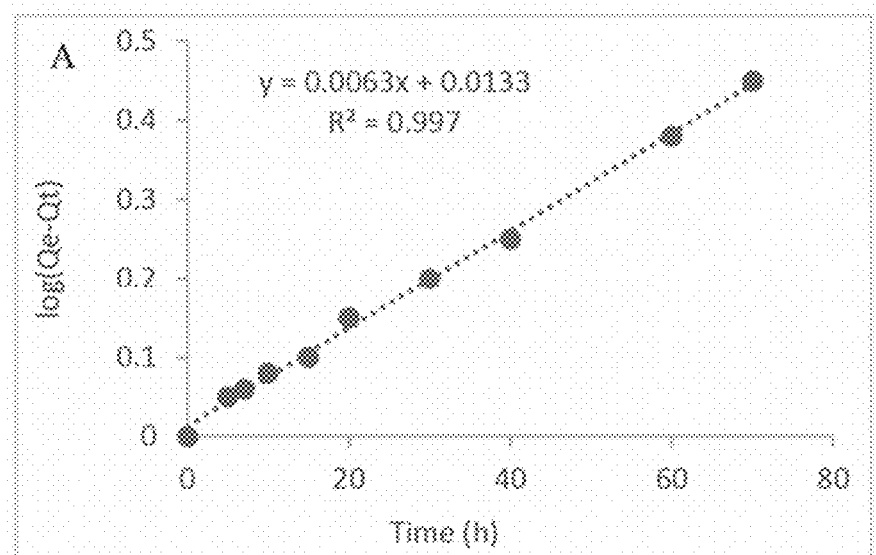
Fig. 19A - Pseudo-second-order diffusion model plot for Fe₃O₄@MAN-COF

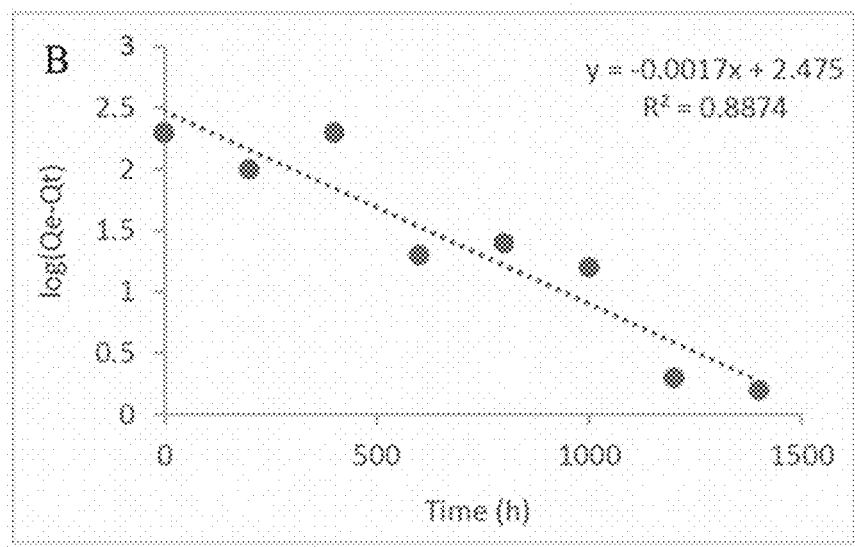
Fig. 19B - Pseudo-first-order diffusion model plot for Fe$_3$O$_4$@MAN-COF
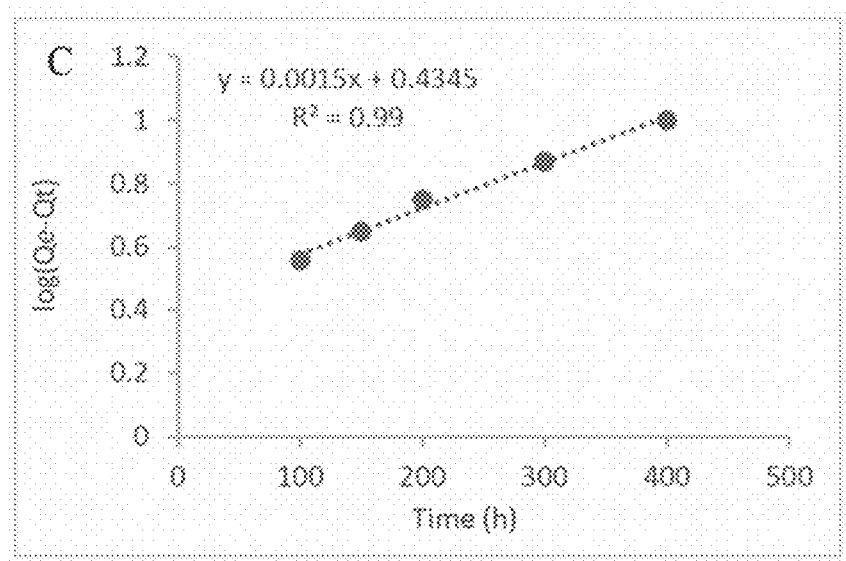
Fig. 19C - Pseudo-second-order diffusion model plot for Fe$_3$O$_4$@HMN-COF

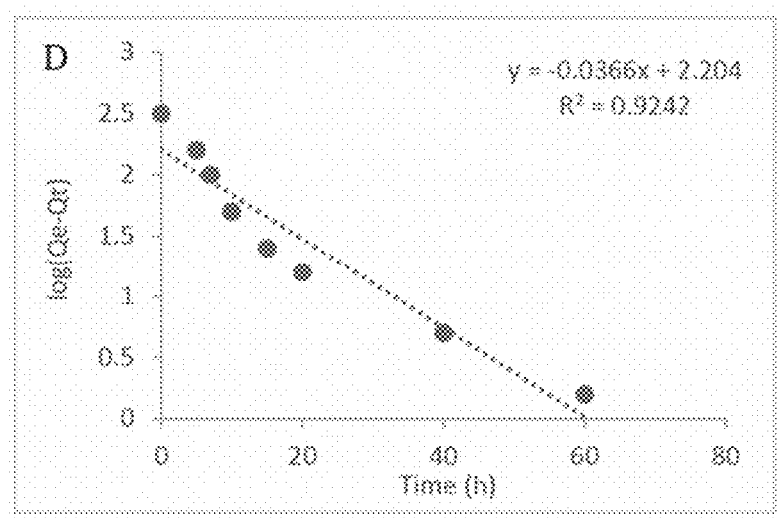
Fig. 19D - Pseudo-first-order diffusion model plot for Fe₃O₄@HMN-COF
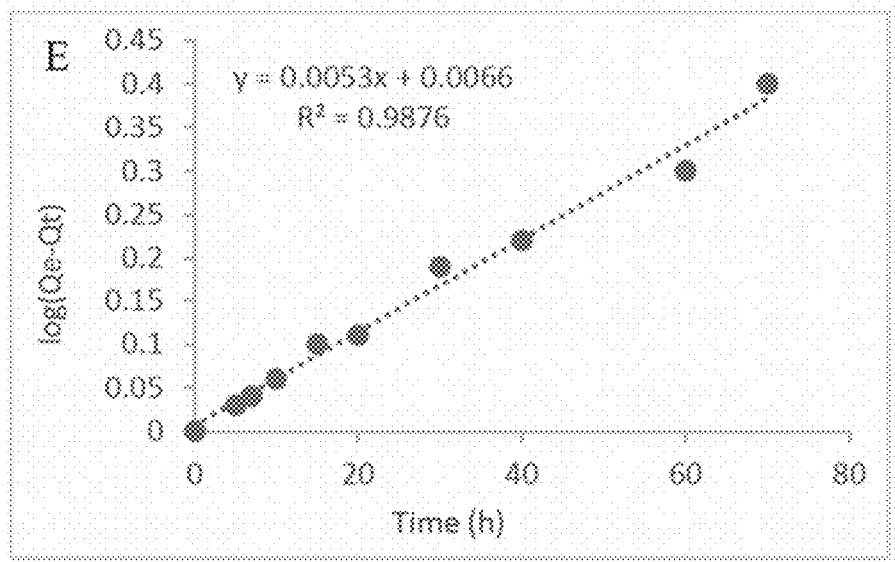
Fig. 19E - Pseudo-second-order diffusion model plot for Fe₃O₄@SIN-COF

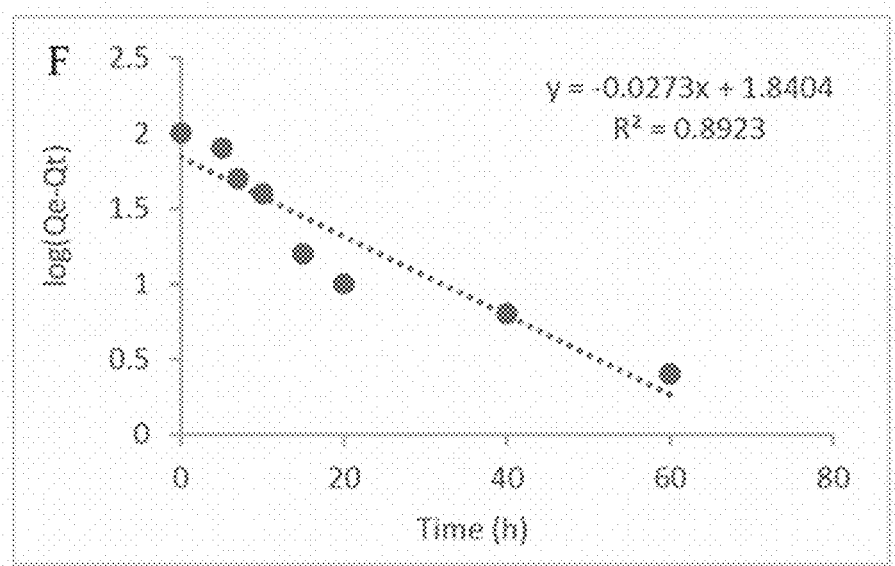
Fig. 19F - Pseudo-first-order diffusion model plot for $Fe_3O_4$@SIN-COF
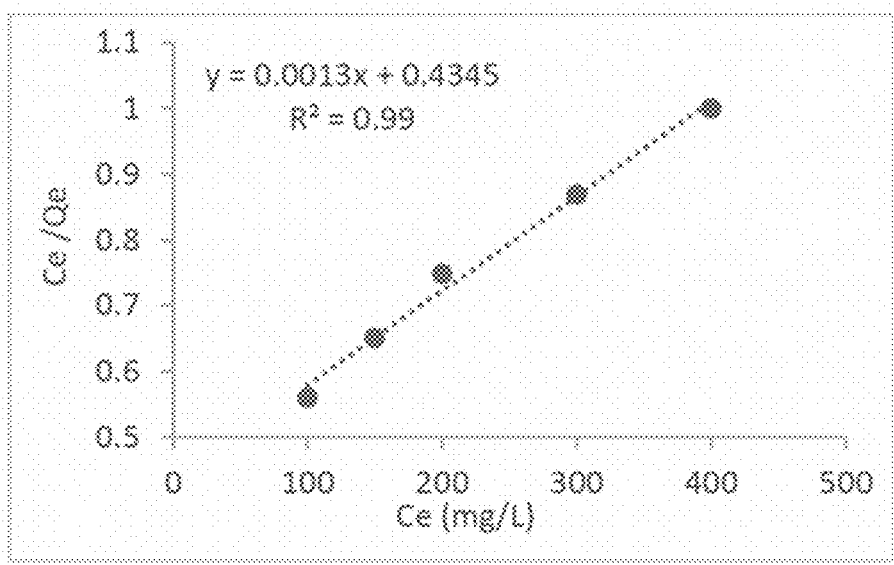
Fig. 20A - Linearized Langmuir isotherms for iodine adsorption on $Fe_3O_4$@MAN-COF

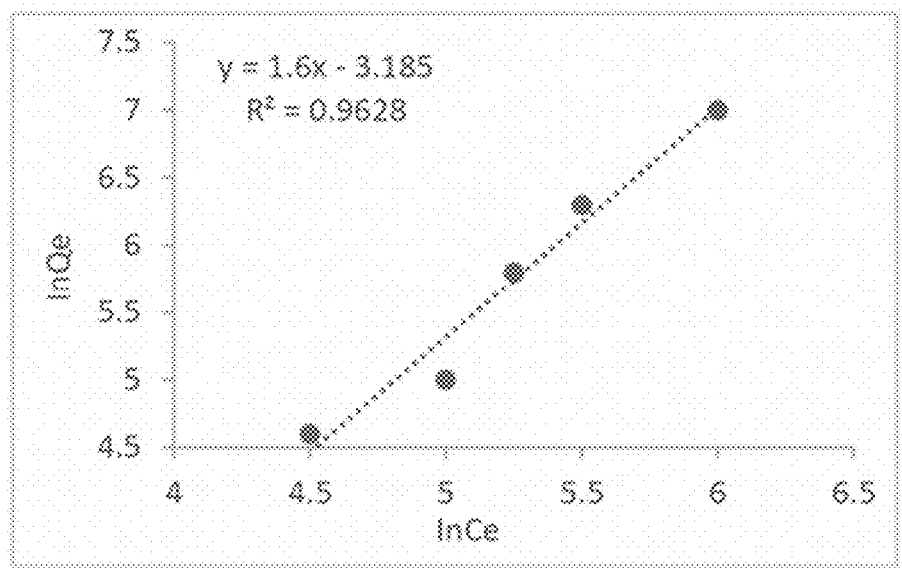
Fig. 20B - Linearized Freundlich isotherms for iodine adsorption on $Fe_3O_4$@MAN-COF
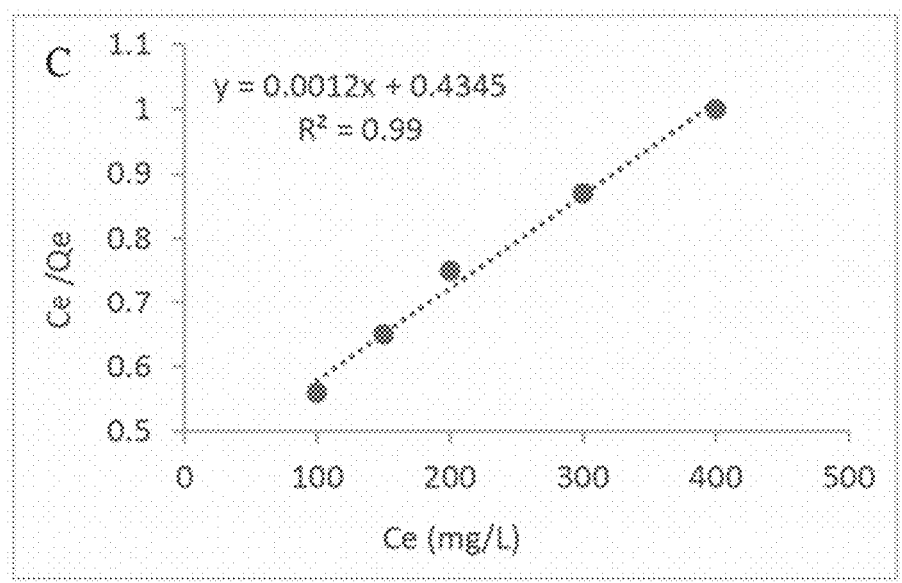
Fig. 20C - Linearized Langmuir isotherms for iodine adsorption on $Fe_3O_4$@HMN-COF

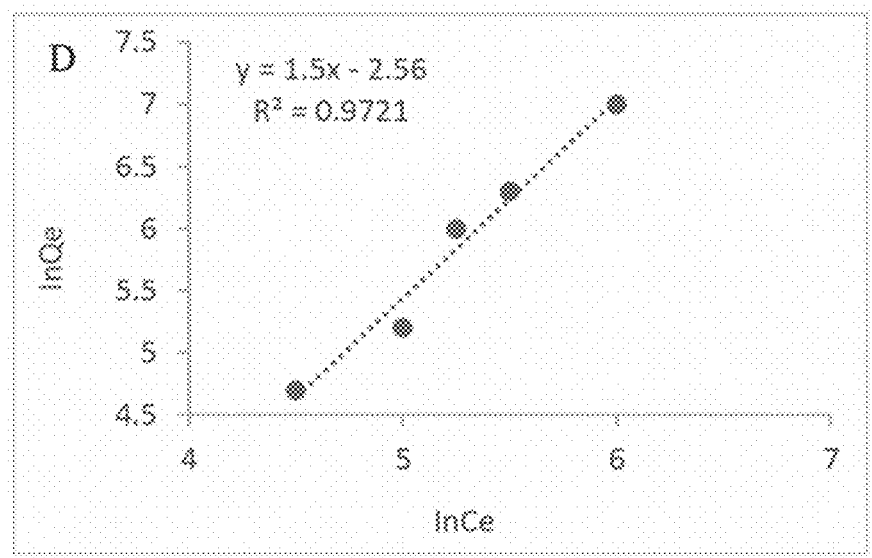
Fig. 20D - Linearized Freundlich isotherms for iodine adsorption on Fe$_3$O$_4$@HMN-COF
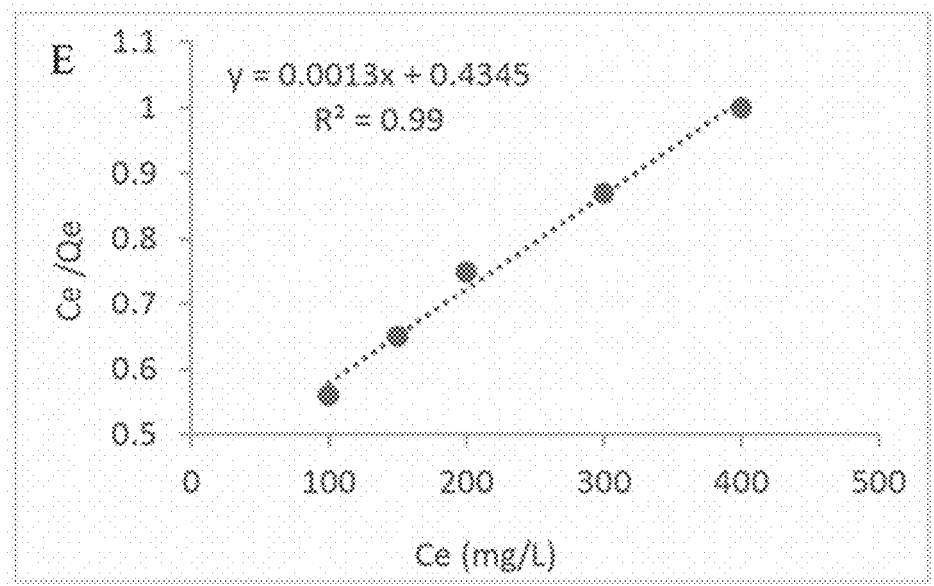
Fig. 20E - Linearized Langmuir isotherms for iodine adsorption on Fe$_3$O$_4$@SIN-COF

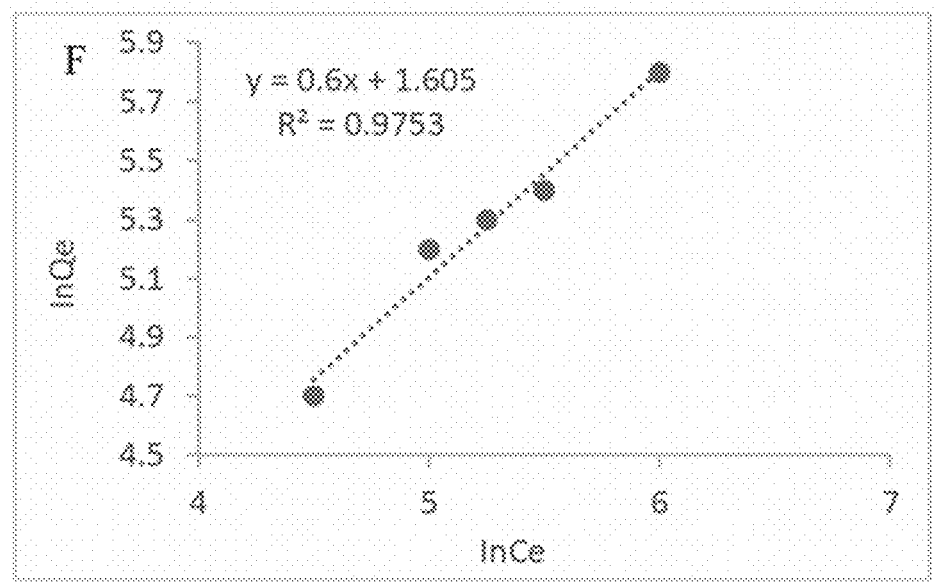
Fig. 20F - Linearized Freundlich isotherms for iodine adsorption on $Fe_3O_4$@SIN-COF
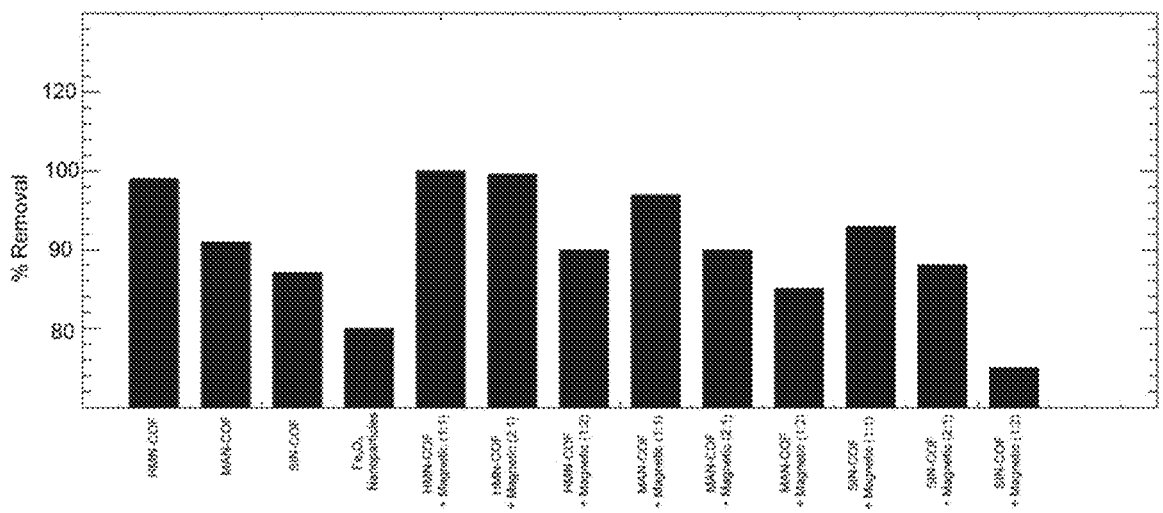
Fig. 21 - Percentage removal efficiency of pure $Fe_3O_4$ nanoparticles, different COF samples and their mixtures with iron nanoparticles at ratios of 1:1, 2:1, and 1:2

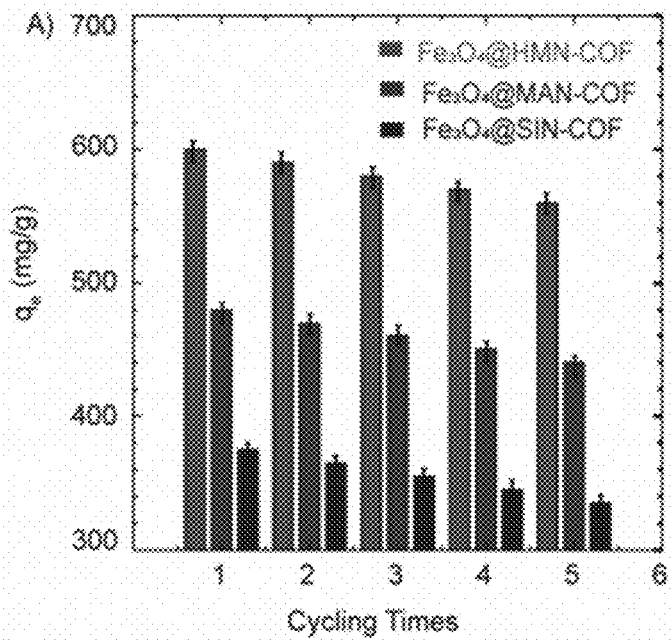
Fig. 23A - Adsorption capacity ($q_e$, mg/g) of $Fe_3O_4$@HMN-COF, $Fe_3O_4$@MAN-COF, and $Fe_3O_4$@SIN-COF over multiple cycling times
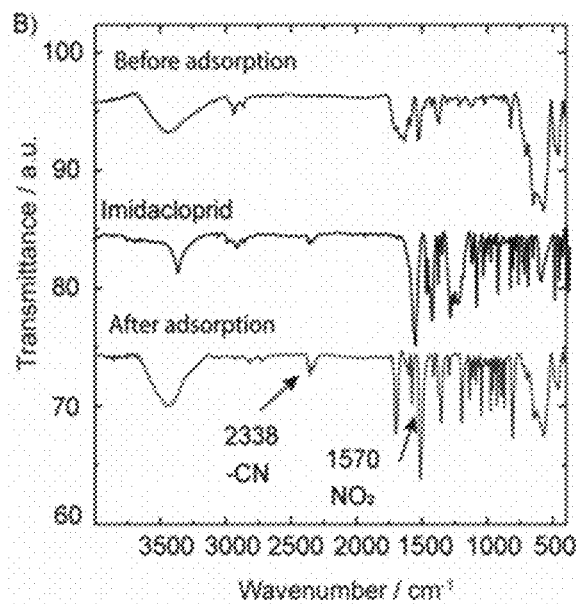
Fig. 23B - FT-IR spectra of $Fe_3O_4$@HMN-COF before and after adsorption of imidacloprid

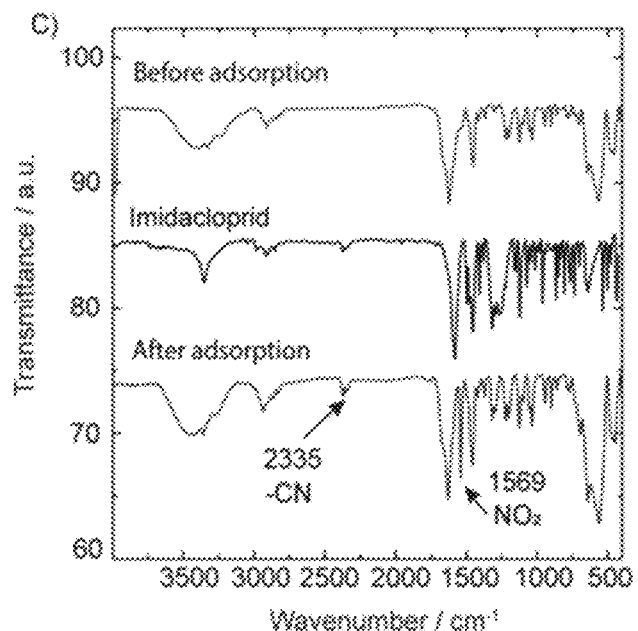
Fig. 23C - FT-IR spectra of Fe3O4@MAN-COF before and after adsorption of imidacloprid
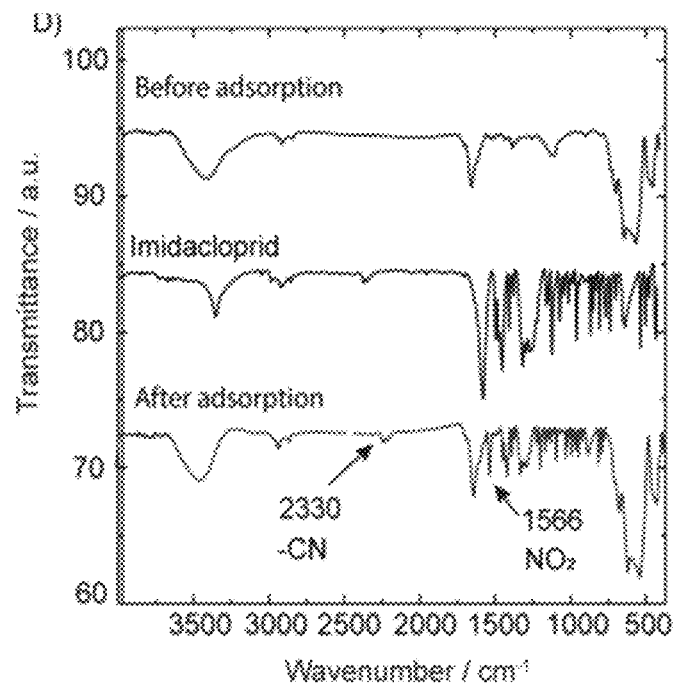
Fig. 23D - FT-IR spectra of Fe3O4@SIN-COF before and after adsorption of imidacloprid

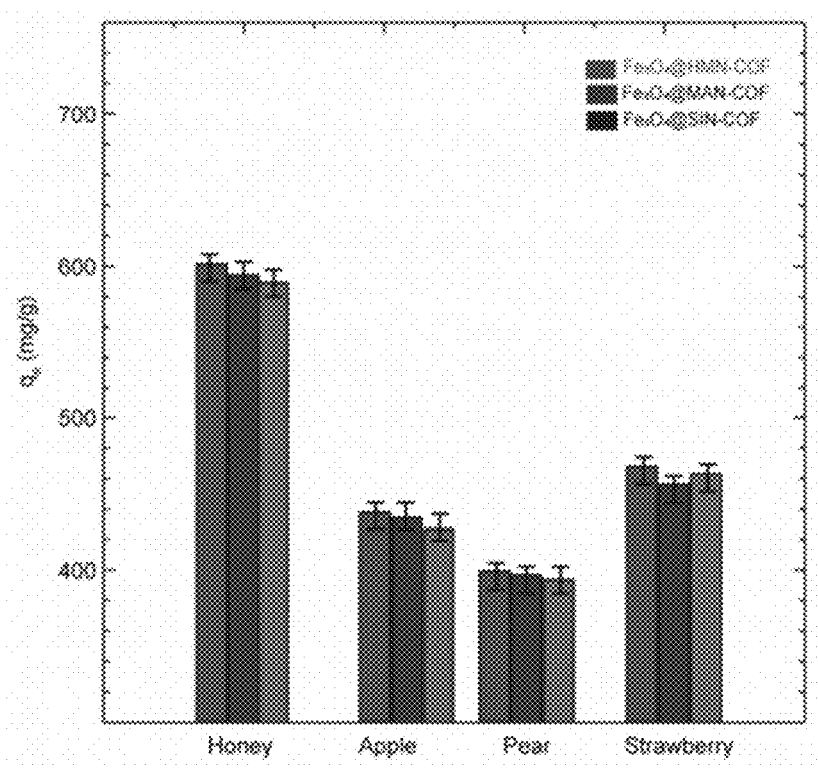
Fig. 24 - Adsorption capacities ($q_e$, mg/g) of $Fe_3O_4$@HMN-COF, $Fe_3O_4$@MAN-COF, and $Fe_3O_4$@SIN-COF in honey, apple, pear, and strawberry

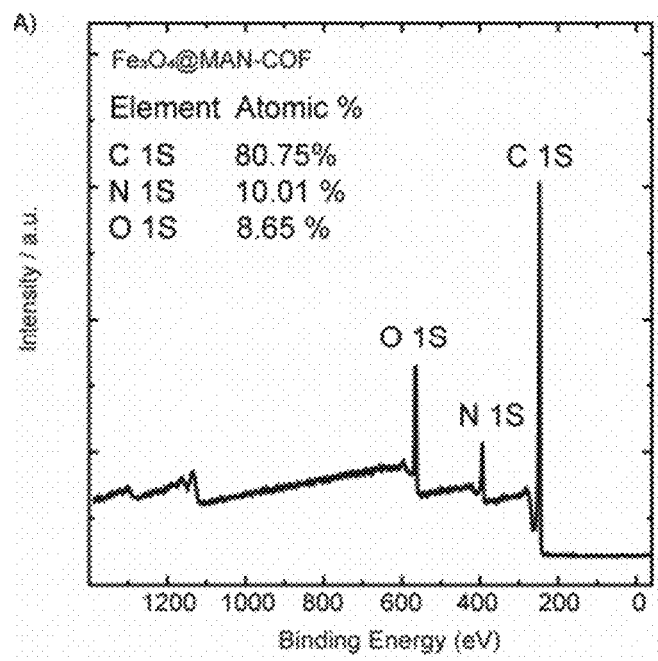
Fig. 25A - XPS spectra and atomic percentages of C 1S, N 1S, and O 1S for Fe$_3$O$_4$@MAN-COF
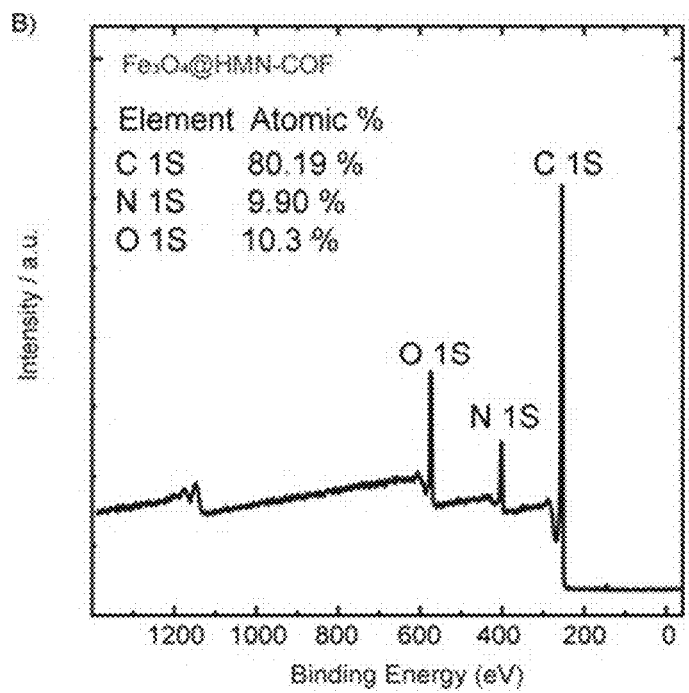
Fig. 25B - XPS spectra and atomic percentages of C 1S, N 1S, and O 1S for Fe$_3$O$_4$@HMN-COF

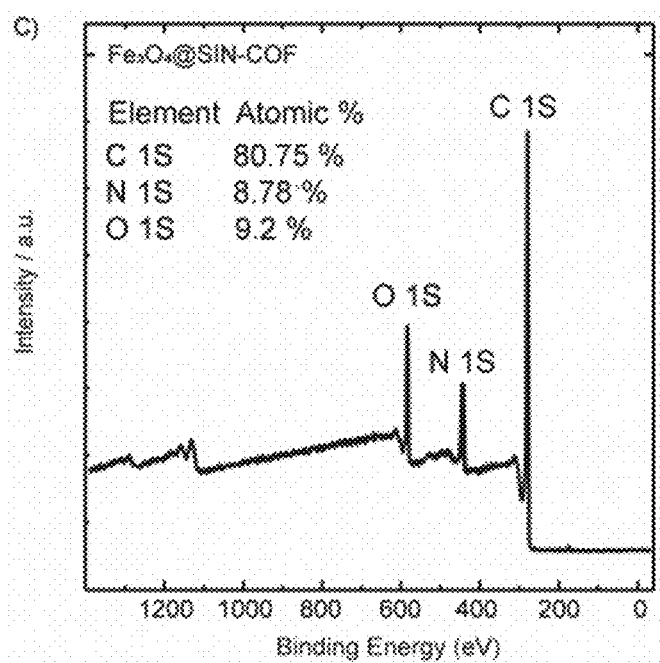
Fig. 25C - XPS spectra and atomic percentages of C 1S, N 1S, and O 1S for $Fe_3O_4$@SIN-COF
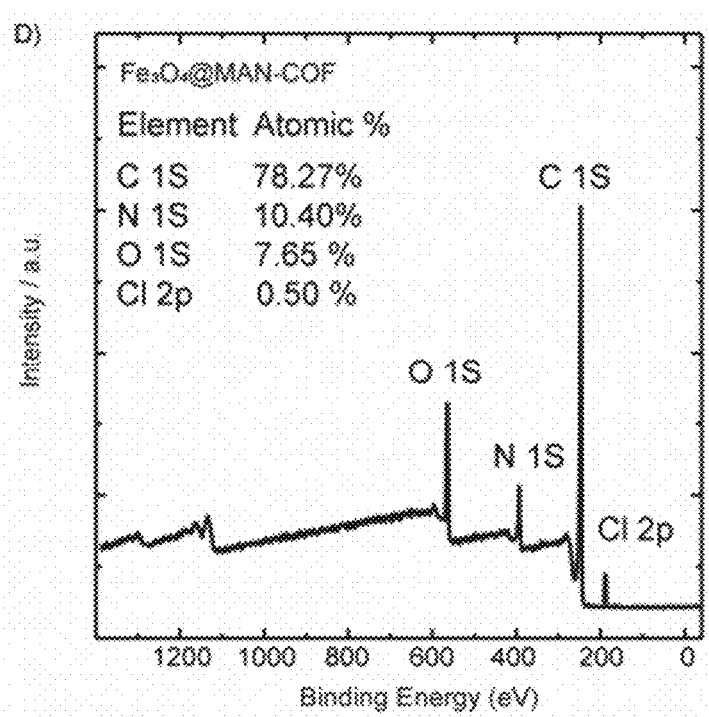
Fig. 25D - XPS spectra and atomic percentages of C 1S, N 1S, O 1S and Cl 2p for $Fe_3O_4$@MAN-COF

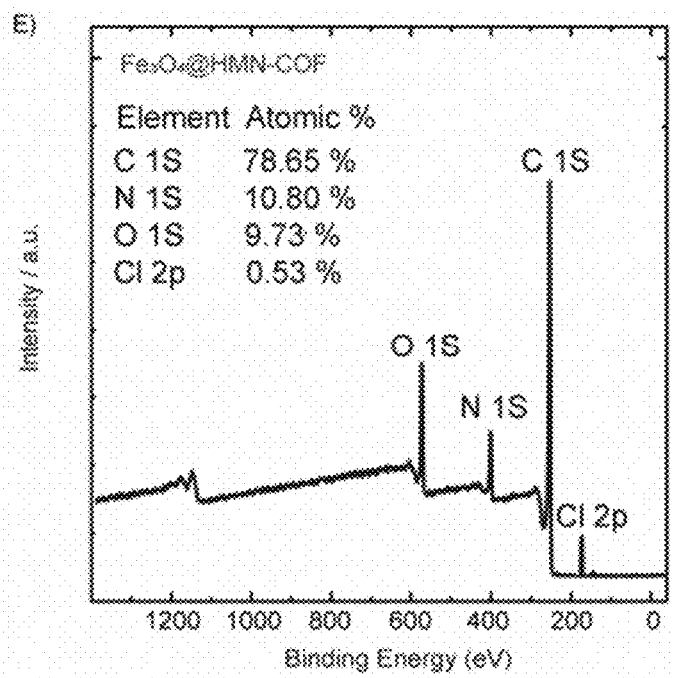
Fig. 25E - XPS spectra and atomic percentages of C 1S, N 1S, O 1S and Cl 2p for Fe₃O₄@HMN-COF
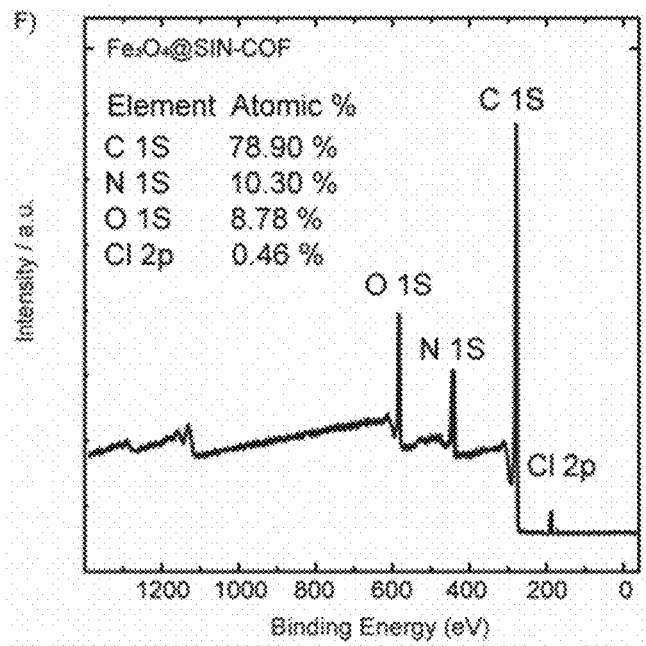
Fig. 25F - XPS spectra and atomic percentages of C 1S, N 1S, O 1S and Cl 2p for Fe₃O₄@SIN-COF

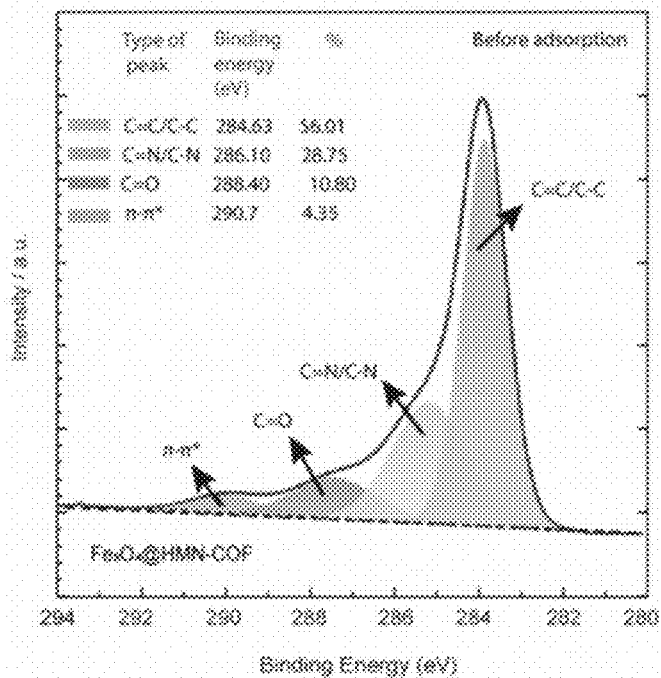
Fig. 26A - XPS C 1s spectra for $Fe_3O_4$@HMN-COF before adsorption of Imidacloprid
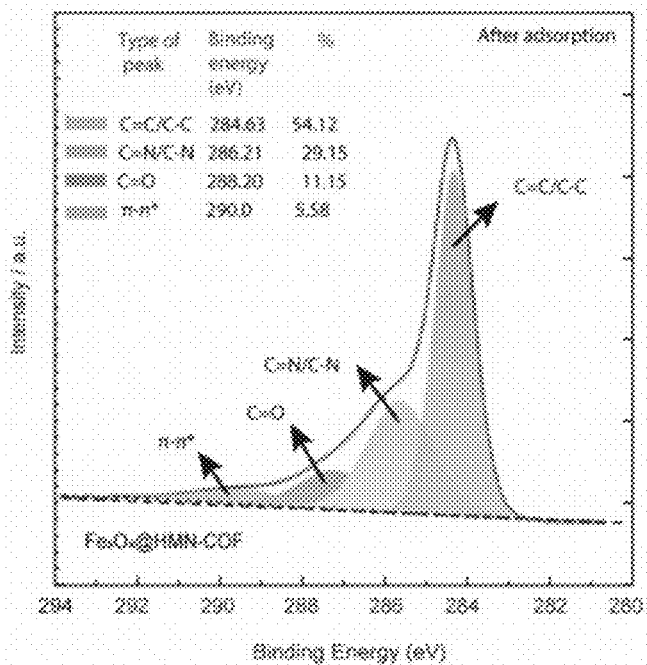
Fig. 26B - XPS C 1s spectra for $Fe_3O_4$@HMN-COF after adsorption of Imidacloprid

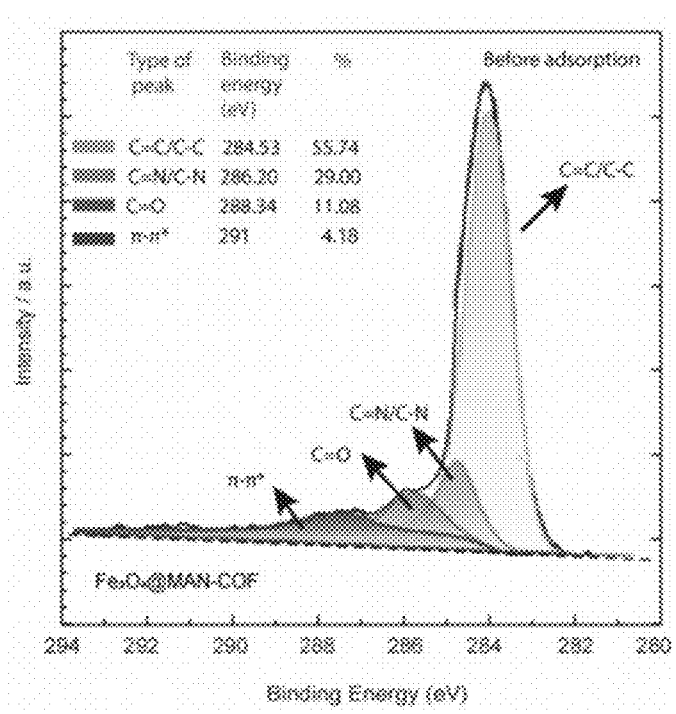
Fig. 26C - XPS C 1s spectra for Fe₃O₄@MAN-COF before adsorption of Imidacloprid
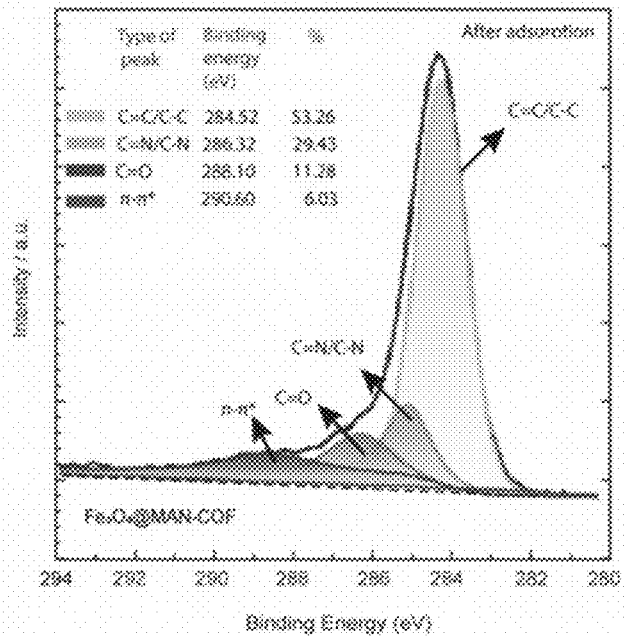
Fig. 26D - XPS C 1s spectra for Fe₃O₄@MAN-COF after adsorption of Imidacloprid

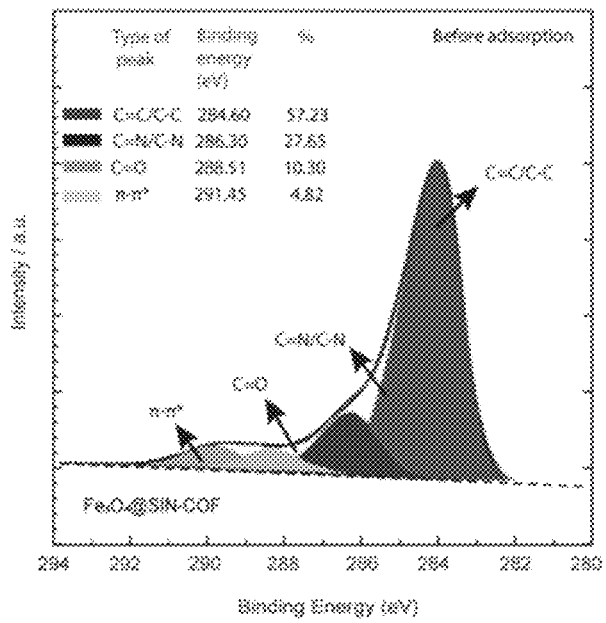
Fig. 26E - XPS C 1s spectra for $Fe_3O_4$@SIN-COF before adsorption of Imidacloprid
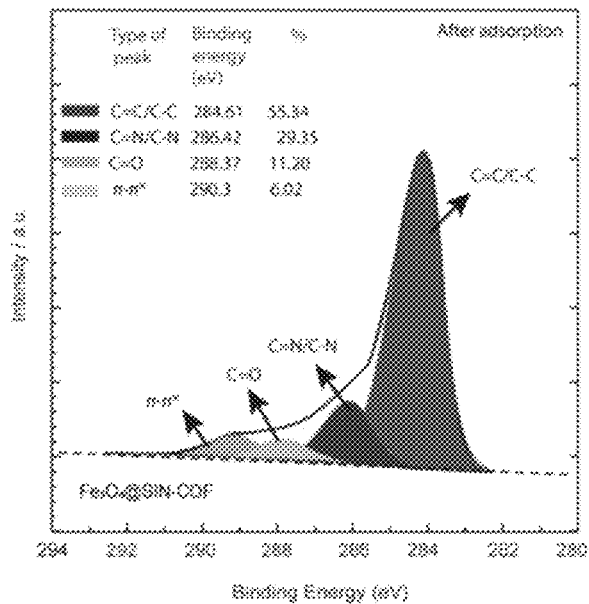
Fig. 26F - XPS C 1s spectra for $Fe_3O_4$@SIN-COF after adsorption of Imidacloprid

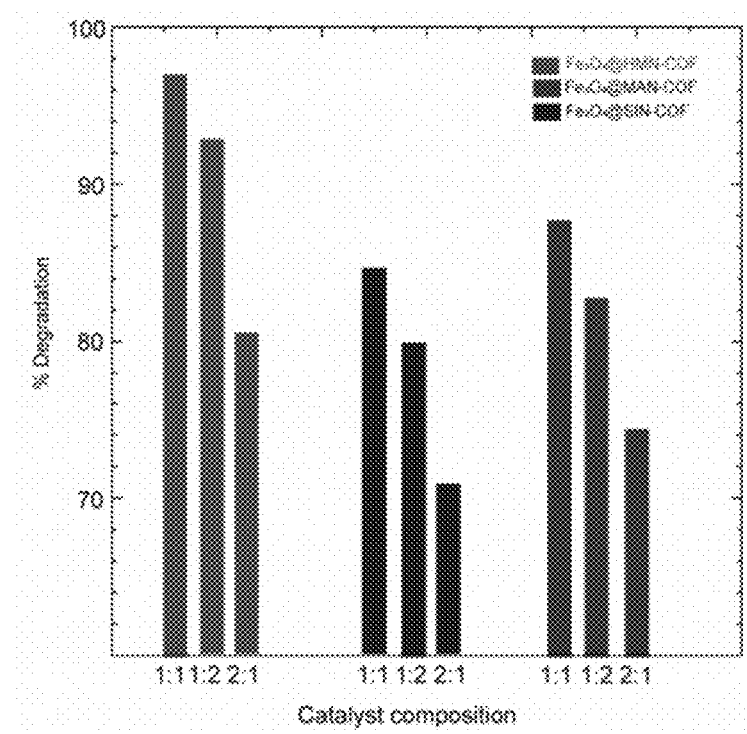
Fig. 27 - Percentage degradation of Imidacloprid using $Fe_3O_4$@HMN-COF, $Fe_3O_4$@MAN-COF, and $Fe_3O_4$@SIN-COF at different catalyst compositions (1:1, 1:2, and 2:1)
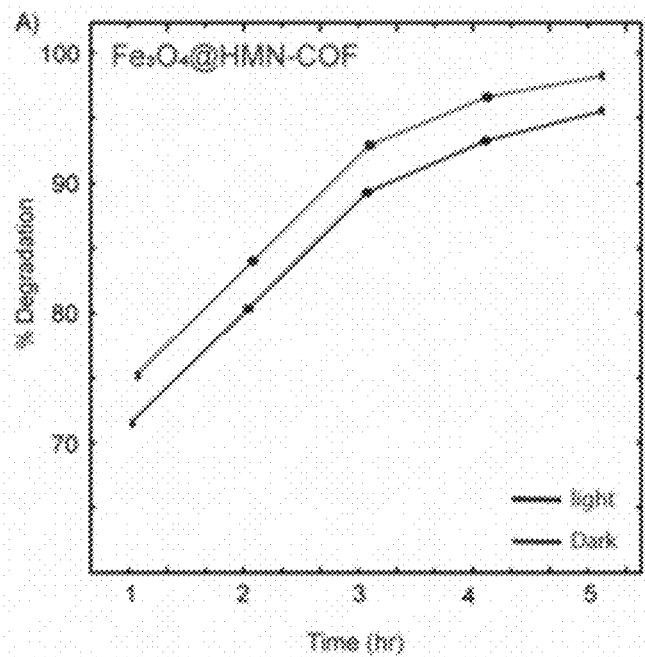
Fig. 28A - Degradation of Imidacloprid over time using $Fe_3O_4$@HMN-COF under light and dark conditions

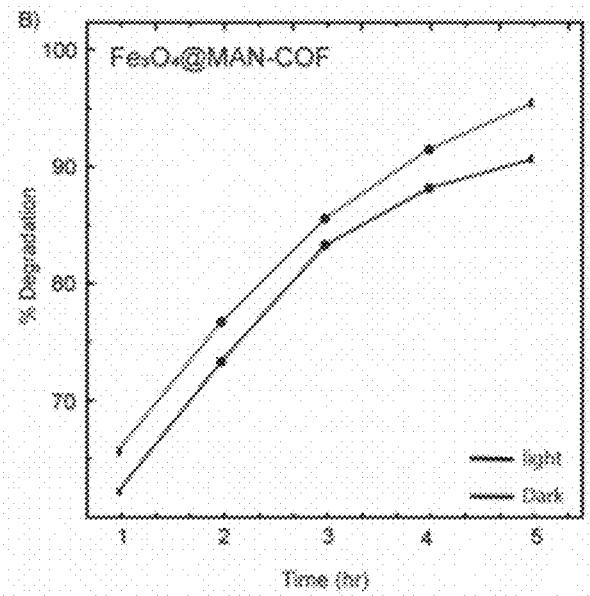
Fig. 28B - Degradation of Imidacloprid over time using $Fe_3O_4$@MAN-COF under light and dark conditions
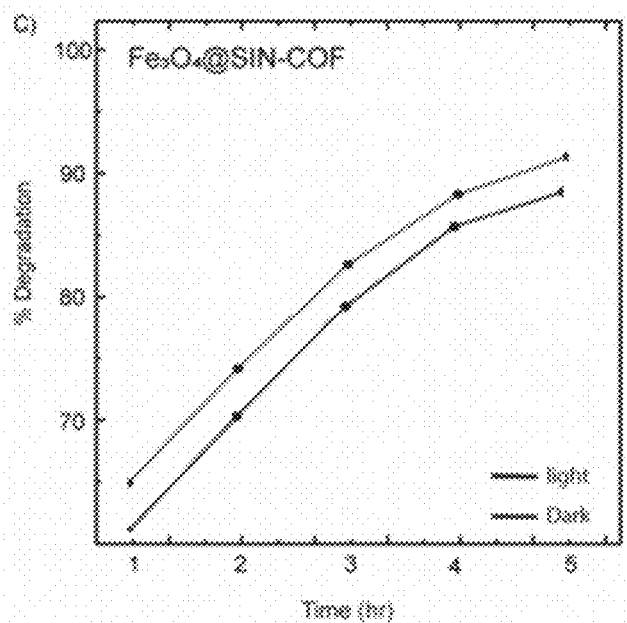
Fig. 28C - Degradation of Imidacloprid over time using $Fe_3O_4$@SIN-COF under light and dark conditions

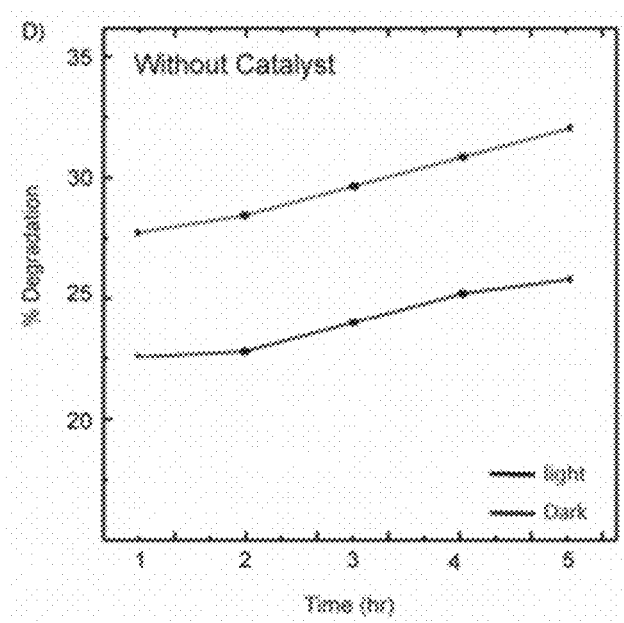
Fig. 28D - Degradation of Imidacloprid over time using without catalyst under light and dark conditions
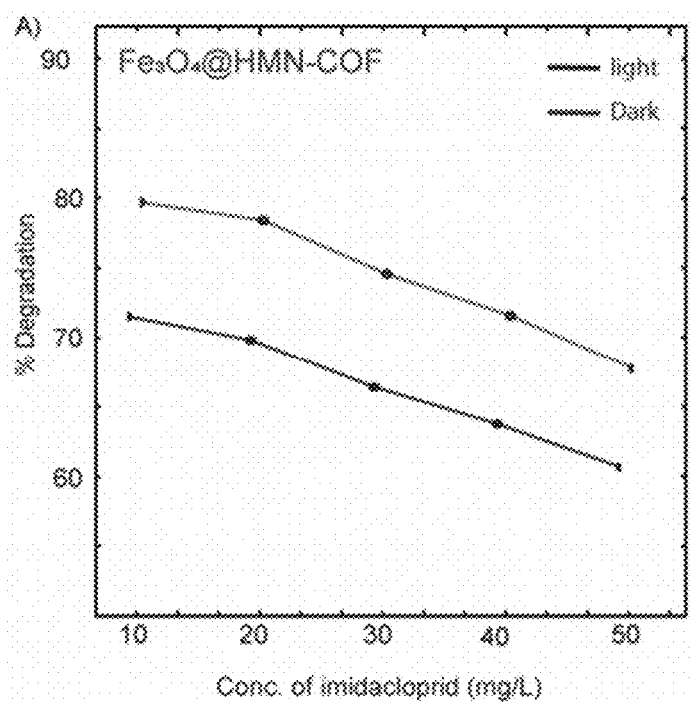
Fig. 29A - Degradation efficiency of Imidacloprid at various concentrations (10-50 mg/L) under light and dark conditions using $Fe_3O_4$@HMN-COF

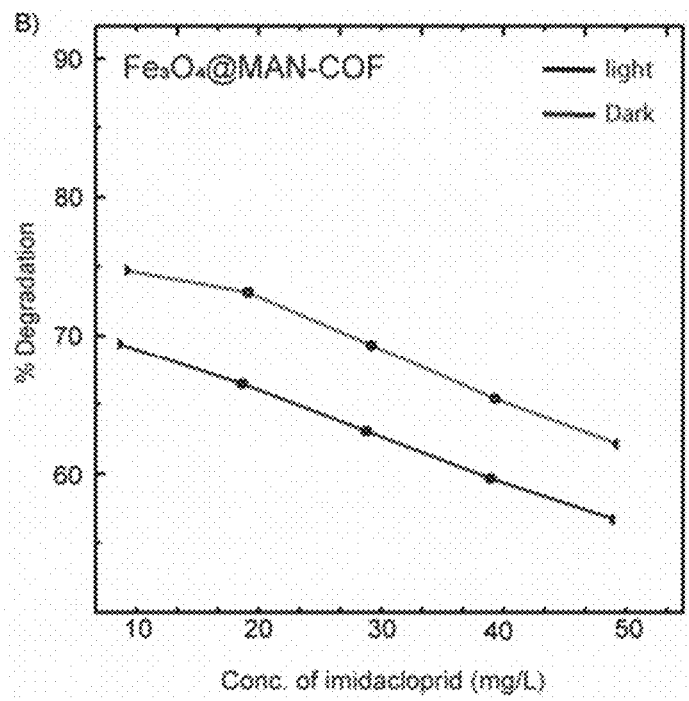
Fig. 29B - Degradation efficiency of Imidacloprid at various concentrations (10-50 mg/L) under light and dark conditions using $Fe_3O_4$@MAN-COF
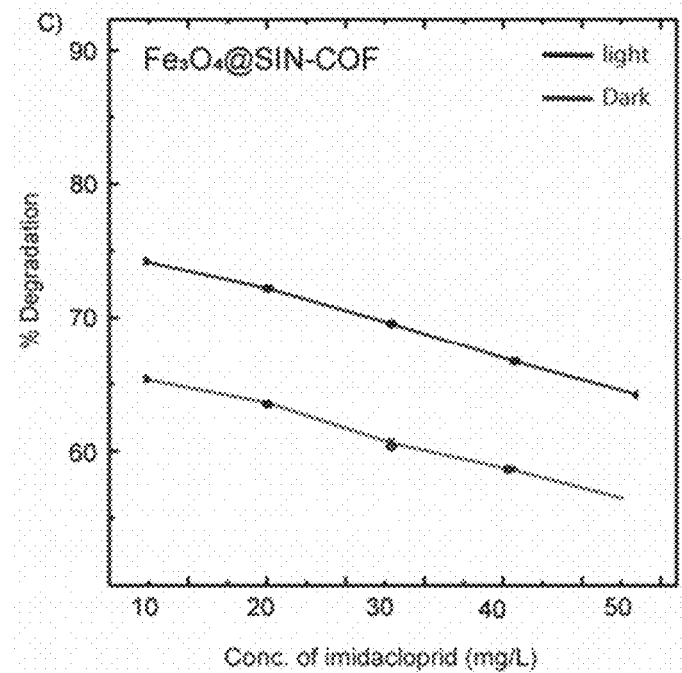
Fig. 29C - Degradation efficiency of Imidacloprid at various concentrations (10-50 mg/L) under light and dark conditions using $Fe_3O_4$@SIN-COF

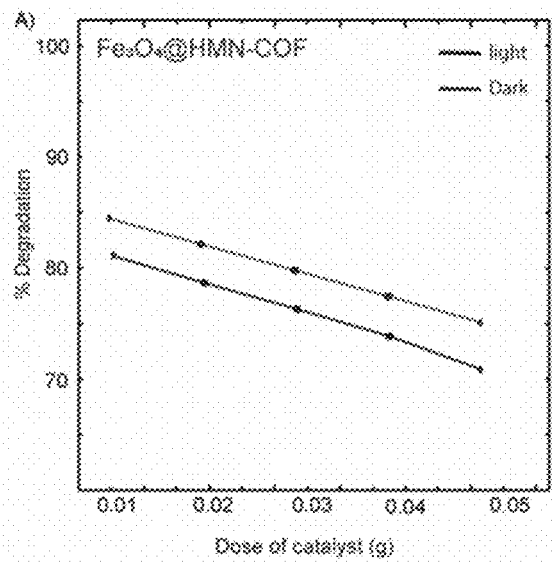
Fig. 30A - Degradation efficiency of Imidacloprid at various catalyst dosages (0.01-0.05 g) under light and dark conditions using $Fe_3O_4$@HMN-COF
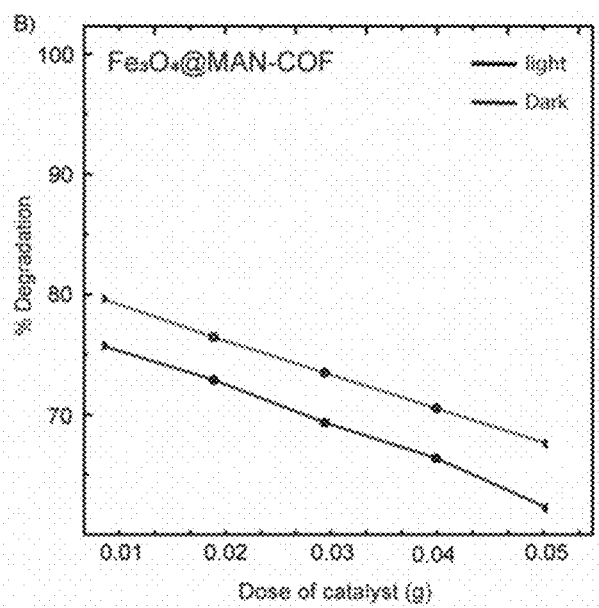
Fig. 30B - Degradation efficiency of Imidacloprid at various catalyst dosages (0.01-0.05 g) under light and dark conditions using $Fe_3O_4$@MAN-COF

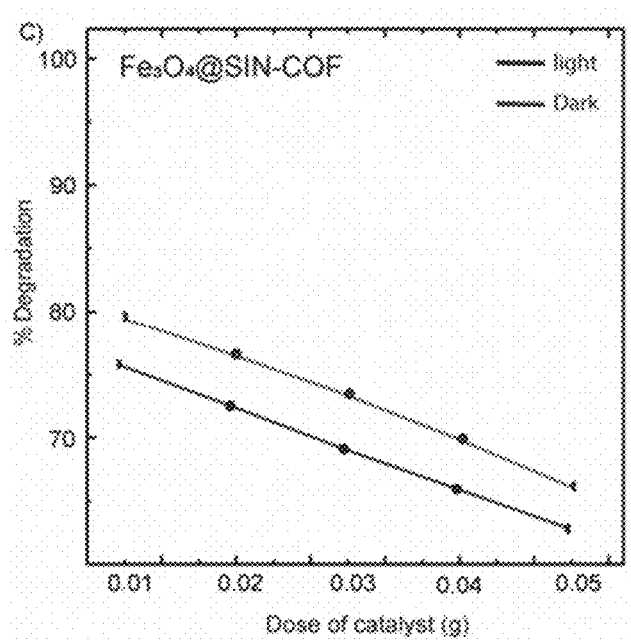
Fig. 30C - Degradation efficiency of Imidacloprid at various catalyst dosages (0.01-0.05 g) under light and dark conditions using $Fe_3O_4$@SIN-COF
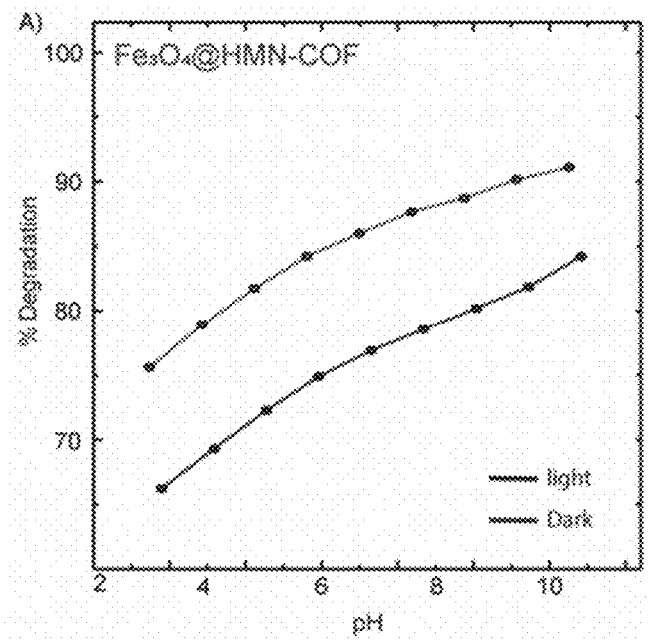
Fig. 31A - Degradation efficiency of Imidacloprid at various pH levels (2-10) under light and dark conditions using $Fe_3O_4$@HMN-COF

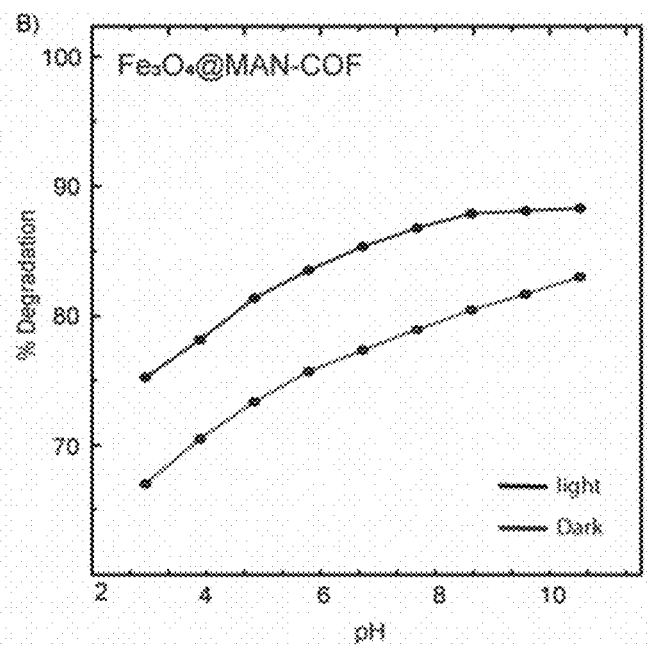
Fig. 31B - Degradation efficiency of Imidacloprid at various pH levels (2-10) under light and dark conditions using $Fe_3O_4$@MAN-COF
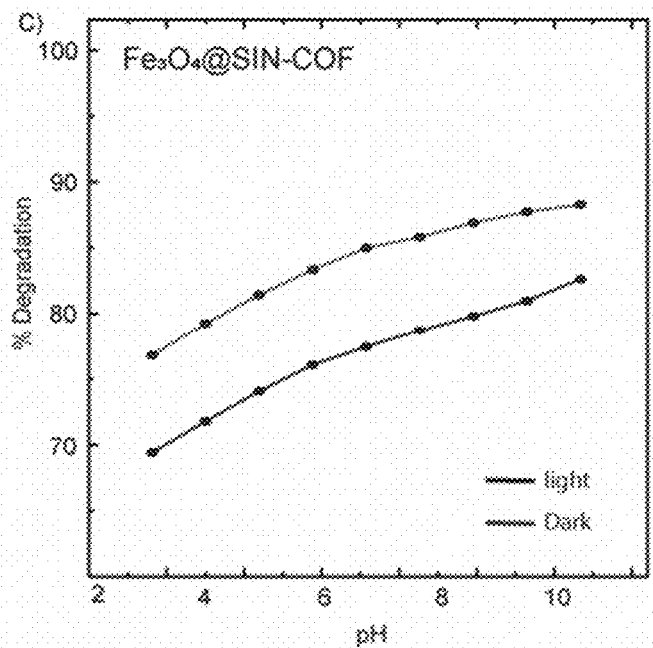
Fig. 31C - Degradation efficiency of Imidacloprid at various pH levels (2-10) under light and dark conditions using $Fe_3O_4$@SIN-COF

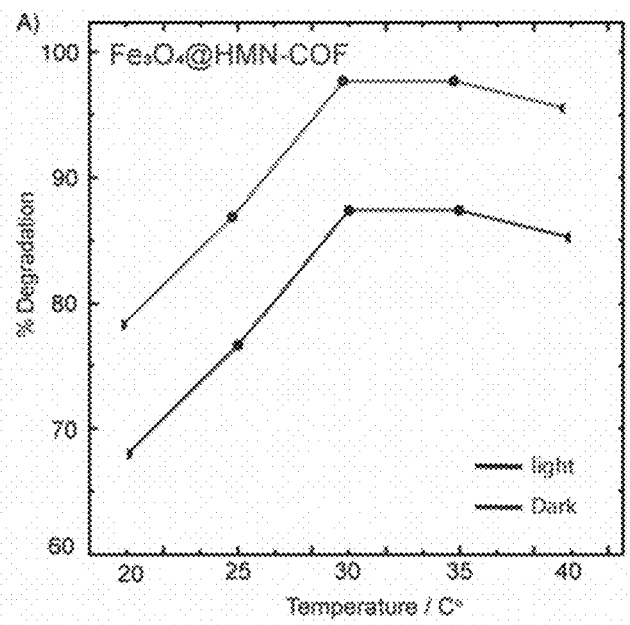
Fig. 32A - Degradation efficiency of Imidacloprid at various temperatures (20°C to 40°C) under light and dark conditions using $Fe_3O_4$@HMN-COF
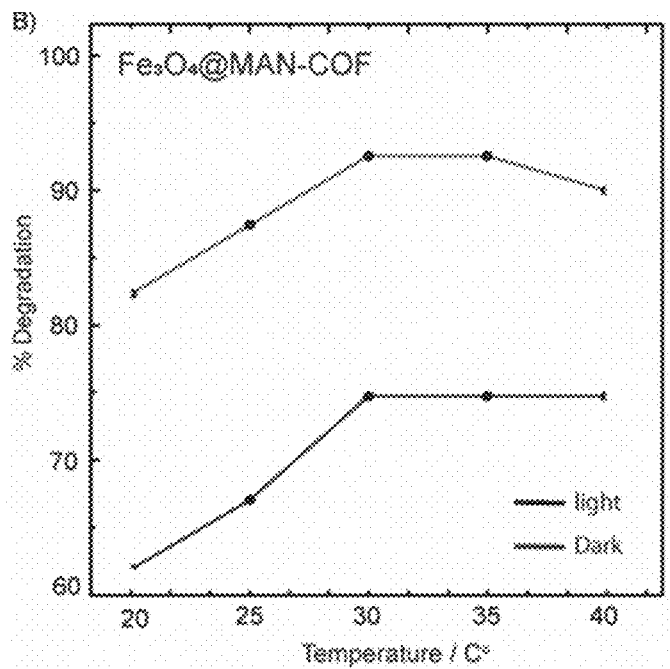
Fig. 32B - Degradation efficiency of Imidacloprid at various temperatures (20°C to 40°C) under light and dark conditions using $Fe_3O_4$@MAN-COF

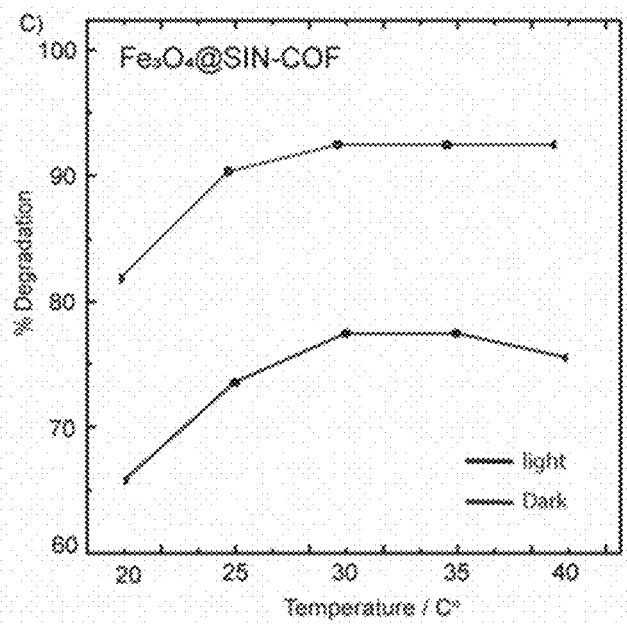
Fig. 32C - Degradation efficiency of Imidacloprid at various temperatures (20°C to 40°C) under light and dark conditions using Fe3O4@SIN-COF
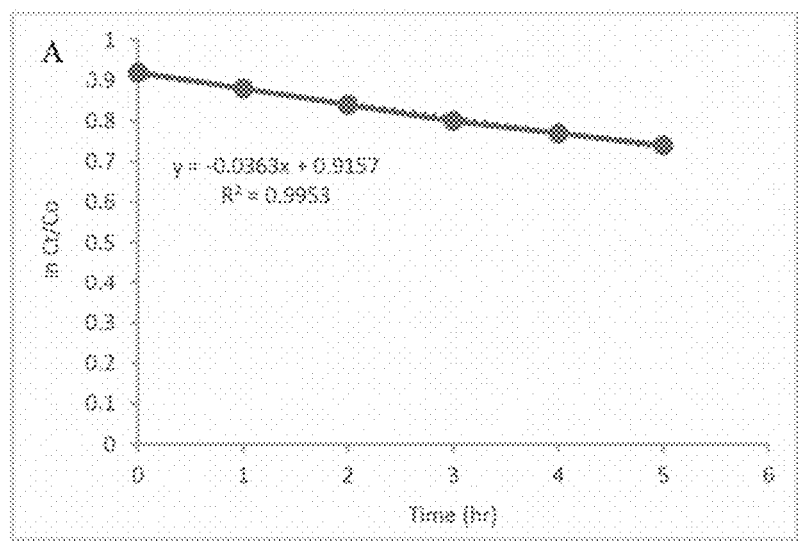
Fig. 33A - Kinetic plots for the degradation of imidacloprid without a catalyst under dark conditions

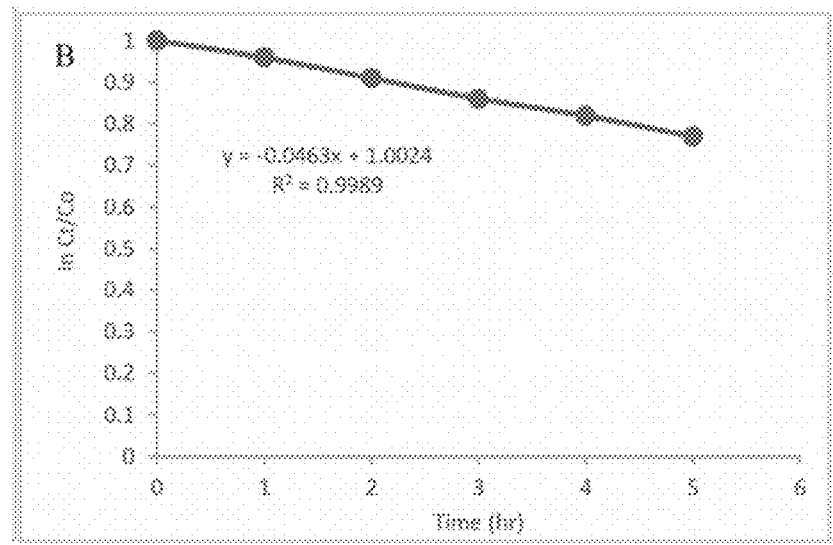
Fig. 33B - Kinetic plots for the degradation of imidacloprid without a catalyst under light conditions
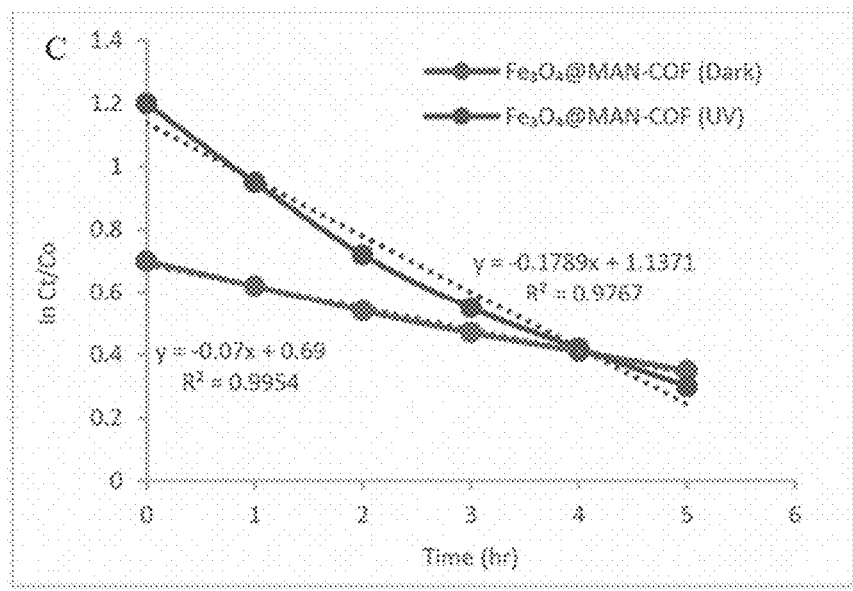
Fig. 33C - Second-order kinetic plots for the degradation of imidacloprid using $Fe_3O_4$@MAN-COF under light and dark conditions

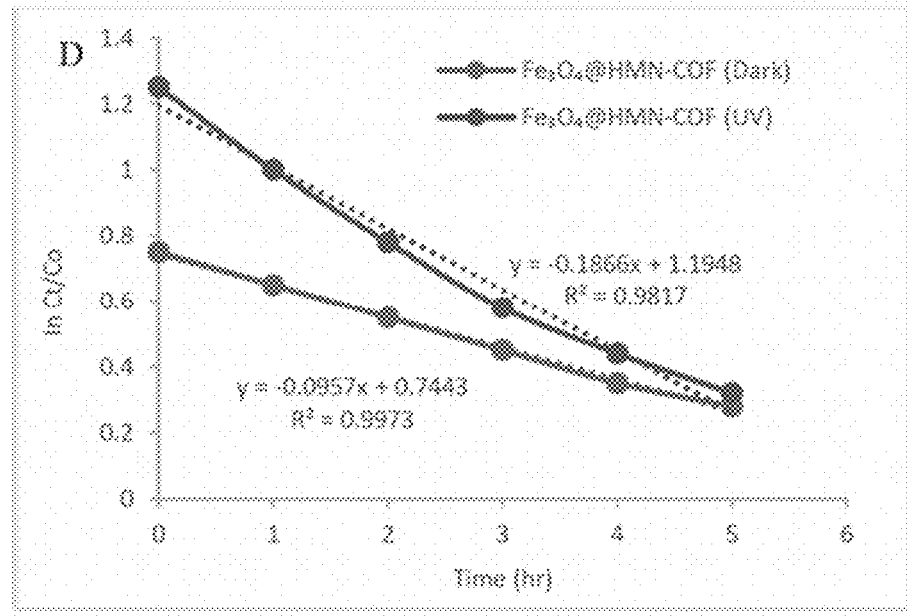
Fig. 33D - Second-order kinetic plots for the degradation of imidacloprid using $Fe_3O_4$@HMN-COF under light and dark conditions
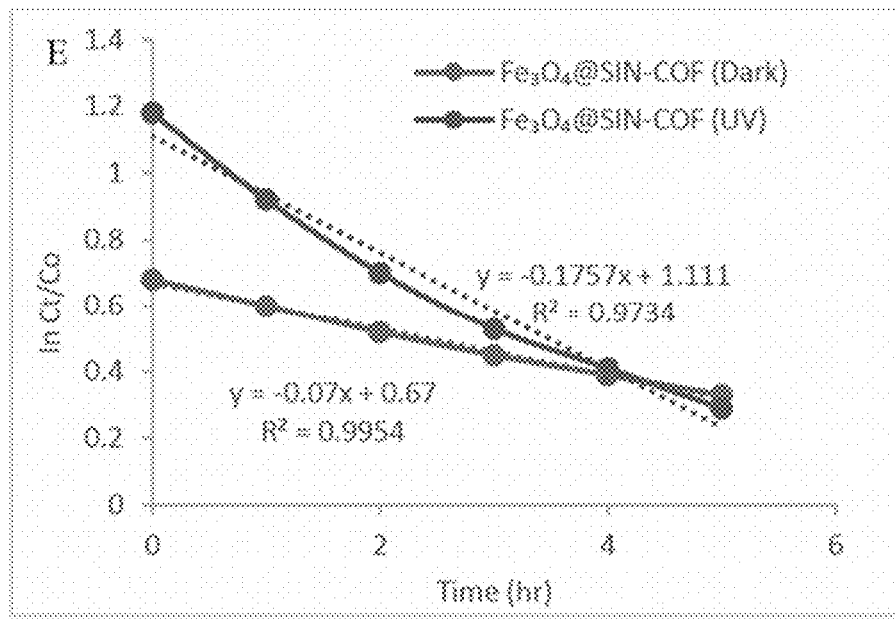
Fig. 33E - Second-order kinetic plots for the degradation of imidacloprid using $Fe_3O_4$@SIN-COF under light and dark conditions

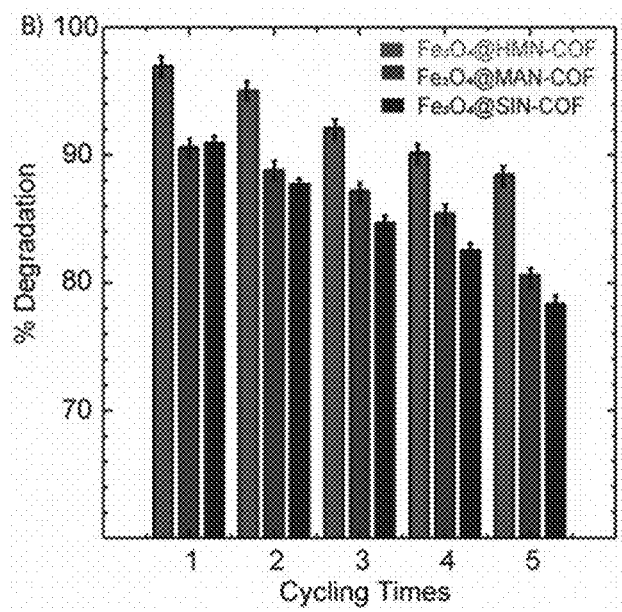
Fig. 34B - Reusability study of magnetic COFs
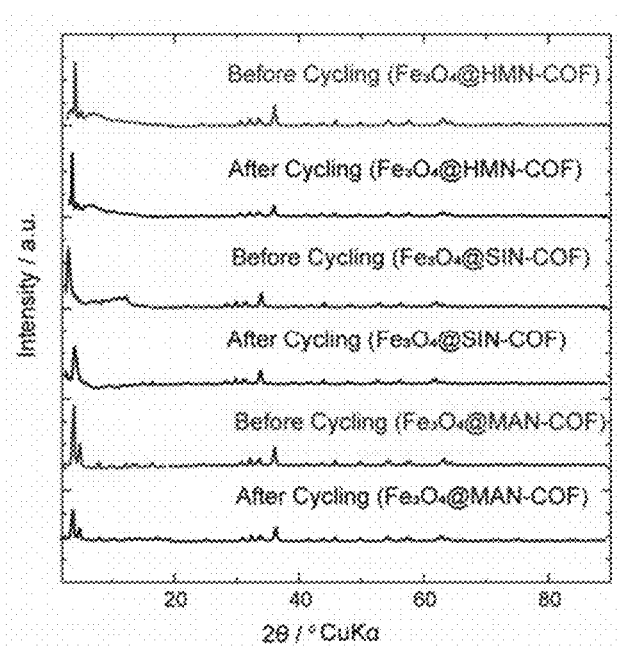
Fig. 35 - XRD patterns of $Fe_3O_4$@HMN-COF, $Fe_3O_4$@SIN-COF, and $Fe_3O_4$@MAN-COF before and after cycling

PHOTOCATALYTIC DEGRADATION AND REMOVAL OF IMIDACLOPRID INSECTICIDE USING HYDROPHILIC MAGNETIC COVALENT ORGANIC FRAMEWORKS (COFs)

FIELD OF THE INVENTION

The present invention relates to the field of environmental remediation and water treatment, and more particularly to magnetic covalent organic frameworks (COFs) functionalized with $Fe_3O_4$ nanoparticles for the removal and photocatalytic degradation of pesticide contaminants, specifically imidacloprid (IMI), from aqueous solutions.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Agriculture and agro-industries heavily depend on the use of pesticides to meet the increasing global demand for food production, driven by population growth and the commercialization of agriculture. As the pressure on fertile land for food production and bio-based products like biofuels intensifies due to population surge, pesticides play a critical role in mitigating crop losses caused by pests, achieving higher productivity. In addition to agricultural use, pesticides are widely employed in animal husbandry, domestic settings, gardens, medicine, disease management, forestry and public areas. Historically, conventional insecticides such as organophosphates, organochlorines, and carbamates were used extensively. However, their high toxicity and the development of insect resistance led to severe environmental consequences and harm to various non-target organisms. As a result, many of these insecticides have been phased out, leading to the introduction of a new generation of insecticides, including neonicotinoids, oxadiazines, fiproles, pyrroles, benzenedicarboxamides and other compounds that offer broader specificity with lower application rates.

Among these, neonicotinoids have become the most widely used insecticides globally, accounting for over 25% of the global insecticide market and generating a market value exceeding $2.6 billion due to their high efficiency and broad-spectrum pest control capabilities. Imidacloprid (IMI), one of the most commonly used neonicotinoids, represents 41% of neonicotinoid usage, accounting for a significant portion of the market. Imidacloprid is extensively used on a wide variety of crops to control pests, targeting the central nervous system of insects. It has been registered in over 120 countries and is used on about 140 crops (e.g., maize, rice, cotton, and potatoes) to control pests like planthoppers, *Aphis gossypii*, and *Nilaparvata lugens*. IMI functions by targeting the nicotinic acetylcholine receptor, damaging the central nervous system of insects, leading to abnormal behavior and death. Despite its efficacy, IMI, a widely used chlorinated organic insecticide, poses significant environmental challenges due to its persistence and accumulation in water bodies. It has a half-life ranging from 28 to 1250 days, allowing it to persist in agricultural regions' surface and groundwater. Its widespread application has led to frequent detection in surface and groundwater, where it poses a threat to aquatic life, pollinators such as honeybees, and potentially human health. The toxicity, solubility and the persistence of IMI in the environment has resulted in its inclusion in the European Surface Water Watch List, highlighting the urgency of addressing its contamination in water sources. IMI is a systemic insecticide that permeates the entire plant—root, stem, leaves, flowers, pollen, and nectar—providing extensive and long-lasting defense against pests. However, these insecticides exhibit remarkable persistence, lingering in irrigation systems, soil, and even the bodies of deceased bees, presenting prolonged risks and potential harm to pollinator insects and ecosystems. Given the escalating presence of imidacloprid residues in honey and fruits, urgent research is needed for efficient strategies to eliminate these pollutants.

To mitigate these environmental risks, various techniques have been explored to remove IMI from soil and water, including Fenton oxidation, biodegradation, advanced oxidation processes (AOPs), electrochemical methods, and adsorption. Among these methods, adsorption has emerged as a promising solution due to its simplicity, safety, and effectiveness. However, conventional adsorbents, such as carbon materials and zeolites, face limitations in terms of limited adsorption capacity, pore size issues and other structural constraints. Metal-organic frameworks (MOFs) offer some advantages but suffer from stability issues.

Covalent Organic Frameworks (COFs), composed of lightweight elements such as carbon, hydrogen, oxygen, nitrogen, and boron, provide a promising alternative due to their stability, tunable porosity, and high surface area. Despite their potential, research on using COFs for the adsorption of IMI remains limited. IMI's low octanol/water partition coefficient makes hydrophilic adsorbents necessary for effective extraction, yet many COFs are inherently hydrophobic, restricting their ability to adsorb polar compounds. Modifying COFs with functional groups such as nitro, amino, carboxyl, and hydroxyl groups can significantly enhance their hydrophilicity, improving their adsorption efficiency.

Magnetic Covalent Organic Frameworks (magnetic COFs) integrates COFs with magnetic nanoparticles, enhancing both separation efficiency and reusability. The magnetic properties allow easy recovery of the adsorbent while also increasing adsorption capacity by providing additional active sites. However, while adsorption provides an effective method for initial removal of pollutants, it does not degrade them, leaving the potential for secondary pollution/contamination.

To address this, there is a need to combine adsorption with photocatalytic degradation, which can be presented as a more comprehensive solution. Photocatalytic degradation has emerged as a highly effective technique for eliminating organic pollutants, including pesticides from environmental matrices. Traditional photocatalysts such as $TiO_2$ and ZnO are known for their efficiency, chemical stability and oxidative power, but their effectiveness is limited by the recombination of photogenerated electron-hole pairs and their reliance on UV light, which constitutes only a small portion of the solar spectrum. To overcome these limitations, researchers have developed modifications, such as doping $TiO_2$ with metals like silver or non-metals like nitrogen, to extend the photocatalysts' photoresponse to the visible light region.

Recent literature studies implies an explicit knowledge gap in addressing the persistent contamination of water bodies by imidacloprid (IMI) and the limitations of current remediation methods. This study intends to bridge this gap by developing a system for efficient removal and complete breakdown of IMI. Based on the above explained information, there exists a critical need for an advanced, multifunctional system that not only adsorbs but also degrades imidacloprid to mitigate its environmental impact effectively, overcoming the drawbacks of the traditionally employed systems. It should represent a promising solution to enhance the practicality, efficiency, and sustainability of pesticide remediation strategies in agricultural and ecological contexts.

SUMMARY OF THE INVENTION

Therefore it is an object of the present invention to propose a magnetic covalent organic framework (COF) functionalized with $Fe_3O_4$ nanoparticles for efficient adsorption and degradation of imidacloprid in aqueous solutions, enabling high adsorption capacity, rapid separation, and enhanced photocatalytic performance for sustainable pesticide remediation.

There is disclosed a magnetic covalent organic framework (COF) composition for removal and degradation of imidacloprid (IMI) from an aqueous solution, the composition comprising a covalent organic framework (COF) functionalized with $Fe_3O_4$ nanoparticles, selected from a group comprising $Fe_3O_4$@HMN-COF, $Fe_3O_4$@MAN-COF, and $Fe_3O_4$@SIN-COF, to serve as both adsorbents and photocatalysts, wherein the COF comprises a nitrogen-rich framework and a π-electron system that facilitate adsorption of the IMI via π-π interactions, hydrophobic interactions, and hydrogen bonding, wherein the $Fe_3O_4$ nanoparticles impart magnetic properties to enable magnetic separation of the COF with the adsorbed IMI from the aqueous solution using an external magnetic field, and wherein the COF optimizes photocatalytic degradation of the adsorbed IMI under light irradiation.

In an embodiment of the present invention, the magnetic COF composition has the nitrogen-rich framework comprising triazine-based and biphenyl linkers, which enhance surface area, porosity, and structural stability of the magnetic COF for improved adsorption capacity and photocatalytic degradation efficiency.

In another embodiment of the present invention, the nitrogen-rich framework enhances hydrophilicity of the magnetic COF, improving interaction with the polar IMI molecules in the aqueous solution.

According to the present disclosure, the $Fe_3O_4$ nanoparticles of the magnetic COF composition, improve electron-hole separation, enhancing the photocatalytic degradation efficiency by generating reactive oxygen species (ROS).

In an embodiment of the present invention, the adsorption kinetics follow a pseudo-second-order model, indicating chemisorption as dominant adsorption mechanism.

In an embodiment of the present invention, the magnetic COF is synthesized via Schiff base reactions and solvothermal techniques, yielding crystallinity and stability.

In another embodiment of the present invention, the magnetic COF exhibits an adsorption capacity of at least 600 mg/g for $Fe_3O_4$@HMN-COF, 480 mg/g for $Fe_3O_4$@MAN-COF, or 375 mg/g for $Fe_3O_4$@SIN-COF.

In an embodiment of the present invention, the magnetic COF exhibits a high surface area, with a BET surface area of 910 $m^2/g$ for $Fe_3O_4$@HMN-COF, 840 $m^2/g$ for $Fe_3O_4$@MAN-COF, and 670 $m^2/g$ for $Fe_3O_4$@SIN-COF.

In an embodiment of the present invention, the magnetic COF composition wherein $Fe_3O_4$@HMN-COF achieves a photocatalytic degradation efficiency of 98.5% under optimal conditions comprising a catalyst dose of 0.01 g, a pH of 11, and a temperature of 30° C. under UV light, resulting in complete mineralization of the IMI.

In an embodiment of the present invention, the magnetic COF is effective across a wide pH range, with optimal performance between pH 5 and pH 7, thereby enhancing adaptability to environmental conditions.

In another embodiment of the present invention, the magnetic separation of the magnetic COF from the aqueous solution is completed within 5-10 seconds using the external magnetic field.

In another embodiment of the present invention, the magnetic COF maintains stability up to 400° C. and is resistant to degradation in solvents.

There is disclosed a method for removal and degradation of imidacloprid (IMI) from an aqueous solution, the method comprising synthesizing a magnetic covalent organic framework (COF), selected from a group comprising $Fe_3O_4$@HMN-COF, $Fe_3O_4$@MAN-COF, and $Fe_3O_4$@SIN-COF, via functionalization of a covalent organic framework (COF) with $Fe_3O_4$ nanoparticles; adsorbing the IMI onto the magnetic COF; employing magnetic separation using an external magnetic field to isolate the magnetic COF along with the adsorbed IMI from the aqueous solution; and subjecting the adsorbed IMI to photocatalytic degradation under light irradiation, wherein the IMI is adsorbed via π-π interactions, hydrophobic interactions, and hydrogen bonding, facilitated by the magnetic COF's nitrogen-rich framework and π-electron system, and wherein the magnetic separation is enabled by the $Fe_3O_4$ nanoparticles providing magnetic properties to the COF.

In an embodiment of the present invention, the method wherein the magnetic COF is synthesized using selective nitrogen-rich linkers comprising triazine-based and biphenyl linkers, to enhances surface area, porosity, and structural stability of the magnetic COF for adsorption capacity and photocatalytic degradation efficiency.

According to the present invention, the method wherein the nitrogen-rich framework enhances hydrophilicity of the magnetic COF, improving interaction with the polar IMI molecules in the aqueous solution.

In another embodiment of the present invention, the method wherein the $Fe_3O_4$ nanoparticles improve electron-hole separation, enhancing the photocatalytic degradation efficiency by generating reactive oxygen species (ROS).

In an embodiment of the present invention, the method wherein the adsorption kinetics follow a pseudo-second-order model, indicating chemisorption as dominant adsorption mechanism.

In another embodiment of the present invention, the method wherein the magnetic COF is synthesized through Schiff base reactions and solvothermal techniques, resulting in crystallinity and stability.

In another embodiment of the present invention, the method wherein the magnetic COF achieves an adsorption capacity of at least 600 mg/g for $Fe_3O_4$@HMN-COF, 480 mg/g for $Fe_3O_4$@MAN-COF, or 375 mg/g for $Fe_3O_4$@SIN-COF and exhibits a BET surface area of 910 $m^2/g$ for $Fe_3O_4$@HMN-COF, 840 $m^2/g$ for $Fe_3O_4$@MAN-COF, and 670 $m^2/g$ for $Fe_3O_4$@SIN-COF.

In an embodiment of the present invention, the method wherein $Fe_3O_4$@HMN-COF achieves a photocatalytic degradation efficiency of 98.5% under optimal conditions comprising a catalyst dose of 0.01 g, a pH of 11, and a temperature of 30° C. under UV light, resulting in complete mineralization of the IMI.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIGS. 2A, 2B and 2C show IR spectrum, $^1$H-NMR spectrum and $^{13}$C-NMR spectrum for L1 respectively, in accordance with the present invention.

FIGS. 7A, 7B and 7C show Fourier-transform infrared (FTIR) spectra of MAN-COF, HMN-COF, and SIN-COF respectively, confirming the successful formation of the COFs.

FIG. 8 shows Thermogravimetric analysis (TGA) curves of HMN-COF, MAN-COF, and SIN-COF, indicating thermal stability, in accordance with the present invention.

FIGS. 9A, 9B and 9C show X-ray diffraction (XRD) patterns of HMN-COF, MAN-COF, and SIN-COF after treatment with various solvents and conditions, showing retained crystallinity.

FIG. 10A shows nitrogen adsorption-desorption isotherms for HMN-COF, MAN-COF, and SIN-COF, indicating surface area and porosity; FIG. 10B shows the pore size distribution of the COFs, showing distinct pore widths for each framework; and FIG. 10C shows XRD patterns of HMN-COF, MAN-COF, and SIN-COF, confirming crystalline structures, in accordance with the present invention.

FIG. 11A shows FTIR spectra of MAN-COF, $Fe_3O_4$, and $Fe_3O_4$@MAN-COF; FIG. 11B shows FTIR spectra of HMN-COF, $Fe_3O_4$, and $Fe_3O_4$@HMN-COF; FIG. 11C shows FTIR spectra of SIN-COF, $Fe_3O_4$, and $Fe_3O_4$@SIN-COF, in accordance with the present invention.

FIG. 11D shows XRD patterns of $Fe_3O_4$ and $Fe_3O_4$-functionalized COFs ($Fe_3O_4$@HMN-COF, $Fe_3O_4$@MAN-COF, and $Fe_3O_4$@SIN-COF), in accordance with the present invention.

FIGS. 12A, 12B and 12C show nitrogen adsorption-desorption isotherms for HMN-COF, MAN-COF, SIN-COF, and their respective $Fe_3O_4$-functionalized counterparts ($Fe_3O_4$@HMN-COF, $Fe_3O_4$@MAN-COF, $Fe_3O_4$@SIN-COF), compared to $Fe_3O_4$.

FIGS. 14A, 14B and 14C show XPS spectra of Fe 2p for $Fe_3O_4$@MAN-COF, $Fe_3O_4$@HMN-COF, and $Fe_3O_4$@SIN-COF respectively, showing binding energy peaks at Fe $2p_{1/2}$ and Fe $2p_{3/2}$ for each sample compared to $Fe_3O_4$.

FIG. 15 shows zeta potential vs. pH for $Fe_3O_4$@MAN-COF, $Fe_3O_4$@HMN-COF, and $Fe_3O_4$@SIN-COF, in accordance with the present invention.

FIG. 16A shows the effect of pH on the adsorption capacity ($q_e$) of $Fe_3O_4$@HMN-COF, $Fe_3O_4$@MAN-COF, and $Fe_3O_4$@SIN-CO, in accordance with the present invention.

FIGS. 16B, 16C and 16D are graphs showing the relationship between adsorbent dosage, and adsorption capacity ($q_e$) and removal efficiency (%) for $Fe_3O_4$@HMN-COF, $Fe_3O_4$@MAN-COF, and $Fe_3O_4$@SIN-COF respectively, in accordance with the present invention.

FIG. 17 shows the adsorption capacity ($q_e$) of $Fe_3O_4$@HMN-COF, $Fe_3O_4$@MAN-COF, and $Fe_3O_4$@SIN-COF as a function of NaCl concentration ($C_{NaCl}$).

FIG. 18A and FIG. 18 B show adsorption kinetics and adsorption isotherms of $Fe_3O_4$@HMN-COF, $Fe_3O_4$@MAN-COF, and $Fe_3O_4$@SIN-COF, in accordance with the present invention.

FIG. 18C shows the effect of temperature on $q_e$ for $Fe_3O_4$@HMN-COF, $Fe_3O_4$@MAN-COF, and $Fe_3O_4$@SIN-COF while FIG. 18D shows the Van't Hoff plot of $Fe_3O_4$@HMN-COF, $Fe_3O_4$@MAN-COF, and $Fe_3O_4$@SIN-COF.

FIGS. 19A and 19B present the pseudo-second-order and pseudo-first-order diffusion model plots for $Fe_3O_4$@MAN-COF, respectively; FIGS. 19C and 19D illustrate the pseudo-second-order and pseudo-first-order diffusion model plots for $Fe_3O_4$@HMN-COF, respectively; FIGS. 19E and 19F show the pseudo-second-order and pseudo-first-order diffusion model plots for $Fe_3O_4$@SIN-COF, respectively, according to the disclosed invention.

FIGS. 20A and 20B present the Linearized Langmuir isotherms and Linearized Freundlich isotherms for iodine adsorption on $Fe_3O_4$@MAN-COF; FIGS. 20C and 20D illustrate Linearized Langmuir isotherms and Linearized Freundlich isotherms for iodine adsorption on $Fe_3O_4$@HMN-COF; FIGS. 20E and 20F show Linearized Langmuir isotherms and Linearized Freundlich isotherms for iodine adsorption on $Fe_3O_4$@SIN-COF, according to the disclosed invention.

FIG. 21 shows percentage removal efficiency of pure $Fe_3O_4$ nanoparticles, different COF samples and their mixtures with iron nanoparticles at ratios of 1:1, 2:1, and 1:2, in accordance with the present invention.

FIG. 23A shows adsorption capacity ($q_e$, mg/g) of $Fe_3O_4$@HMN-COF, $Fe_3O_4$@MAN-COF, and $Fe_3O_4$@SIN-COF over multiple cycling times; FIGS. 23B, 23C and 23D show FT-IR spectra of $Fe_3O_4$@HMN-COF, $Fe_3O_4$@MAN-COF, and $Fe_3O_4$@SIN-COF respectively, before and after adsorption of imidacloprid, in accordance with the present invention.

FIG. 24 shows adsorption capacities ($q_e$, mg/g) of $Fe_3O_4$@HMN-COF, $Fe_3O_4$@MAN-COF, and $Fe_3O_4$@SIN-COF in honey, apple, pear, and strawberry.

FIGS. 25A, 25B and 25C show XPS spectra and atomic percentages of C 1S, N 1S, and O 1S for $Fe_3O_4$@MAN-COF, $Fe_3O_4$@HMN-COF, and $Fe_3O_4$@SIN-COF composites respectively.

FIGS. 25D, 25E and 25F show XPS spectra and atomic percentages of C 1S, N 1S, O 1S and Cl 2p for Fe$_3$O$_4$@MAN-COF, Fe$_3$O$_4$@HMN-COF, and Fe$_3$O$_4$@SIN-COF composites respectively, in accordance with the present invention.

FIG. 26A-26B, FIG. 26C-26D, and FIG. 26E-26F show XPS C 1s spectra for Fe$_3$O$_4$@HMN-COF, Fe$_3$O$_4$@MAN-COF, and Fe$_3$O$_4$@SIN-COF before and after adsorption of Imidacloprid respectively, in accordance with the present invention.

FIG. 27 shows the percentage degradation of Imidacloprid using Fe$_3$O$_4$@HMN-COF, Fe$_3$O$_4$@MAN-COF, and Fe$_3$O$_4$@SIN-COF at different catalyst compositions (1:1, 1:2, and 2:1).

FIGS. 28A, 28B, 28C and 28D show degradation of Imidacloprid over time using Fe$_3$O$_4$@HMN-COF, Fe$_3$O$_4$@MAN-COF, Fe$_3$O$_4$@SIN-COF and without catalyst respectively, under light and dark conditions, in accordance with the present invention.

FIGS. 29A, 29B and 29C show degradation efficiency of Imidacloprid at various concentrations (10-50 mg/L) under light and dark conditions using Fe$_3$O$_4$@HMN-COF, Fe$_3$O$_4$@MAN-COF, and Fe$_3$O$_4$@SIN-COF respectively, in accordance with the present invention.

FIGS. 30A, 30B and 30C show degradation efficiency of Imidacloprid at various catalyst dosages (0.01-0.05 g) under light and dark conditions using Fe$_3$O$_4$@HMN-COF, Fe$_3$O$_4$@MAN-COF, and Fe$_3$O$_4$@SIN-COF, in accordance with the present invention.

FIGS. 31A, 31B and 31 C show degradation efficiency of Imidacloprid at various pH levels (2-10) under light and dark conditions using Fe$_3$O$_4$@HMN-COF, Fe$_3$O$_4$@MAN-COF, and Fe$_3$O$_4$@SIN-COF respectively, in accordance with the present invention.

FIGS. 32A, 32B and 32C show degradation efficiency of Imidacloprid at various temperatures (20° C. to 40° C.) under light and dark conditions using Fe$_3$O$_4$@HMN-COF, Fe$_3$O$_4$@MAN-COF, and Fe$_3$O$_4$@SIN-COF respectively, in accordance with the present invention.

FIGS. 33A and 33B show kinetic plots for the degradation of imidacloprid without a catalyst under dark and light conditions respectively, in accordance with the present invention.

FIGS. 33C, 33D and 33E show Second-order kinetic plots for the degradation of imidacloprid using Fe$_3$O$_4$@MAN-COF, Fe$_3$O$_4$@HMN-COF and Fe$_3$O$_4$@SIN-COF respectively, under light and dark conditions, in accordance with the present invention.

FIG. 34B shows reusability study of magnetic COFs, in accordance with the present invention.

FIG. 35 shows XRD patterns of Fe$_3$O$_4$@HMN-COF, Fe$_3$O$_4$@SIN-COF, and Fe$_3$O$_4$@MAN-COF before and after cycling, in accordance with the present invention.

DETAILED DESCRIPTION OF THE INVENTION

Figure 1:
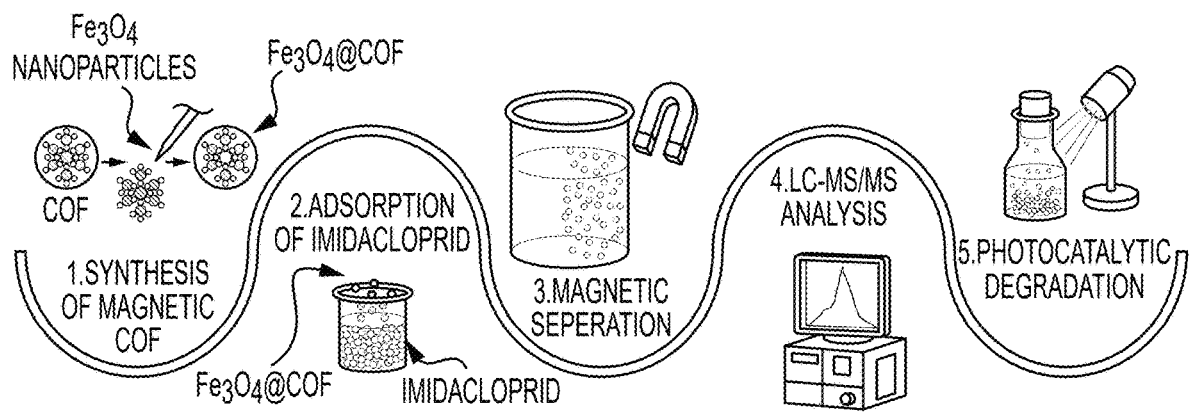
FIG. 1 shows the schematic illustration depicting the process involving synthesis of magnetic COFs containing $Fe_3O_4$ nanoparticles, adsorption of imidacloprid onto the magnetic COFs, and photocatalytic degradation under light irradiation, in accordance with the present invention.

The aspects of the proposed hydrophilic magnetic covalent organic frameworks (COFs) for imidacloprid (IMI) removal and degradation from water-according to the present invention will be described in conjunction with FIGS. 1-35. In the Detailed Description, reference is made to the accompanying figures, which form a part hereof, and which is shown by way of illustration specific embodiments by which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

The present invention proposes a series of magnetic covalent organic frameworks (COFs) functionalized with Fe$_3$O$_4$ nanoparticles, designated as Fe$_3$O$_4$@HMN-COF, Fe$_3$O$_4$@MAN-COF, and Fe$_3$O$_4$@SIN-COF. These COFs serve as highly efficient adsorbents for the removal of the pesticide imidacloprid (IMI) from water or aqueous solutions. The structure of these COFs is characterized by nitrogen-rich frameworks and extensive π-electron systems, which enhances adsorption through π-π interactions, hydrophobic interactions, and hydrogen bonding. The magnetic properties of the proposed COFs enable easy separation from water, offering practicality and scalability. The primary purpose of this invention is to address the environmental challenges from the widespread use of imidacloprid (IMI), a persistent pesticide with low natural removal efficiency. The invention aims to provide an effective, efficient, and sustainable solution for removing IMI from contaminated water sources by utilizing the proposed magnetic COFs. By optimizing the enhanced adsorption capacities and easy separability, these COFs position themselves as a promising tool for sustainable environmental remediation. In another embodiment of the invention, the COFs optimize the photocatalytic degradation of IMI, thereby delivering a comprehensive approach to pesticide pollution mitigation. The dual functionality of or the combination of adsorption and photocatalytic degradation ensures a thorough and efficient remediation process, ultimately minimizing the environmental impact of pesticide contamination.

According to the disclosure, the invention presents a novel method for the adsorption and degradation of imidacloprid using hydrophilic magnetic COFs as effective agents. The hydrophilic nature of functionalized COFs enhances their interaction with polar imidacloprid molecules, promoting efficient adsorption and subsequent degradation. The magnetic properties of the COFs enable easy separation of the catalyst from the reaction mixture, improving the overall efficiency and sustainability of the process. Magnetic covalent organic frameworks (COFs) serve as promising photocatalysts due to their high surface area, structural tunability, and stability. By integrating magnetic nanoparticles into COFs, a hybrid material is created that boosts photocatalytic activity and facilitates easy recovery and reuse through magnetic separation. These magnetic COFs exhibit excellent photocatalytic properties, with their high surface area offering numerous active sites for adsorption and degradation of pollutants. Additionally, the combination with magnetic particles improves electron-hole separation, enhancing ROS generation.

According to an embodiment of the invention, FIG. 1 schematically illustrates the process involving Magnetic COFs, starting with the synthesis of Magnetic COF containing Fe$_3$O$_4$ nanoparticles (referred to as Fe$_3$O$_4$@COF). This is followed by the adsorption of imidacloprid onto Fe$_3$O$_4$@COF, after which the adsorbed complex undergoes magnetic separation. The adsorbed imidacloprid is then analysed using Liquid Chromatography-Mass Spectrometry (LC-MS/MS), and in another embodiment, the imidacloprid is subjected to photocatalytic degradation under light irradiation. As illustrated in FIG. 1, the process involves several key steps: adsorbing imidacloprid onto the magnetic COFs, employing magnetic separation of the COF-adsorbed complex to isolate the magnetic COFs, and eluting the pesticide for analysis via Liquid Chromatography-Mass Spectrometry (LC-MS). Additionally, in an embodiment of the invention, the performance of these COFs is assessed in real-world samples, such as honey and fruit, to verify their practical application. The COFs' effectiveness in photocatalytic degradation is also evaluated, leveraging their high surface area, structural tunability, and magnetic properties to enhance the overall imidacloprid degradation process.

The significance of the invention is that it addresses the persistent issue of imidacloprid (IMI) contamination in water by developing an effective and practical solution using magnetic covalent organic frameworks (COFs) that offer several advantages over existing methods. Their nitrogen-rich structures and extensive π-electron systems facilitate multiple interaction mechanisms with IMI, including π-π interactions, hydrophobic interactions, and hydrogen bonding. As a result, they exhibit high adsorption capacities-600 mg/g for $Fe_3O_4$@HMN-COF, 480 mg/g for $Fe_3O_4$@MAN-COF, and 375 mg/g for $Fe_3O_4$@SIN-COF. The magnetic properties of the COFs allow for easy and rapid separation from water using an external magnetic field, enhancing their practical application. In an embodiment, reusability tests demonstrate minimal capacity loss over multiple repeated cycles, underscoring their cost-effectiveness and sustainability. The COFs have also been tested in real-world samples such as honey and fruit, confirming their high efficacy and versatility across different matrices.

Furthermore, the invention is crucial due to its ability to facilitate the optimized photocatalytic degradation of IMI under UV light, which enhances the comprehensive remediation effectiveness of these materials. The invention thereby, provides a highly efficient method for removing IMI from water, addressing the limitations of conventional adsorption materials like activated carbon. By effectively eliminating a persistent pesticide from water sources, the invention mitigates ecological damage and reduces potential health risks associated with IMI exposure. The magnetic COFs offer a practical solution that is easy to implement and scale, making them ideal for widespread use in water treatment facilities. By combining adsorption with photocatalytic degradation, this approach ensures both the removal and complete breakdown of IMI, providing a comprehensive and robust method for pesticide remediation.

This invention introduces magnetic Covalent Organic Framework (COF) functionalized with $Fe_3O_4$ nanoparticles, referred to as $Fe_3O_4$@COF, offering several distinguishing features compared to existing technologies. One of the main features is Magnetic Functionalization wherein, the integration of $Fe_3O_4$ nanoparticles into covalent organic frameworks (COFs) imparts magnetic properties and creates magnetic COFs-$Fe_3O_4$@HMN-COF, $Fe_3O_4$@MAN-COF, and $Fe_3O_4$@SIN-COF. The magnetic properties of these COFs enable easy and efficient separation from water using an external magnetic field, typically within 5-10 seconds. This feature significantly simplifies the process of removing COFs from treated water, improving operational efficiency and reducing complexity.

Another feature of the magnetic COFs is their Enhanced Structural Design. These COFs are engineered with nitrogen-rich frameworks, enhancing adsorption capacity through multiple interaction mechanisms such as π-π interactions, hydrophobic interactions, and hydrogen bonding. Characterization via Fourier-transform infrared (FT-IR) analysis, X-ray diffraction (XRD) analysis, and nitrogen sorption isotherms confirms the high hydrophilicity and large surface areas of $Fe_3O_4$@HMN-COF, $Fe_3O_4$@MAN-COF, and $Fe_3O_4$@SIN-COF. These properties are critical for effective and stable IMI adsorption, contributing significantly to the materials' overall stability, efficiency, and improved design for enhanced adsorption.

The magnetic COFs exhibit superior adsorption capacities. The adsorption capacities of the magnetic COFs are notably high, with values of 600 mg/g for $Fe_3O_4$@HMN-COF, 480 mg/g for $Fe_3O_4$@MAN-COF, and 375 mg/g for $Fe_3O_4$@SIN-COF-far exceeding those of conventional adsorbents such as activated carbon, making this invention a significant advancement in the field of adsorption technology. The magnetic COFs demonstrate enhanced practicality and reusability as well. The COFs retain high adsorption efficiency over multiple cycles of use, with minimal capacity loss which underscores their cost-effectiveness and sustainability. Their ability to be reused without significant loss of efficiency enhances their practicality for large-scale water treatment applications. The COFs have exhibited high efficacy and versatility. The COFs when tested in real-world samples including honey and fruit, showcases their adaptability and effectiveness in diverse matrices. This versatility is not commonly found in existing adsorption materials, making this invention highly adaptable to various real-world scenarios.

The features of the invention also include the optimization of photocatalytic degradation wherein the invention optimizes photocatalytic degradation of IMI using the magnetic COFs under UV light. $Fe_3O_4$@HMN-COF, in particular, achieves 98.5% degradation efficiency under optimal conditions (10 mg/L IMI, 0.01 g catalyst dose, pH 11, 30° C., UV light), resulting in the complete mineralization of IMI. This dual functionality of adsorption and photocatalytic degradation provides a comprehensive solution for pesticide remediation. The magnetic COFs also exhibit adaptability to a wide pH range. The $Fe_3O_4$@HMN-COF, in particular, demonstrates effective performance across a wide pH range, ensuring its applicability in various water conditions and in diverse environmental settings. This versatility in maintaining high adsorption efficiency over a broad pH spectrum sets it apart from other adsorbents. In addition, by combining high adsorption capabilities of COFs with the case of magnetic separation and the enhanced efficiency of photocatalytic degradation, this invention offers a robust and sustainable solution for remediating imidacloprid-contaminated water. It addresses critical environmental challenges that existing methods fail to solve, providing a comprehensive and effective solution in the field of environmental remediation.

According to an embodiment of the invention, the adsorption of Imidacloprid (IMI) insecticide using magnetic Covalent Organic Frameworks (COFs) has proven to be highly effective, with $Fe_3O_4$-functionalized COFs showing substantial results for environmental remediation. The selection of specific linkers, such as triazine-based and biphenyl linkers, enhances the COFs' chemical properties, contributing to high surface area, porosity, and structural stability. In an embodiment of the disclosure, three COFs—MAN-COF, HMN-COF, and SIN-COF—are synthesized using Schiff base reactions and solvothermal techniques, leading to structures with exceptional stability and porosity. In another embodiment, FT-IR and Thermogravimetric analysis (TGA) analyses confirm the successful synthesis and robust stability of these COFs, which maintain their structural integrity up to 400° C. in nitrogen and in various solvents. BET analysis reveals surface areas of 840 m²/g, 910 m²/g, and 670 m²/g for MAN-COF, HMN-COF, and SIN-COF, respectively. X-ray diffraction (XRD) confirm their high degree of crystallinity.

According to the disclosure, the COFs undergo magnetic functionalization in an embodiment. $Fe_3O_4$ nanoparticles are incorporated into the COFs, imparting magnetic properties while slightly reducing surface areas. In different embodiments of the invention, the integration of $Fe_3O_4$ nanoparticles is confirmed via FT-IR and XRD. In another embodiment of the invention, VSM measurements conducted demonstrate that $Fe_3O_4$@HMN-COF, $Fe_3O_4$@MAN-COF, and $Fe_3O_4$@SIN-COF retain sufficient magnetic properties for rapid separation from aqueous solutions. BET surface area measurements of the magnetic COFs show reduced values compared to their pure forms (non-magnetic COFs), indicating successful integration of $Fe_3O_4$ nanoparticles.

In an embodiment of the invention, adsorption studies of Imidacloprid are conducted across varying pH levels, with optimal adsorption observed at pH 5 for $Fe_3O_4$@HMN-COF, pH 6 for $Fe_3O_4$@MAN-COF, and pH 7 for $Fe_3O_4$@SIN-COF. Higher adsorbent dosages improve removal efficiency but reduces adsorption capacity. In another embodiment, adsorption kinetic studies indicate that adsorption follows a Pseudo-Second-Order model, suggesting chemisorption as the dominant mechanism, with experimental adsorption capacities of 600 mg/g for $Fe_3O_4$@HMN-COF, 480 mg/g for $Fe_3O_4$@MAN-COF, and 375 mg/g for $Fe_3O_4$@SIN-COF. In an instance of the disclosure, adsorption isotherms and thermodynamics are analysed. The Langmuir isotherm model provides the best fit for the adsorption data, suggesting monolayer adsorption on a homogeneous surface. Thermodynamic analyses confirm the spontaneous and endothermic nature of the adsorption process, with negative Gibbs free energy ($\Delta G$ less than zero) values across all temperatures. Enthalpy ($\Delta H$) values indicate physisorption for $Fe_3O_4$@HMN-COF and $Fe_3O_4$@MAN-COF, while $Fe_3O_4$@SIN-COF exhibits chemisorption behavior.

Another embodiment of the invention analyses photocatalytic degradation exhibited by COFs. The COFs demonstrate high photocatalytic efficiency for degrading Imidacloprid under optimal conditions. $Fe_3O_4$@HMN-COF achieves the highest degradation efficiency, with 98.5% removal under visible light. The optimal $Fe_3O_4$ content is determined to be at a 1:1 ratio, which improves photocatalytic performance by enhancing electron-hole separation. Photocatalytic degradation is also influenced by various factors such as time, catalyst dose, pH, temperature, and concentration of Imidacloprid. An embodiment of the invention involves reusability and stability analyses. $Fe_3O_4$@HMN-COF maintains its high adsorption capacity over multiple use cycles, demonstrating excellent reusability. XRD analysis confirm that the COFs retain their structural integrity after repeated cycles, making them suitable for long-term environmental applications.

In an embodiment, practical applications of the invention are studied. Testing in complex matrices, including honey and fruit samples (apples, pears, strawberries) reveal high adsorption efficiency with minimal loss of performance. This indicates the COFs' potential for real-world applications. $Fe_3O_4$@HMN-COF emerges as the most versatile and effective adsorbent, especially in honey samples, with the highest observed adsorption capacities. In conclusion, $Fe_3O_4$-functionalized COFs, particularly $Fe_3O_4$@HMN-COF, demonstrates outstanding efficiency in adsorbing Imidacloprid and shows potential for environmental remediation. With their superior adsorption capacity, stability, reusability, and high photocatalytic degradation efficiency, these materials present highly promising candidates for the mitigation of pesticide contamination in water sources.

The distinctive features of $Fe_3O_4$@COFs offer multiple significant benefits that enhance its impact and utility in environmental remediation: 1) Faster Operation: The magnetic properties of the COFs enable rapid separation from water using an external magnetic field, typically within 5-10 seconds. This quick separation process substantially reduces treatment time, enhancing both operational speed and efficiency. 2) High Efficiency: The exceptional adsorption capacities—600 mg/g for $Fe_3O_4$@HMN-COF, 480 mg/g for $Fe_3O_4$@MAN-COF, and 375 mg/g for $Fe_3O_4$@SIN-COF—ensure highly effective removal of imidacloprid (IMI) from water. This results in superior performance compared to traditional adsorbents, such as activated carbon. 3) Cost-Effectiveness: The magnetic COFs exhibit minimal capacity loss over multiple reuse cycles, which extends their longevity and reduces replacement frequency. This reusability contributes to significant long-term cost savings in water treatment processes, enhancing the economic viability of these materials. 4) Versatility: Tested in real-world samples, including honey and fruit, the COFs demonstrate high efficacy and adaptability across various matrices. This versatility makes them suitable for diverse applications, including agricultural runoff treatment and industrial wastewater purification. 5) Comprehensive Remediation: The dual functionality of adsorption and photocatalytic degradation provides a thorough and complete remediation solution. Optimized photocatalytic degradation under UV light achieves 98.5% efficiency, resulting in the full mineralization of IMI. This ensures that harmful pesticides are fully broken down and removed from water sources. 6) Adaptability: The $Fe_3O_4$@HMN-COF, in particular, exhibits effective performance across a wide pH range, making it adaptable to different water conditions. This flexibility enhances the practical application of these COFs in diverse environmental settings, making them suitable for a broad spectrum of water treatment scenarios.

In an embodiment of the invention, COFs with highly effective Imidacloprid insecticide adsorption capacity are designed, which critically depends on selecting the right linkers. The chosen linkers for preparing COFs are selected for their unique chemical properties, making them ideal for adsorbing Imidacloprid insecticides. The triazine-based linker 4,4',4"-(1,3,5-triazine-2,4,6-triyl) tribenzaldehyde offers high nitrogen content, enhancing affinity for Imidacloprid through hydrogen bonding and π-π interactions, while its aromatic structure provides a high surface area and porosity. The 2,5-bis(2-methoxyethoxy) terephthalohydrazide linker contains hydrophilic methoxyethoxy groups that improve the COF's hydrophilicity, making it more effective at adsorbing polar Imidacloprid and offers multiple binding sites through the terephthalohydrazide moiety. The biphenyl-based linker 4,4'-diamino-[1,1'-biphenyl]-2,2'-dicarboxylic acid provides rigidity and stability, with amino and carboxylic acid groups enhancing interactions with Imidacloprid via hydrogen bonding and electrostatic interactions. The 2,4,6-trihydroxybenzene-1,3,5-tricarbaldehyde linker increases the number of active sites for binding Imidacloprid, improving adsorption capacity, and forms a robust framework. Lastly, the 3,3'-dihydroxy-[1, l'-biphenyl]-4,4'-dicarbaldehyde linker introduces hydroxyl groups, enhancing hydrophilicity and aiding in the adsorption of polar compounds, while the biphenyl structure ensures stability and rigidity. In an embodiment, three COFs with outstanding stability and porosity, are designed and created by Schiff base reactions. The detailed synthesis methods for organic linkers, including reagents, reaction conditions, and purification techniques, are outlined in the following sections. In an embodiment of the invention, a solvothermal technique is employed to create the three targeted COFs, using acetic acid as a catalyst. The building blocks are suspended in a mixture of solvents, either mesitylene/1,4-dioxane or o-dichlorobenzene/n-butanol and exposed to solvothermal conditions at 120° C. for five days.

In an embodiment of the invention, comprehensive characterization analytical techniques, such as spectroscopic analysis, are employed to confirm the successful synthesis and stability of the COFs. Thin-layer chromatography is performed on silica gel glass plates (Silica gel, 60 F254), and column chromatography is conducted using Kieselgel S (silica gel S, 0.063-0.1 mm). Melting points are determined using a Gallenkamp apparatus and are corrected. Elemental analysis is carried out with a Leco Model CHN-600 elemental analyzer. Fourier-transform infrared (FTIR) spectra are obtained using KBr pellets on a Thermo Nicolet model 470 FT-IR spectrophotometer. Nuclear magnetic resonance (NMR) spectra are recorded on a Varian-400 MHz spectrometer ($^1$H-NMR at 400 MHz and $^{13}$C-NMR at 100 MHZ) with dimethyl sulfoxide-$d_6$ (DMSO-$d_6$) as the solvent. Tetramethylsilane (TMS) serves as an internal reference, with chemical shifts reported in parts per million (δ values, ppm). Scanning electron microscopy (SEM) images are acquired using an FEI SEM Quanta Inspect S50 scanning electron microscope (ThermoFisher PN1113094) operated at an accelerating voltage of 15-30 kV. Powder X-ray diffraction (PXRD) analysis is conducted on a Shimadzu-6100 PXRD diffractometer with Cu-Kα radiation (λ=1.542 Å). Diffraction data are collected within the 2θ range of 20-50° at a rate of 1° C./min, under room temperature and atmospheric pressure. Nitrogen sorption measurements and pore size analyses are performed using a PMI BET Sorptometer (BET-201-AEL) with measurements at 77 K using a liquid nitrogen bath. Thermogravimetric analysis (TGA) is conducted on a 0.2 g sample, heated to 600° C. at a rate of 5° C./min, to monitor weight changes as a function of temperature. Liquid chromatography with tandem mass spectrometry (LC-MS/MS) is performed using an Agilent 6460 Triple Quad LC/MS system for detailed compound analysis. Gas Chromatography-Mass Spectrometry (GC-MS) is performed using an Agilent 7890B GC System coupled with a 5977B Mass Selective Detector.

Figure 2A:
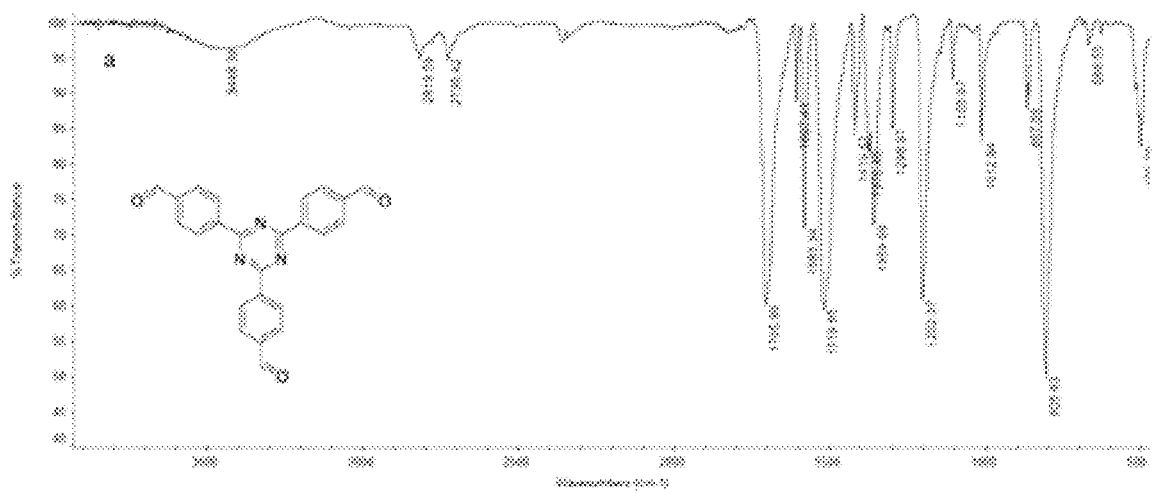

The disclosure discusses the synthesis of raw materials in different embodiments. 4,4',4''-(1,3,5-triazine-2,4,6-triyl) tribenzaldehyde (L1) is synthesized in an embodiment, as represented in Scheme 1. To a solution of 4 g (22 mmol) of 4-bromobenzonitrile at 0° C., 3.54 mL (6 g, 40 mmol) of trifluoromethanesulfonic acid is slowly added and stirred for 30 minutes. The mixture is then stirred at room temperature overnight. The resulting mixture is washed with 100 mL of deionized water and filtered under vacuum, yielding 3.95 g of a white solid with a 99% yield. A portion of the product (1.46 g, 3 mmol) is dissolved in 250 mL of dry THF (Tetrahydrofuran) under a nitrogen atmosphere. 12 mL (30 mmol) of n-BuLi is added dropwise to this solution at −78° C. while stirring. After stirring for 3 hours, 5 mL of DMF (Dimethylformamide) is added to the red solution at −78° C., and the reaction mixture is further stirred for an additional 12 hours at room temperature. The mixture is then acidified with 50 mL of 3 M HCl aqueous solution. The organic volatiles are partially removed by evaporation under reduced pressure, and the product is then extracted with CHCl$_3$. The organic layer is washed with brine, dried over Na$_2$SO$_4$, and concentrated in vacuo. Recrystallization from a mixture of petroleum ether and CH$_2$Cl$_2$ affords L1 as a white solid with a 64% yield. FIGS. 2A, 2B and 2C depict IR spectrum, $^1$H-NMR spectrum and $^{13}$C-NMR spectrum for L1; IR (KBr, cm$^{-1}$): 1705 (C=O), 1607 (C=N), 1583 (C=C); $^1$H-NMR (DMSO-$d_6$, 400 MHZ) (δ, ppm): 8.17 (d, 2H, aromatic), 8.96 (d, 2H, aromatic), 10.17 (s, 3H, CHO); $^{13}$C-NMR (DMSO-$d_6$, 100 MHz) (δ, ppm): 115.5, 117.0, 131.4, 132.4, 147.6 and 170.0.

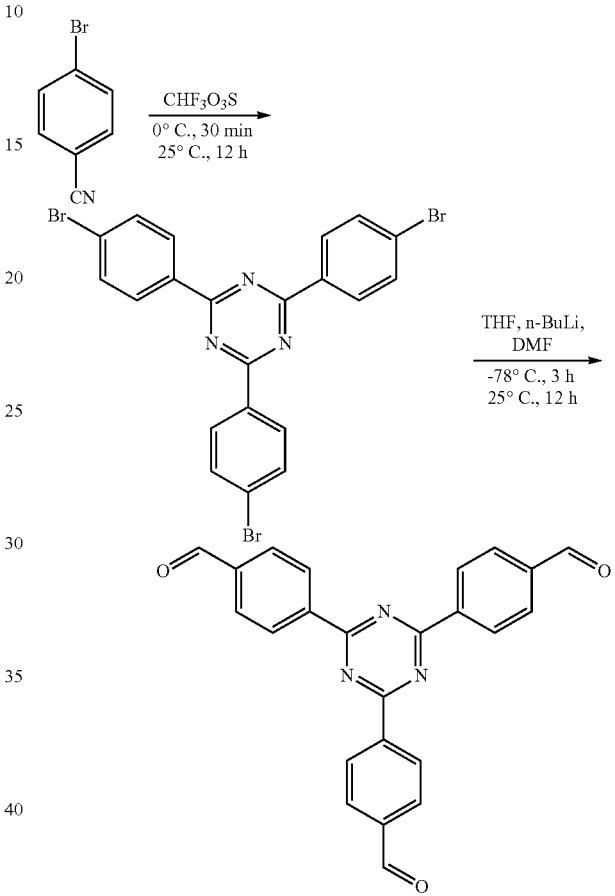

Scheme 1. Synthesis of L1

Figure 3A:
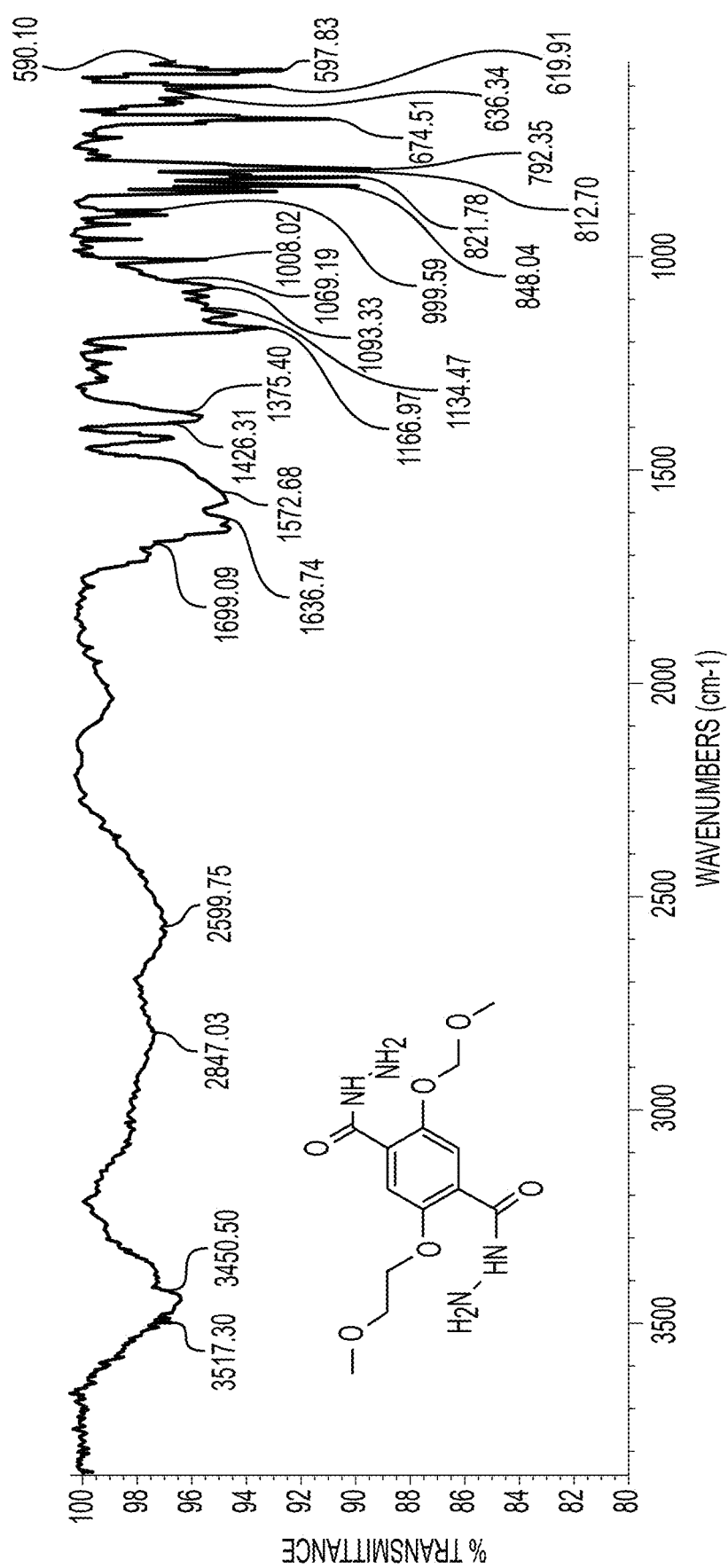
FIGS. 3A, 3B and 3C show IR spectrum, $^1$H-NMR spectrum and $^{13}$C-NMR spectrum for L2 respectively, in accordance with the present invention.
Figure 3B:
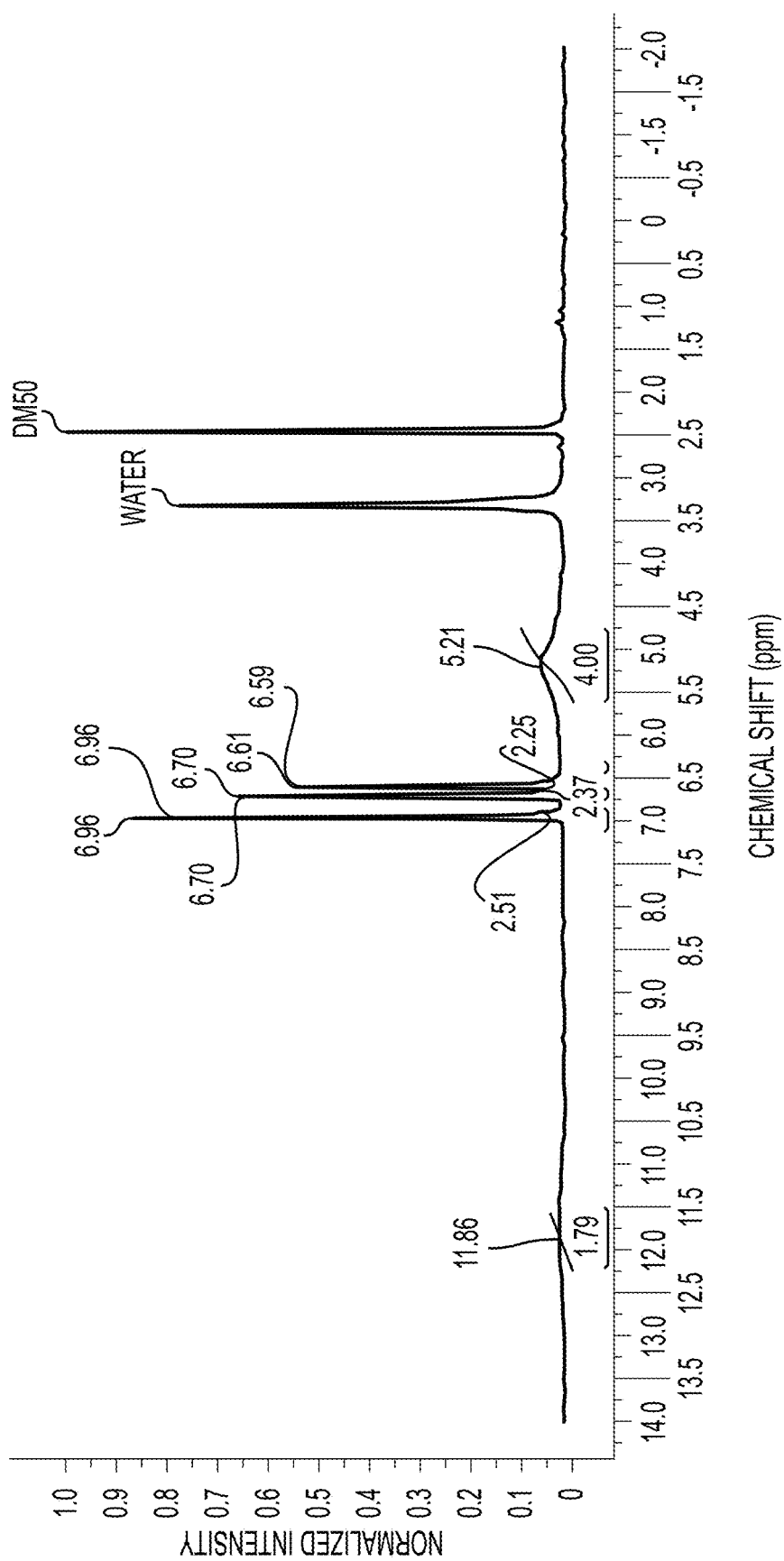
Figure 3C:
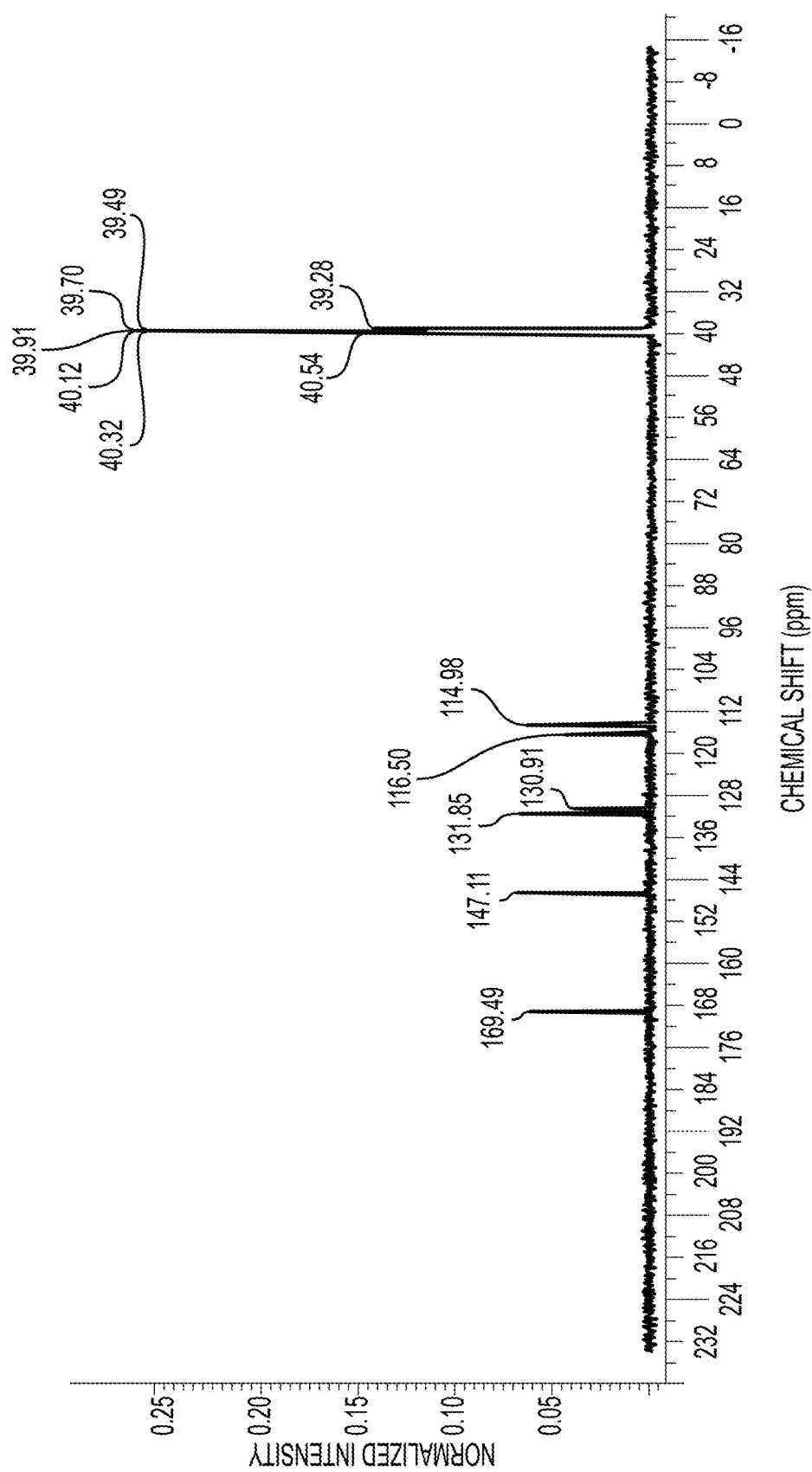

In another embodiment of the invention, 2,5-bis(2-methoxyethoxy) terephthalohydrazide (L2) is synthesized, as represented in Scheme 2. A solution of compound 1 (3 g, 15.2 mmol) in ethanol (60 mL) is carefully added to concentrated H$_2$SO$_4$ (12 mL) and refluxed at 84° C. for 18 hours. The mixture is then filtered and washed with iced water. The resulting product is dried, yielding a 96% recovery. Compound 2 (1.20 g, 4.76 mmol), Cs$_2$CO$_3$ (10.41 g, 31.90 mmol), and 2-bromoethyl methyl ether (1.39 g, 10.00 mmol) are suspended in acetone (42 mL). The mixture is then refluxed at 60° C. until the starting material disappeared, as monitored by TLC. After filtering the mixture and evaporating the solvent, the residue is dissolved in CH$_2$Cl$_2$, washed with water, and dried over Na$_2$SO$_4$. The solvent is removed under reduced pressure, yielding the crude product. This crude product is purified by column chromatography using a petroleum ether/ethyl acetate mixture (v/v=6:1), resulting in the target product 3 as a white solid with a 56% yield. Compound 3 (0.85 mg, 2.3 mmol), hydrazine hydrate (21.6 mL, 61.9 mmol), and ethanol (36 mL, 48.4 mmol) are added to a flask and refluxed at 84° C. for 20 hours. The mixture is then cooled to −15° C., and the product is filtered and dried under reduced pressure, yielding L2 as a white solid with a 96% yield. FIGS. 3A, 3B and 3C depict IR spectrum, $^1$H-NMR spectrum and $^{13}$C-NMR spectrum for L2; IR (KBr, cm$^{-1}$): 3517, 3452 (NH$_2$), 3409 (NH), 1648 (C=O), 1572 (C=C); $^1$H-NMR (DMSO-d$_6$, 400 MHz) (δ, ppm): 3.31 (s, 6H, CH$_3$), 3.66 (d, 4H, CH$_2$), 4.18 (d, 4H, CH$_2$), 4.57 (s, 4H, NH$_2$), 7.47 (s, 2H, aromatic), 9.46 (s, 2H, OH); $^{13}$C-NMR (DMSO-d$_6$, 100 MHZ) (δ, ppm): 58.7, 69.2, 70.4, 116.2, 125.4, 150.5, 163.7.

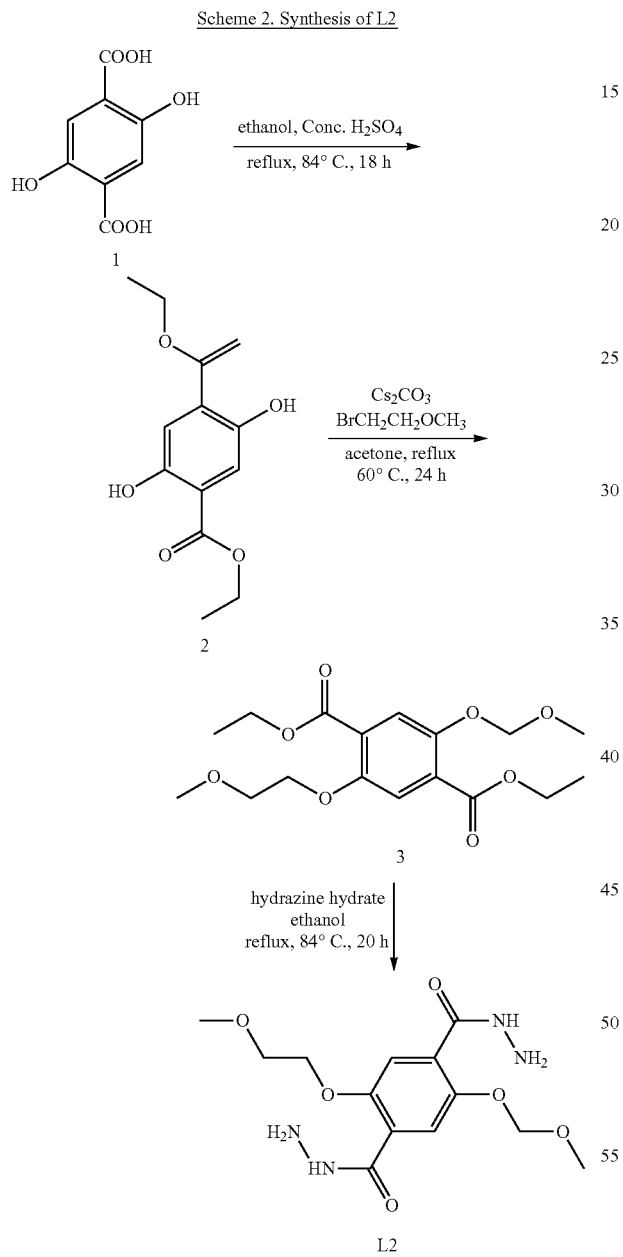

Figure 4A:
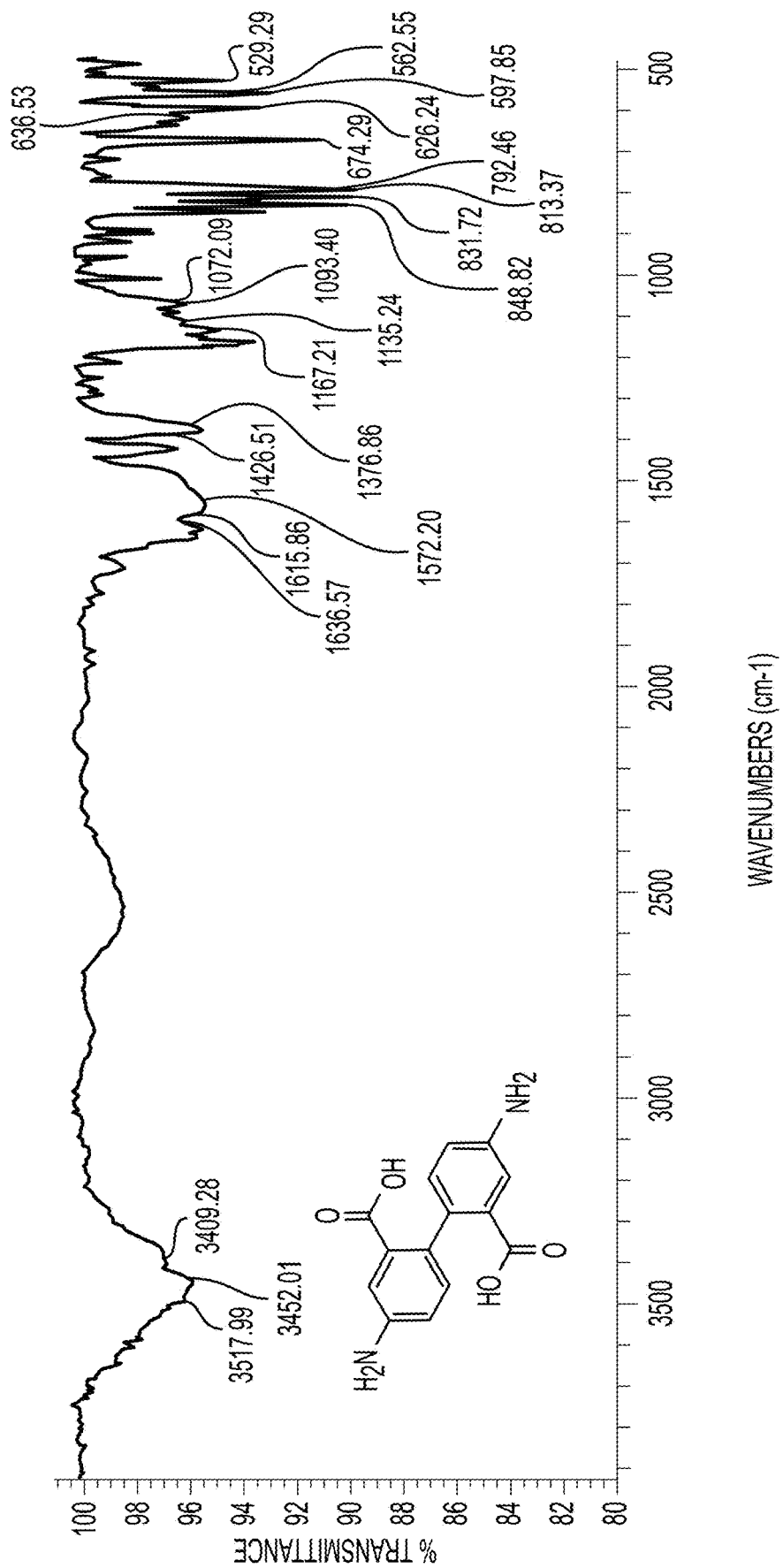
FIGS. 4A, 4B and 4C show IR spectrum, $^1$H-NMR spectrum and $^{13}$C-NMR spectrum for L3 respectively, in accordance with the present invention.
Figure 4B:
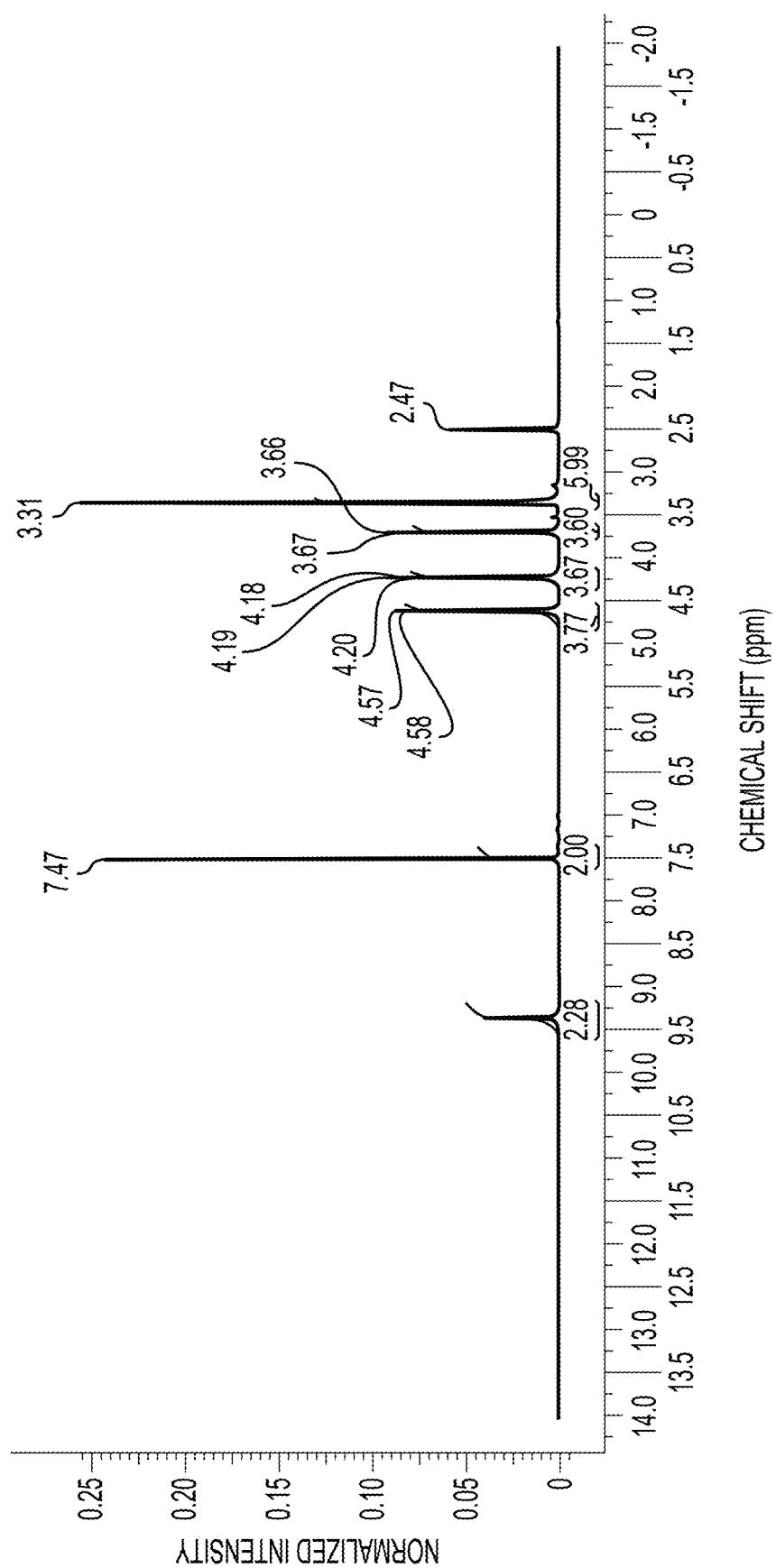
Figure 4C:
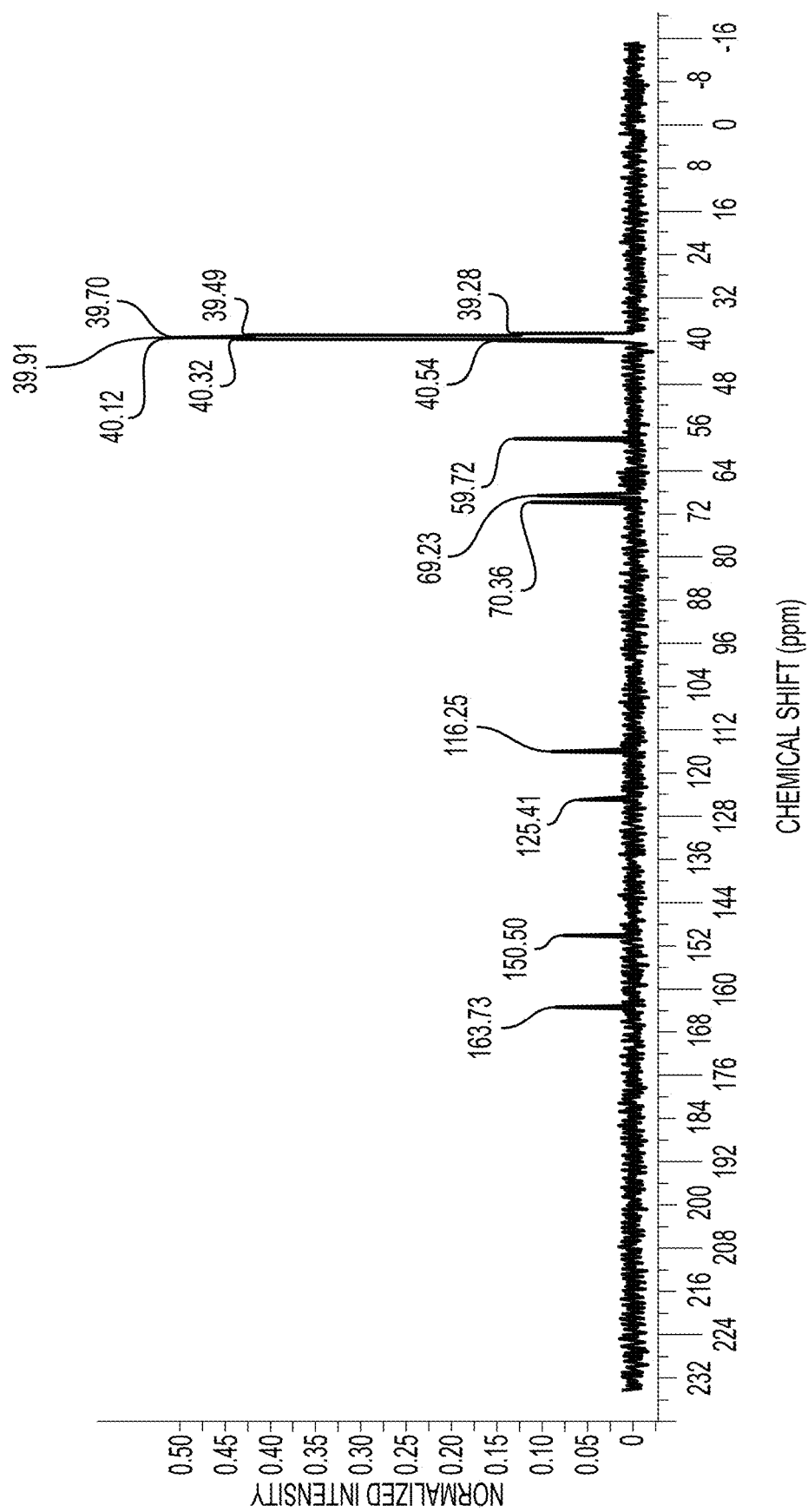

In another embodiment of the invention, 4,4'-diamino-[1,1'-biphenyl]-2,2'-dicarboxylic acid (L3) is synthesized, as represented in Scheme 3. Equimolar amounts of 4-nitrobenzoic acid (5 g, 30.2 mmol) and 4-bromo-2-nitrobenzoic acid (7.5 g, 30.2 mmol) are added to a round-bottom flask along with potassium carbonate (8.3 g, 60.4 mmol) and copper powder (0.6 g, 3.02 mmol) in dimethylformamide (100 mL) under a nitrogen atmosphere. The mixture is heated to 170° C. and stirred for 6 hours. After cooling to room temperature, the mixture is filtered, and the filtrate is extracted with ethyl acetate (3×100 mL). The combined organic layers are dried over anhydrous sodium sulfate and the solvent is removed by rotary evaporation to yield 4,4'-dinitro-[1,1'-biphenyl]-2,2'-dicarboxylic acid. For the reduction, 4,4'-dinitro-[1,1'-biphenyl]-2,2'-dicarboxylic acid (10 g, 28.2 mmol) is dissolved in a mixture of ethanol (100 mL) and water (50 mL), and iron powder (15 g, 268.2 mmol) and hydrochloric acid (50 mL) are added. The mixture is refluxed for 4 hours, then is cooled to room temperature. The solid residue is filtered off and the pH of the filtrate is adjusted to neutral with sodium hydroxide. The filtrate is extracted with ethyl acetate (3×100 mL), and the combined organic layers are dried over anhydrous sodium sulfate. After removing the solvent by rotary evaporation, the crude product is recrystallized from hot ethanol to yield 4,4'-diamino-[1,1'-biphenyl]-2,2'-dicarboxylic acid as a pure white solid (78%). FIGS. 4A, 4B and 4C depict IR spectrum, $^1$H-NMR spectrum and $^{13}$C-NMR spectrum for L3; IR (KBr, cm$^{-1}$): 3517 (OH), 3450, 3384 (NH$_2$), 1699 (C=O), 1572 (C=C); $^1$H-NMR (DMSO-d$_6$, 400 MHZ) (δ, ppm): 5.21 (brs, 4H, NH$_2$), 6.59 (d, 2H, aromatic), 6.70 (d, 2H, aromatic), 6.96 (s, 2H, aromatic), 11.86 (brs, 2H, OH); $^{13}$C-NMR (DMSO-d$_6$, 100 MHZ) (δ, ppm): 114.9, 116.5, 130.9, 131.9, 147.1, 169.5.

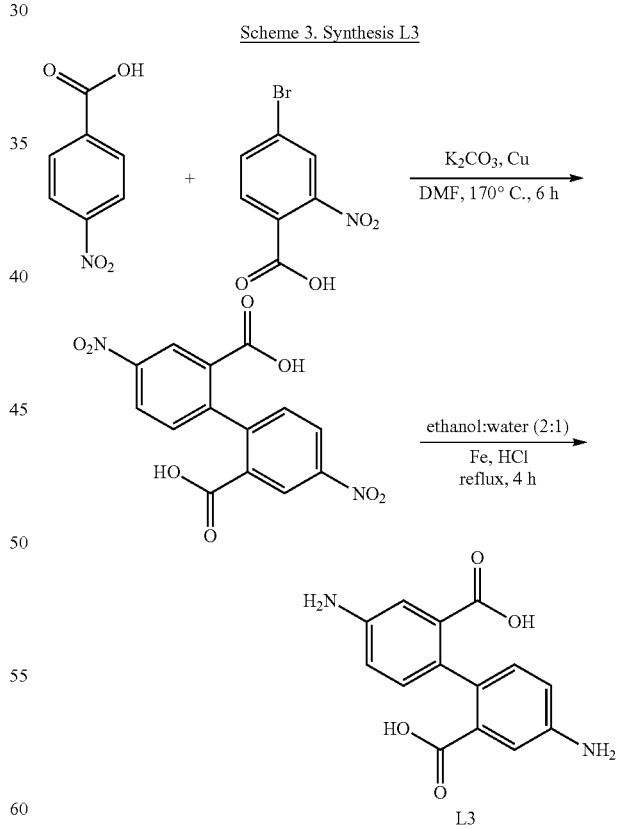

Figure 5A:
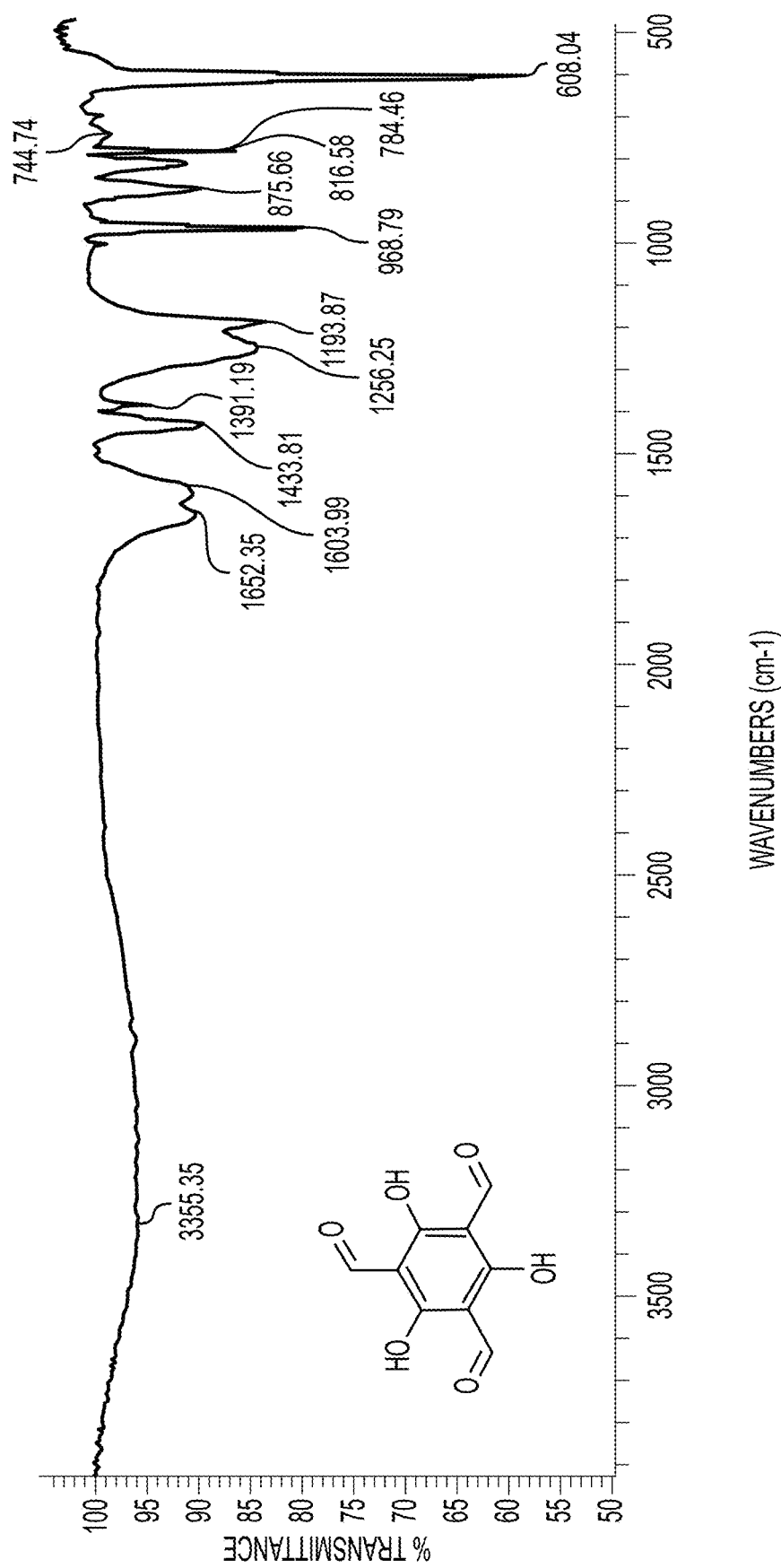
FIGS. 5A, 5B and 5C show IR spectrum, $^1$H-NMR spectrum and $^{13}$C-NMR spectrum for L4 respectively, in accordance with the present invention.
Figure 5B:
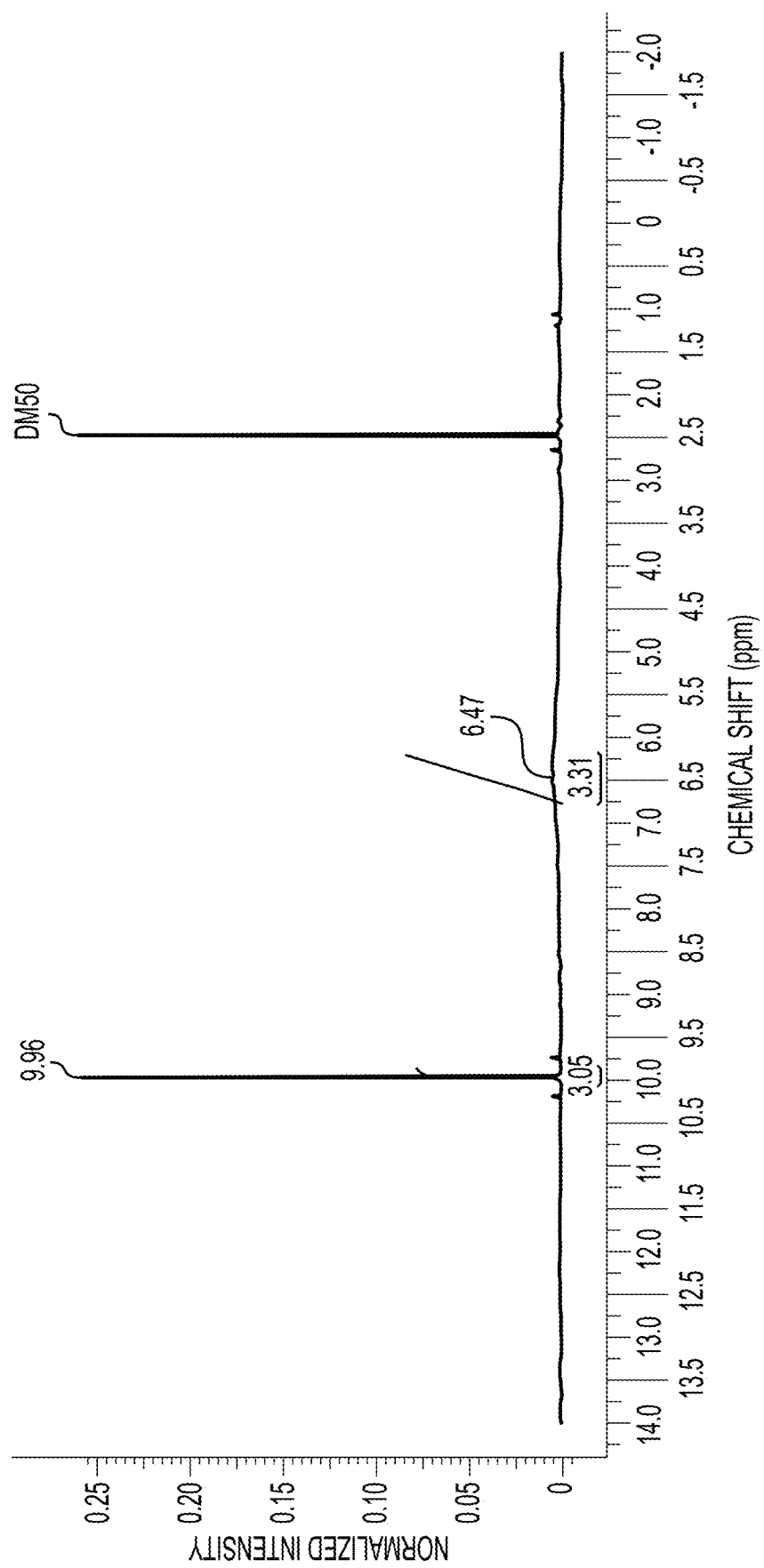
Figure 5C:
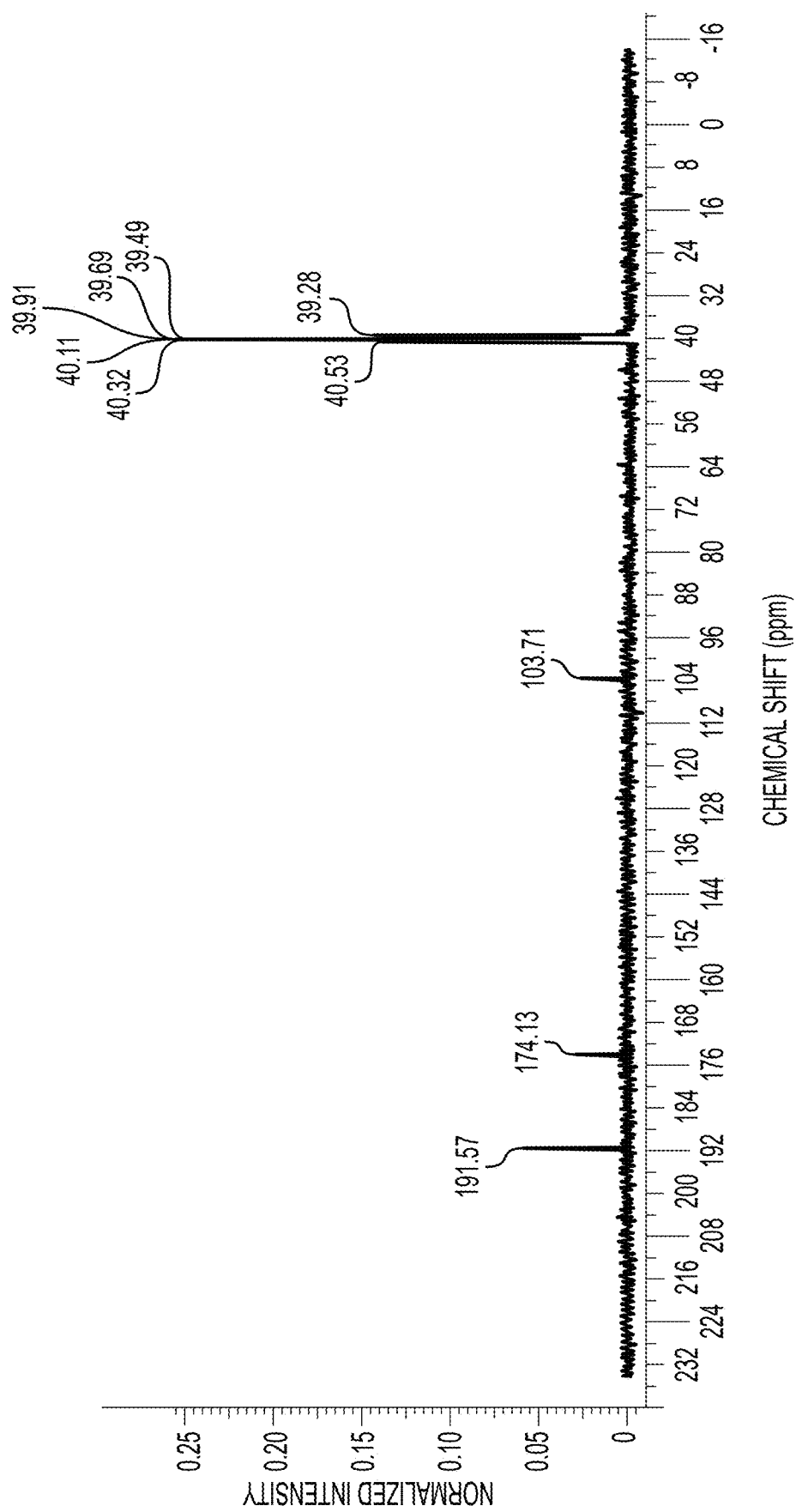

In an embodiment, 2,4,6-trihydroxybenzene-1,3,5-tricarbaldehyde (L4) is synthesized, as represented in Scheme 4. 1,3,5-Trihydroxybenzene (3 g, 23.8 mmol) and hexamethylenetetramine (8.34 g, 59.5 mmol) are added to a round-bottom flask under a nitrogen atmosphere. The mixture is then heated to 100° C. and stirred for 2.5 hours in trifluoroacetic acid (47 mL). Subsequently, hydrochloric acid (50 mL) is added, and the mixture is maintained at 100° C. for an additional hour. After cooling to room temperature, the filtrate is extracted with dichloromethane (3×100 mL), and the organic layer is separated and dried over anhydrous sodium sulfate. The crude product is obtained by rotary evaporation of the solvent. The final product is collected as a light pink powder after recrystallization from hot ethanol, yielding a pure white solid (620 mg, 18%). FIGS. 5A, 5B and 5C depict IR spectrum, $^1$H-NMR spectrum and $^{13}$C-NMR spectrum for L4; IR (KBr, cm$^{-1}$): 3355 (OH), 1652 (C=O), 1603 (C=C); $^1$H-NMR (DMSO-d$_6$, 400 MHZ) (δ, ppm): 6.47 (brs, 3H, OH), 9.96 (s, 3H, CHO); $^{13}$C-NMR (DMSO-d$_6$, 100 MHZ) (δ, ppm): 103.7, 174.1, 191.6.

Scheme 4. Synthesis L4

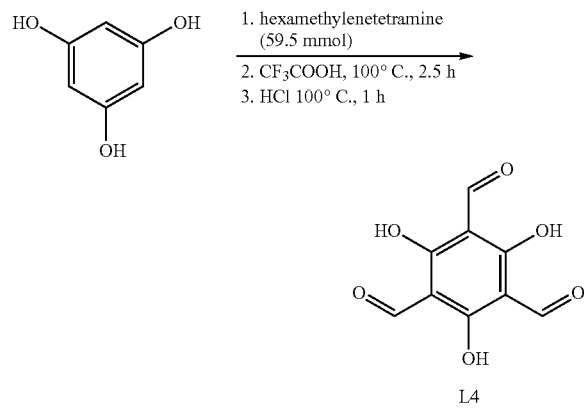

Figure 6A:
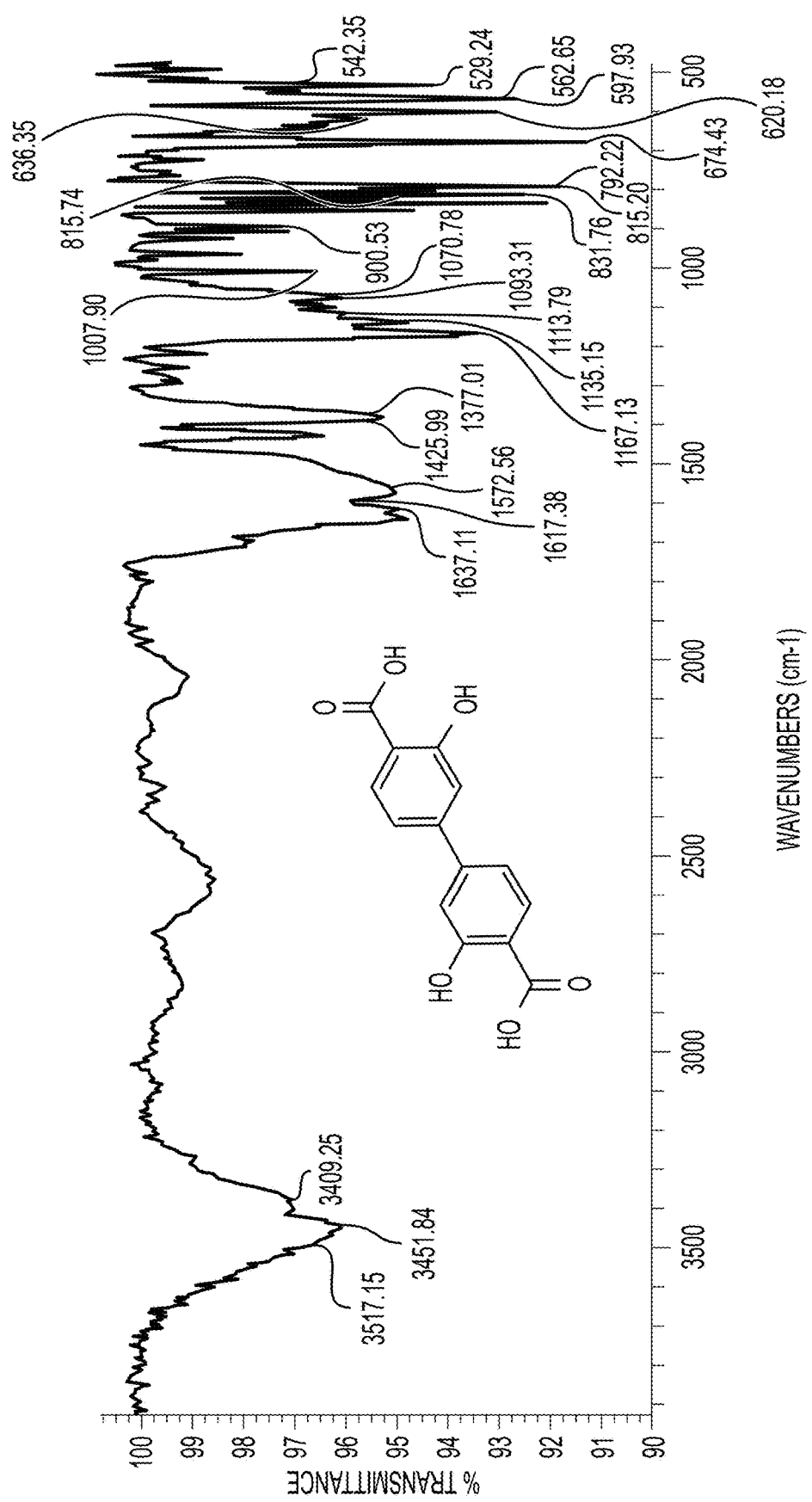
FIGS. 6A, 6B and 6C show IR spectrum, $^1$H-NMR spectrum and $^{13}$C-NMR spectrum for L5 respectively, in accordance with the present invention.
Figure 6B:
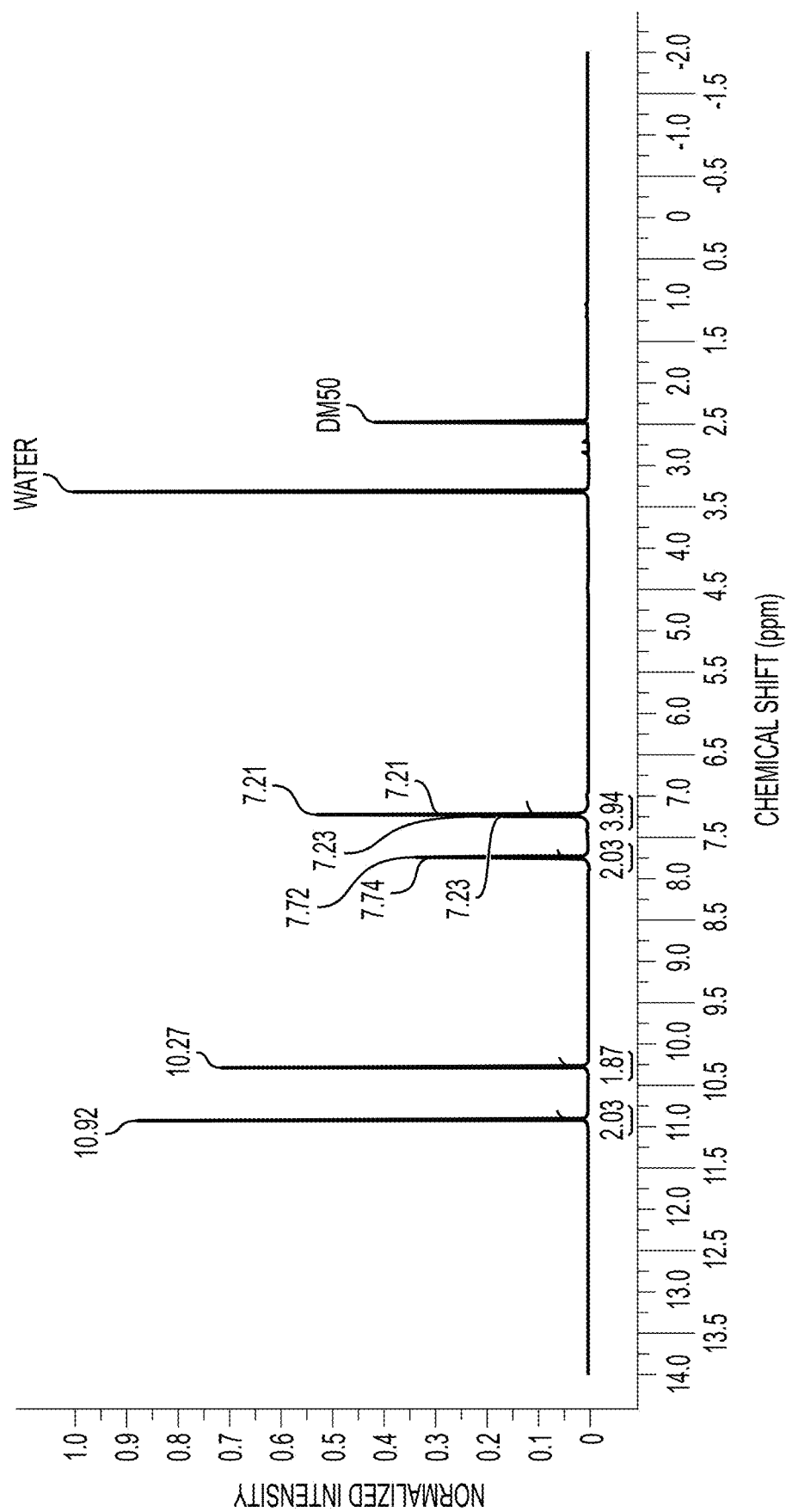
Figure 6C:
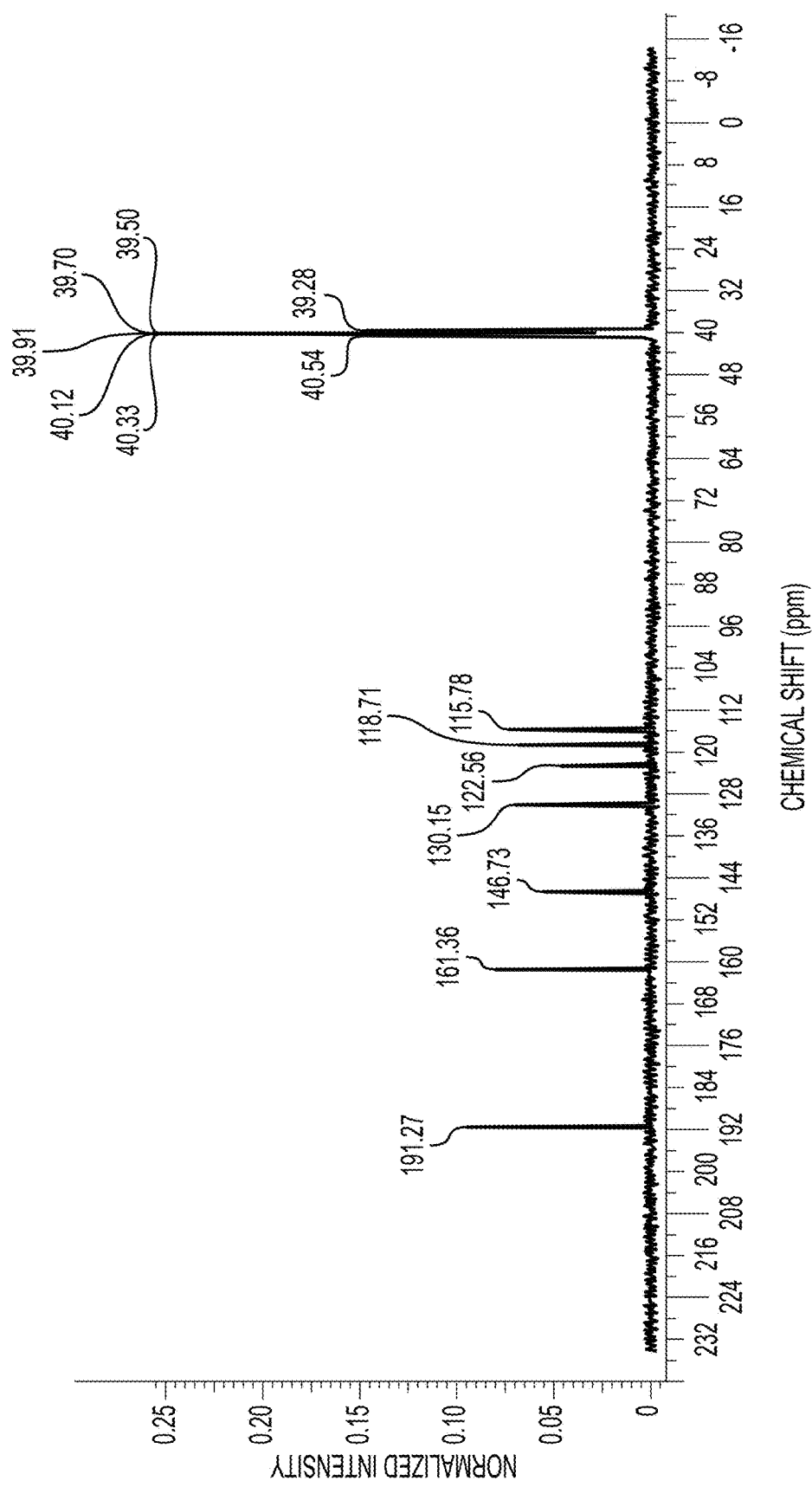

In an embodiment of the invention, 3,3'-dihydroxy-[1,1'-biphenyl]-4,4'-dicarbaldehyde (L5) is synthesized, as represented in Scheme 5. The synthesis of 3,3'-dihydroxy-[1,1'-biphenyl]-4,4'-dicarbaldehyde (L5) begins by slowly adding 5 mL of thionyl chloride (SOCl$_2$) dropwise to a solution containing 4-bromo-2-hydroxybenzoic acid 1 (5 g, 23 mmol) in methanol (39.6 g, 1.24 mol) within an ice bath. Afterward, the reaction mixture is heated to 75° C. and stirred overnight using an oil bath. Upon completion, the mixture is cooled to room temperature, extracted with ethyl acetate (EtOAc) and water, and the organic layers are dried, filtered, and evaporated. The obtained crude product is subjected to column chromatography, yielding compound 2 as a white solid with a 90% isolated yield. Following this, Na$_2$CO$_3$ (4.15 g, 39 mmol) is introduced to a solution of methyl 4-bromo-2-hydroxybenzoate 2 (3 g, 13 mmol) in MeCN (150 mL) at RT, followed by benzyl bromide addition, and overnight stirring at 80° C. After cooling to RT, the mixture is filtered to remove insoluble salts, and the organic phase is dried, filtered, and evaporated. Column chromatography purification results in compound 3 as a white solid with a 78% isolated yield. Later, a mixture of 3 and compound 4 (1 g, 3.11 mmol) is dissolved in a p-dioxane/H$_2$O mixed solvent (4:1 v/v), deoxygenated, and stirred at 85° C. for 24 hours upon addition of K$_2$CO$_3$ and Pd (dppf) Cl$_2$. The reaction mixture is then cooled to RT, filtered, and the organic phases are dried, filtered, and evaporated. Column chromatography purification affords compound 5 as a white solid with an 83% isolated yield. Finally, compound 5 (2 g, 4.15 mmol) is dissolved in THF and MeOH, added with 10% by weight Pd/C, and subjected to hydrogenation. After filtration, acidification, and collection of the precipitate, compound 6 is obtained as a white powder with a 70% isolated yield. FIGS. 6A, 6B and 6C depict IR spectrum, $^1$H-NMR spectrum and $^{13}$C-NMR spectrum for L5; IR (KBr, cm$^{-1}$): 3451 (OH), 1637 (C=O), 1572 (C=C); $^1$H-NMR (DMSO-d$_6$, 400 MHZ) (δ, ppm): 7.21 (m, 4H, aromatic), 7.72 (d, 2H, aromatic), 10.27 (s, 2H, CHO), 10.92 (s, 2H, OH); $^{13}$C-NMR (DMSO-d$_6$, 100 MHZ) (δ, ppm): 115.8, 118.7, 122.6, 130.6, 146.7, 161.4, 191.3.

Scheme 5. Synthesis of L5

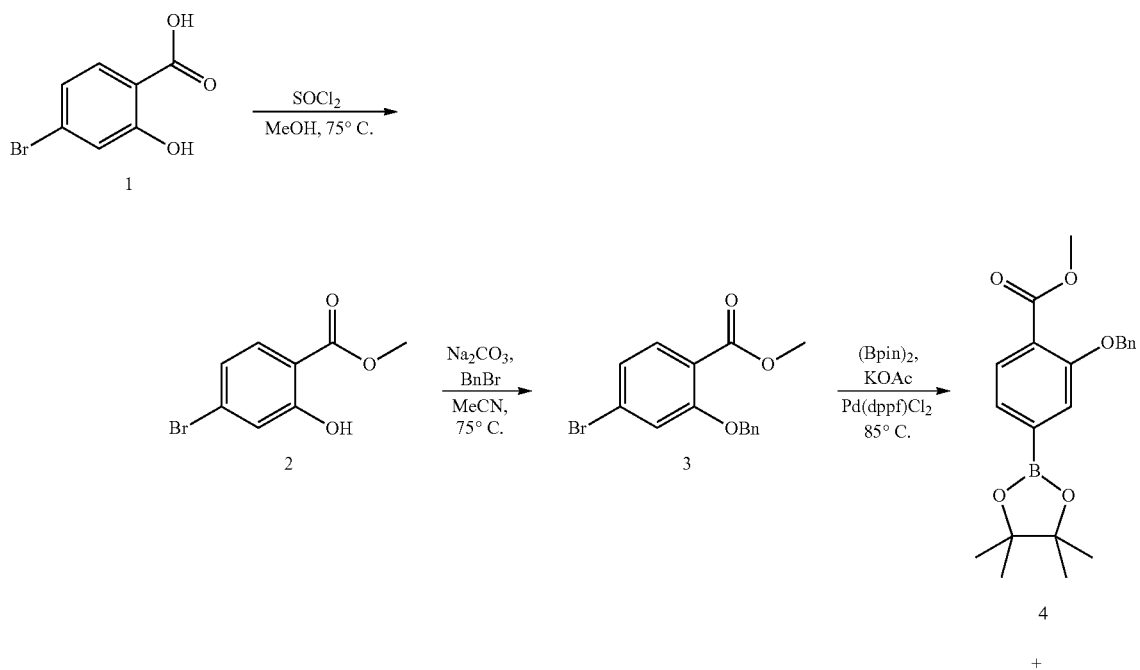

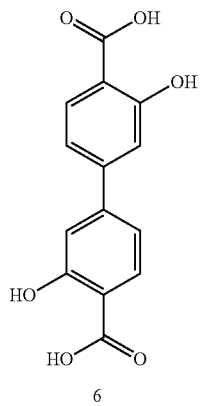 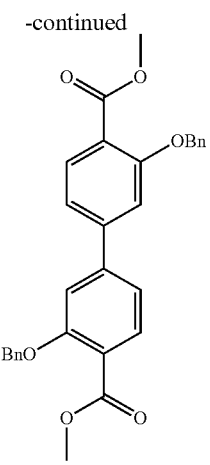 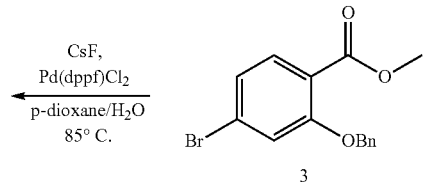

The invention further discloses the synthesis of COFs. In an embodiment of the invention, COF-MAN is synthesized, as represented in Scheme 6. COF synthesis involves the combination of L1 (1 mmol), L3 (2 mmol), mesitylene (0.8 mL), and 1,4-dioxane (0.2 mL) in a tube, followed by ultrasonic treatment for 2 minutes. Subsequently, a 0.1 mL solution of 6 M acetic acid is introduced into the tube. The reaction mixture is transferred to an autoclave and heated at 120° C. for 5 days in a static oven. Post-reaction, the mixture is cooled to room temperature and subjected to sequential washing with THF (30 mL) and acetone (30 mL). The resulting product is filtered and dried under vacuum conditions at 60° C., yielding COF as a fluffy powder.

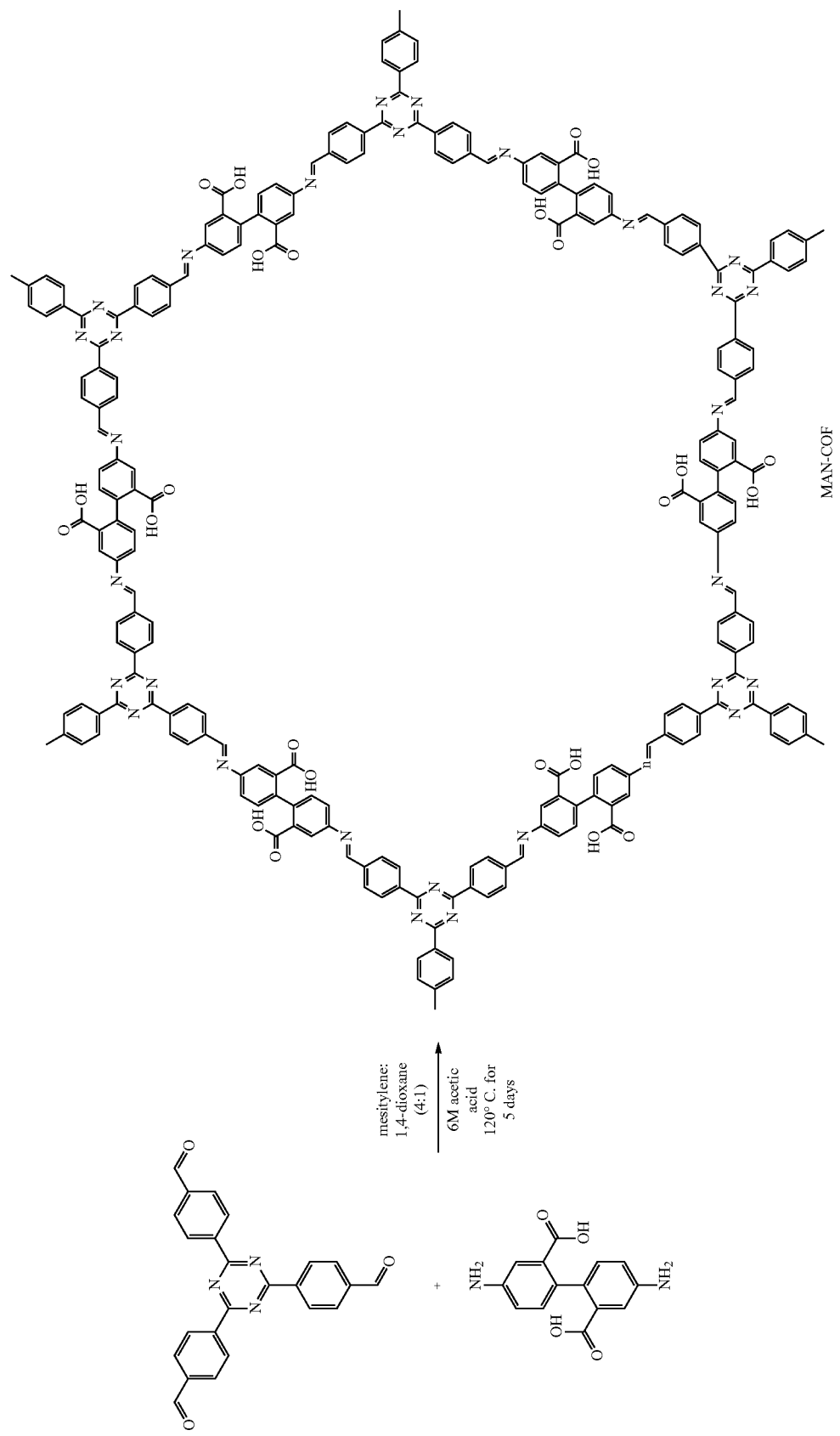
Scheme 6. Synthesis of MAN-COF

In another embodiment of the invention, COF-HMN is synthesized, as represented in Scheme 7. The synthesis of the COF involves combining L2 (1 mmol), L4 (2 mmol), mesitylene (0.8 mL), and 1,4-dioxane (0.2 mL) in a tube, followed by ultrasonic treatment for 2 minutes. Subsequently, 0.1 mL of 6 M acetic acid is added to the tube. The reaction mixture is then transferred to an autoclave and heated at 120° C. for 5 days in a static oven. After the reaction, the mixture is cooled to room temperature and washed sequentially with THF (30 mL) and acetone (30 mL). The resulting product is filtered and dried under vacuum at 60° C., yielding the COF as a fluffy powder.

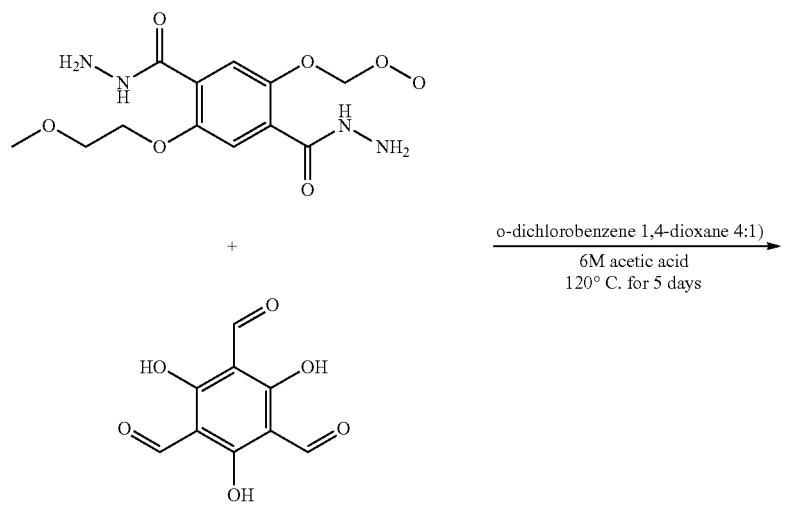

Scheme 7. Synthesis of HMN-COF

-continued

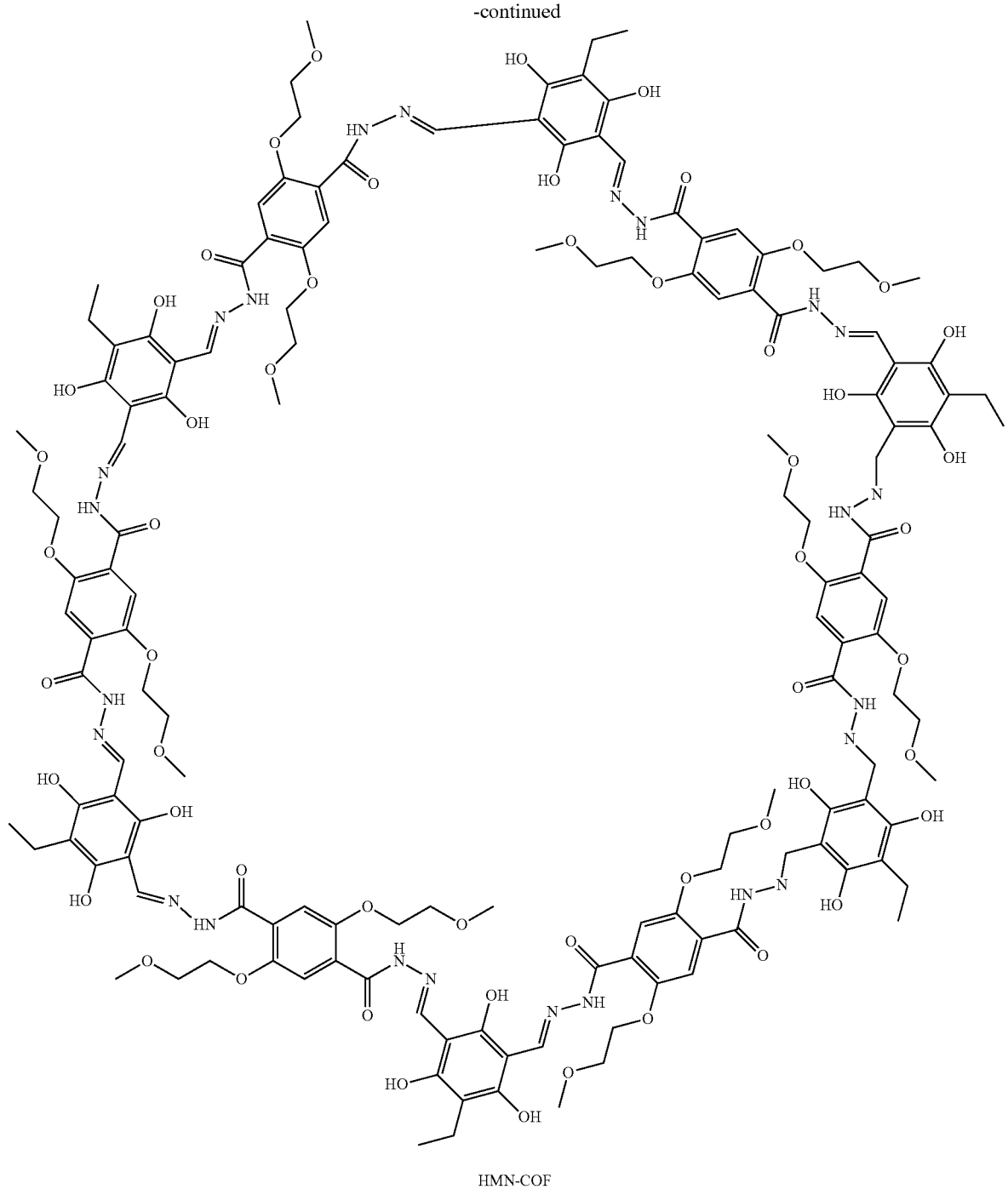

HMN-COF

In another embodiment of the invention, COF-SIN is synthesized, as represented in Scheme 8. The synthesis involves combining L5 (1 mmol), L3 (1.5 mmol), o-dichlorobenzene (0.8 mL), and 1,4-dioxane (0.2 mL) in a tube, followed by ultrasonic treatment for 2 minutes. Subsequently, 0.1 mL of 6 M acetic acid is introduced into the tube. The reaction mixture is then transferred to an autoclave and heated at 120° C. for 5 days in a static oven. After the reaction, the mixture is cooled to room temperature and washed sequentially with THF (30 mL) and acetone (30 mL). The resulting product is then filtered and dried under vacuum at 60° C., yielding the COF as a fluffy powder.

Scheme 8. Synthesis of SIN-COF

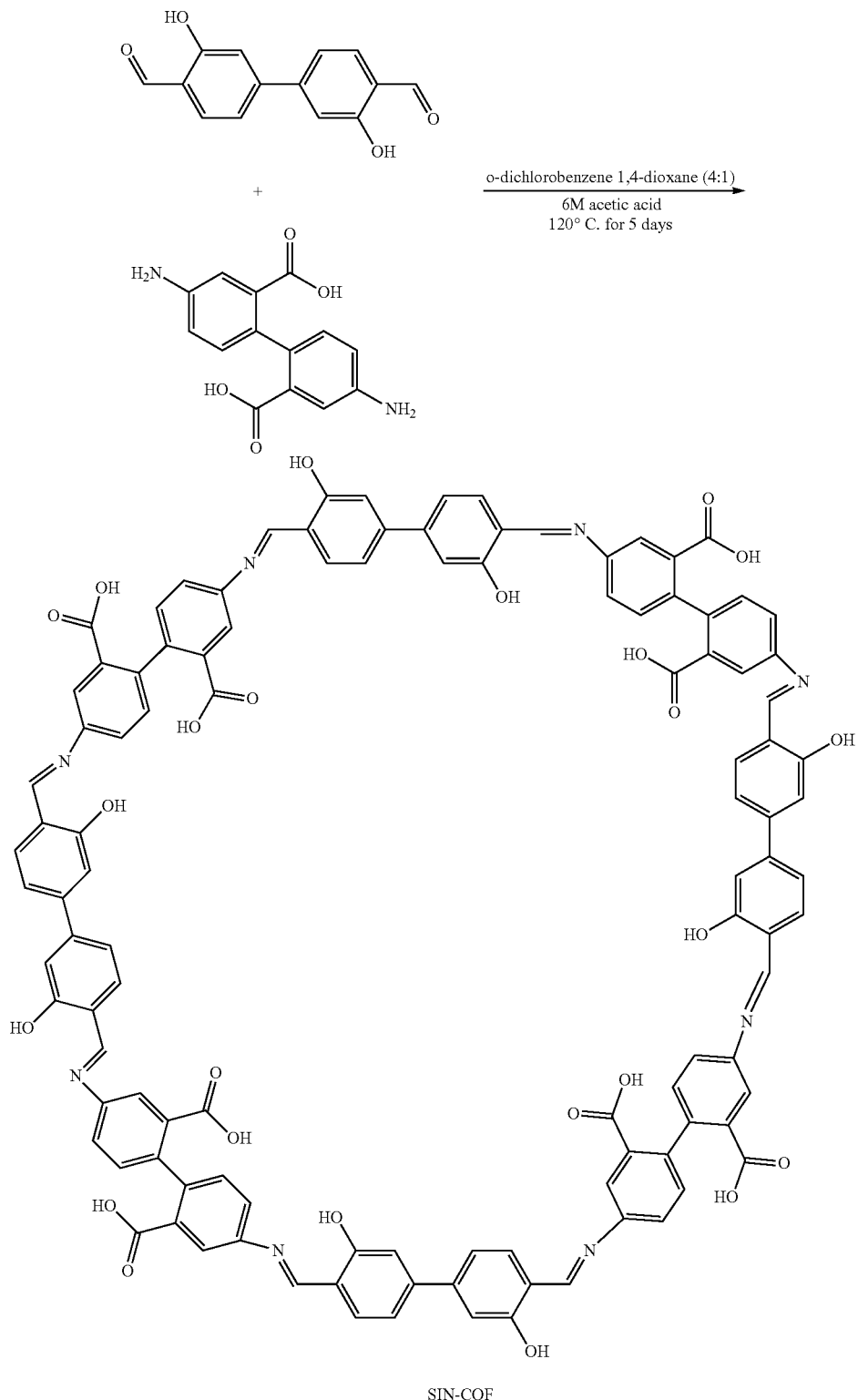

SIN-COF

In an embodiment of the invention, COF is functionalized with $Fe_3O_4$ nanoparticles, and the synthesis of COF@$Fe_3O_4$ is represented in Scheme 9. The synthesis of the COF@$Fe_3O_4$ composite structure is carried out at different COF-to-$Fe_3O_4$ ratios (1:1, 1:2, and 2:1). In a typical procedure, COF and $FeCl_3 \cdot 6H_2O$ are dissolved in 60 mL of ethylene glycol, along with 2.3 g of anhydrous sodium acetate. For the 1:1 ratio, 0.1856 g of COF and 0.6521 g of FeCl$_3$·6H$_2$O are used. For the 1:2 ratio, the FeCl$_3$·6H$_2$O amount is doubled to 1.3042 g, while the COF amount remains at 0.1856 g. For the 2:1 ratio, the COF amount is doubled to 0.3712 g, while the FeCl$_3$·6H$_2$O amount remains at 0.6521 g. The mixtures are transferred to hydrothermal reactors and heated to 200° C. for 6 hours. After cooling to room temperature, the composite materials are collected using magnetic separation, washed thoroughly with methanol, and then dried under vacuum at 60° C. to yield the COF@Fe$_3$O$_4$ composites for each ratio. Scheme 9 is a schematic of COF@Fe$_3$O$_4$ composite synthesis. Step 1 involves COF framework formation. Step 2 involves COF@Fe$_3$O$_4$ composite formation with Fe$_3$O$_4$ nanoparticles integrated after treatment with FeCl$_3$·6H$_2$O, ethylene glycol, and CH$_3$COONa at 200° C. for 6 hours.

analysis, are employed to confirm the successful synthesis and stability of the COFs. In an instance of the invention, the successful formation of imine bonds in MAN-COF, HMN-COF, and SIN-COF is confirmed through FT-IR spectroscopy. The analysis reveals strong stretching vibrations of the C═N unit in the range of 1628-1635 cm 1. The spectra further indicate the effectiveness of the Schiff-base condensation process, showing the disappearance of the amino stretching vibrations from the amine linker and the C═O vibration from the aldehyde linker. FIG. 7A-7C show FTIR spectra of MAN-COF, HMN-COF, and SIN-COF, showing the imine (C═N) stretching peaks at 1628 cm$^{-1}$, 1635 cm$^{-1}$, and 1628 cm 1, respectively. The spectra also display NH$_2$ peaks from the amine linkers and C═O peaks from the aldehyde linkers, confirming the successful formation of the

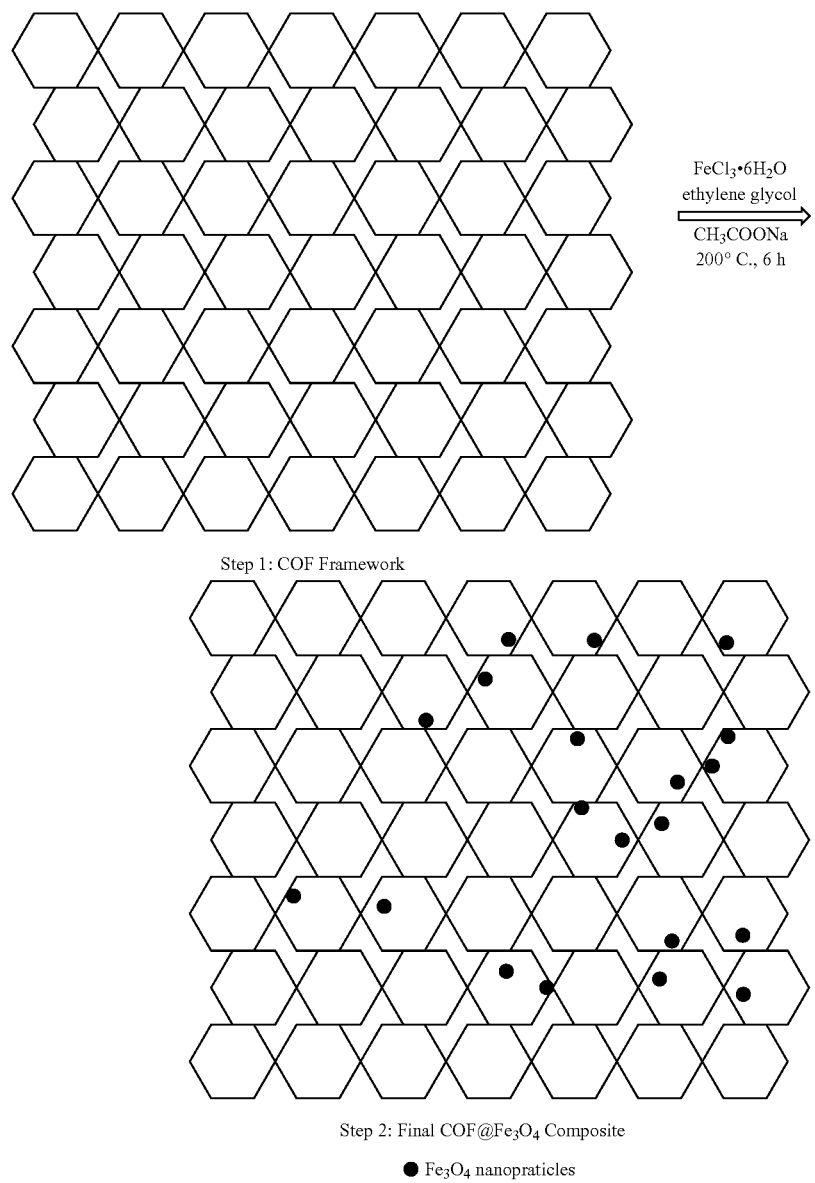

Scheme 9. Schematic of COF@Fe$_3$O$_4$ composite synthesis

In an embodiment of the invention, comprehensive characterization analytical techniques, such as spectroscopic COFs. Specifically, the FT-IR spectrum of HMN-COF demonstrates the absence of characteristic stretching bands of the amine (Vas-NH$_2$, 3399 cm$^{-1}$; Vs-NH$_2$, 3323 cm$^{-1}$) and aldehyde (HC=O, 1652 cm$^{-1}$) after the polycondensation reaction, confirming the absence of residual starting materials. The new stretching vibration band at 1635 cm 1 is attributed to the formation of imine linkages.

Stability is a crucial factor for COFs in practical applications. The synthesized MAN-COF, HMN-COF, and SIN-COF, demonstrate exceptional chemical and thermal stability. In an embodiment of the invention, the TGA analysis is conducted, and FIG. 8 shows TGA curves of HMN-COF, MAN-COF, and SIN-COF. It shows that that they maintain structural integrity up to 400° C. in nitrogen, indicative of thermal stability. In another embodiment, their chemical stability is confirmed as the COFs withstand 24-hour exposure to various solvents, including boiling water, ethanol, N,N-dimethylformamide, dimethyl sulfoxide, 3 M HCl, and 3 M NaOH and subjected to XRD analysis. FIG. 9A-9C represent the XRD patterns of HMN-COF, MAN-COF, and SIN-COF after treatment with various solvents and conditions, showing retained crystallinity. PXRD patterns remain unchanged, further confirming their robustness. This level of stability underlines the suitability of these COFs for various practical applications.

The attractiveness of these COFs as chemically and thermally stable materials is further enhanced by their crystalline structure and porous features. In an embodiment of this disclosure, the porous architectures of MAN-COF, HMN-COF, and SIN-COF is examined using nitrogen sorption isotherms at 77 K and the rapid increase in nitrogen adsorption at lower pressures (P/P$_0$=0 to 0.1) indicates their microporous nature. FIG. 10A depicts the nitrogen adsorption-desorption isotherms for HMN-COF, MAN-COF, and SIN-COF, indicating their surface area and porosity and FIG. 10B indicates the pore size distribution of the COFs, showing distinct pore widths for each framework. Prior to the nitrogen sorption measurements, the COF samples are pre-treated overnight at 100° C. under vacuum. The nitrogen adsorption of MAN-COF, HMN-COF, and SIN-COF are shown to increase rapidly at lower pressures (P/P$_0$=0 to 0.1), indicating their microporous characteristics. The Brunauer-Emmett-Teller (BET) surface areas of MAN-COF, HMN-COF, and SIN-COF are calculated to be 840 m$^2$/g, 910 m$^2$/g, and 670 m$^2$/g, respectively. At P/P$_0$=0.99, the total pore volumes of the COFs are measured, with HMN-COF showcasing a high pore volume of 1.10 cm$^3$/g, surpassing SIN-COF and MAN-COF, which have pore volumes of 0.63 cm$^3$/g and 0.58 cm$^3$/g, respectively. The pore sizes of MAN-COF, HMN-COF, and SIN-COF, computed using nonlocal density functional theory (NLDFT), are found to be 11 Å, 18 Å, and 15 Å, respectively as shown in FIG. 10B. In another embodiment, the crystalline characteristics of SIN-COF, HMN-COF, and MAN-COF are explored through powder X-ray diffraction (PXRD) analysis, as illustrated in FIG. 10C. The figure shows the XRD patterns of HMN-COF, MAN-COF, and SIN-COF, confirming their crystalline structures. SIN-COF exhibits distinct diffraction peaks at 4.642, 15.136, 20.743, 22.235, 12.439, and 25.834, confirming its high crystallinity. Similarly, HMN-COF displays prominent diffraction peaks at 4.813, 7.035, 15.122, and 22.532, indicating a high degree of crystallinity. MAN-COF also exhibits significant diffraction peaks at 7.314, 8.065, 11.321, 15.543, 17.352, 20.743, and 23.034, verifying its highly crystalline nature.

In an embodiment of the disclosed invention, a combination of spectroscopic, diffraction, and surface area analyses are conducted to confirm the successful formation of magnetic covalent organic frameworks (COFs). The incorporation of Fe$_3$O$_4$ nanoparticles within the COF structures is observed to impart magnetic properties while affecting physical characteristics like surface area and pore volume. In this discussion, the evidence supporting the formation of Fe$_3$O$_4$@COF composites is analysed. In a further embodiment, the IR spectra of the three magnetic covalent organic frameworks (COFs) synthesized—Fe$_3$O$_4$@HMN-COF, Fe$_3$O$_4$@MAN-COF, and Fe$_3$O$_4$@SIN-COF—are examined. FIG. 11A shows the FTIR spectra of MAN-COF, Fe$_3$O$_4$, and Fe$_3$O$_4$@MAN-COF, FIG. 11B shows that of HMN-COF, Fe$_3$O$_4$, and Fe$_3$O$_4$@HMN-COF, and FIG. 11C shows FTIR spectra of SIN-COF, Fe$_3$O$_4$, and Fe$_3$O$_4$@SIN-COF. It reveals an additional characteristic band in the region of 560-569 cm 1, attributed to the Fe—O vibration, which clearly indicates the presence of iron oxide within the COF structures. The appearance of this Fe—O vibration band confirms that the COFs have been successfully magnetized. In another embodiment, the crystalline structure and phase purity of the samples are characterized via X-ray diffraction (XRD) pattern analysis, as shown in FIG. 11D, which indicates XRD patterns of Fe$_3$O$_4$ and Fe$_3$O$_4$-functionalized COFs (Fe$_3$O$_4$@HMN-COF, Fe$_3$O$_4$@MAN-COF, and Fe$_3$O$_4$@SIN-COF). The Fe$_3$O$_4$@HMN-COF, Fe$_3$O$_4$@MAN-COF, and Fe$_3$O$_4$@SIN-COF samples display the same characteristic diffraction peaks consistent with Fe$_3$O$_4$ within the range of 10°-70°, confirming the retention of the magnetic component's structure. Additionally, the presence of other diffraction peaks at low angles, characteristic of pure COFs, confirms the successful incorporation of the COF structure into the composites, further verifying the magnetization of Fe$_3$O$_4$@HMN-COF, Fe$_3$O$_4$@MAN-COF, and Fe$_3$O$_4$@SIN-COF. To summarise, the FTIR spectra reveal characteristic Fe—O peaks, indicating successful functionalization, while the XRD patterns confirm the structural integrity of the COFs post-functionalization.

Figure 12C:
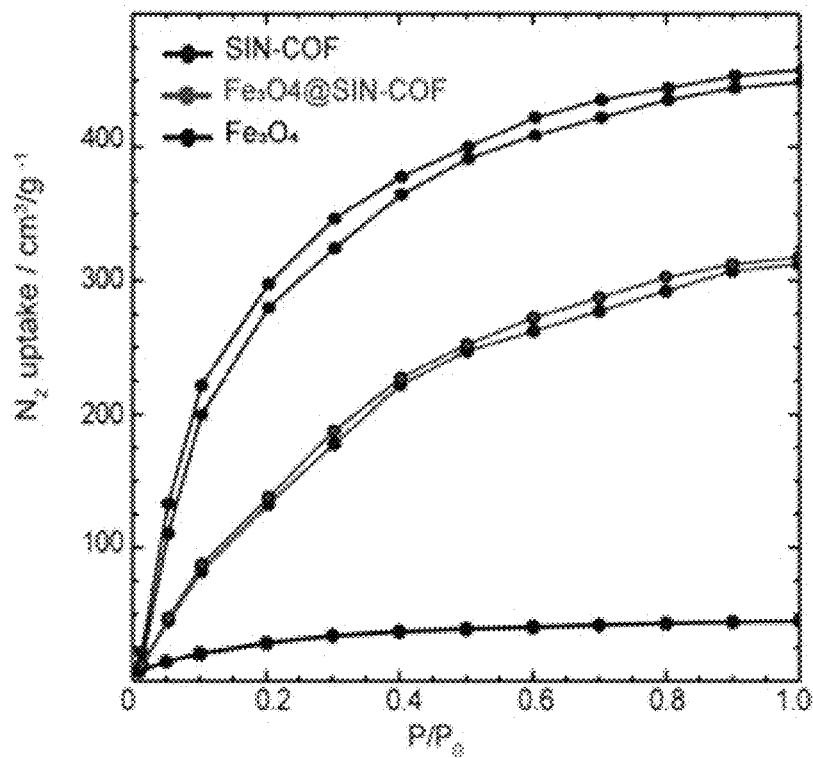

Investigating the incorporation of Fe$_3$O$_4$ nanoparticles into the COFs in an embodiment of the invention, shows a significant impact on the BET surface area due to the occupation of pore space by the nanoparticles. Fe$_3$O$_4$ nanoparticles typically exhibit a much lower surface area, around 200 m$^2$/g, due to their non-porous or less porous nature compared to COFs. This inherent difference in surface area affects or reduces the overall BET surface area of the composite materials. The BET surface areas of pure COFs—HMN-COF, MAN-COF, and SIN-COF—are found to be 910 m$^2$/g, 840 m$^2$/g, and 670 m$^2$/g, respectively. Upon incorporating Fe$_3$O$_4$ nanoparticles, the BET surface area of Fe$_3$O$_4$@HMN-COF decreases significantly, typically to around 680 m$^2$/g, while the surface areas of Fe$_3$O$_4$@MAN-COF and Fe$_3$O$_4$@SIN-COF also show reductions, with Fe$_3$O$_4$@MAN-COF typically ranging around 580 m$^2$/g and Fe$_3$O$_4$@SIN-COF around 490 m$^2$/g. These results confirm the successful integration of Fe$_3$O$_4$ within the COF structures, leading to a decrease in surface area due to the lower surface area of Fe$_3$O$_4$ nanoparticles. The observed reductions in BET surface area reflect the combination of high surface area COFs and the comparatively low surface area of the incorporated Fe$_3$O$_4$, demonstrating the structural and compositional changes within the composite materials. Another embodiment of the invention analyses the nitrogen adsorption-desorption isotherms for COFs and their magnetized composites. FIGS. 12A, 12B and 12C show the nitrogen adsorption-desorption isotherms for HMN-COF, MAN-COF, SIN-COF, and their respective Fe$_3$O$_4$-functionalized counterparts (Fe$_3$O$_4$@HMN-COF, Fe$_3$O$_4$@MAN-COF, Fe$_3$O$_4$@SIN-COF), compared to Fe$_3$O$_4$. Each COF shows enhanced N2 uptake compared to $Fe_3O_4$ alone, demonstrating significant improvements in surface area and porosity upon functionalization.

Figure 13:
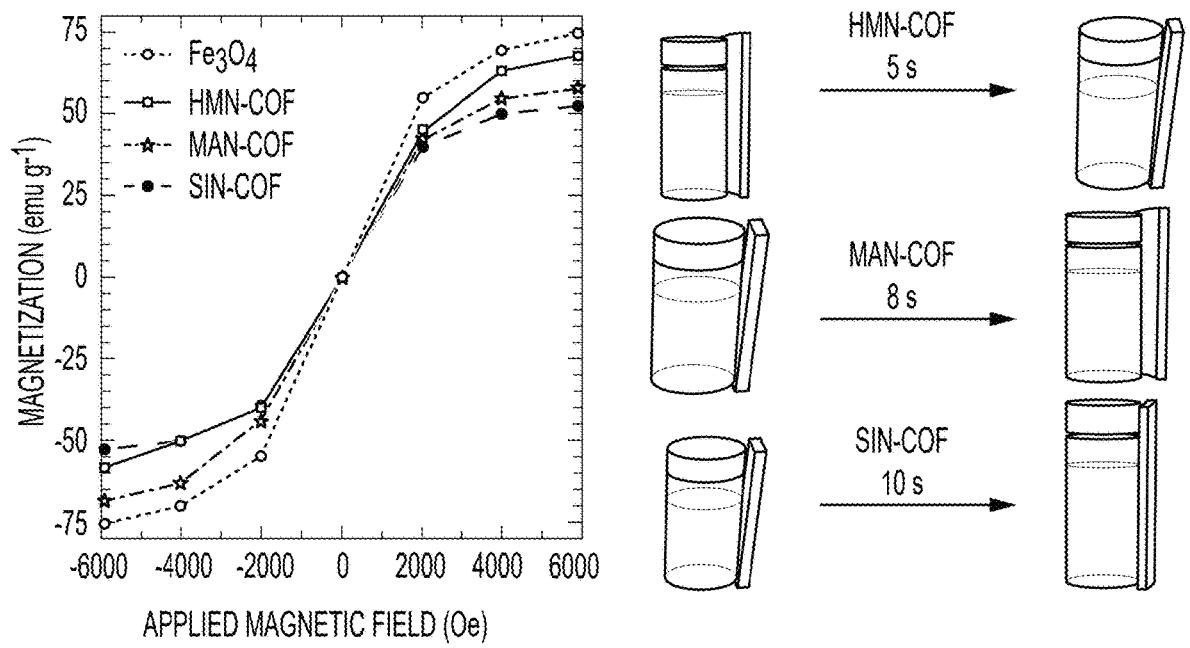
FIG. 13 shows magnetization curves of $Fe_3O_4$, $Fe_3O_4$@HMN-COF, $Fe_3O_4$@MAN-COF, and $Fe_3O_4$@SIN-COF as a function of the applied magnetic field (Oe) and their respective magnetic separation times, according to the disclosure.

An embodiment of the invention presented herein, measures the magnetic properties of materials using the Vibrating Sample Magnetometer (VSM), by subjecting them to a varying magnetic field and monitoring the induced magnetic response. Essentially, the VSM assesses the magnetization of a sample as a function of the applied magnetic field. FIG. 13 depicts the magnetization curves of $Fe_3O_4$, $Fe_3O_4$@HMN-COF, $Fe_3O_4$@MAN-COF, and $Fe_3O_4$@SIN-COF as a function of the applied magnetic field (Oe). The analysis using VSM reveals that $Fe_3O_4$ nanoparticles have a high saturation magnetization, with a maximum value of 75.3 emu/g. However, the addition of COF coatings reduces this magnetization, with $Fe_3O_4$@HMN-COF, $Fe_3O_4$@MAN-COF, and $Fe_3O_4$@SIN-COF showing saturation magnetization values of 68.2 emu/g, 52.7 emu/g, and 58.1 emu/g, respectively. This reduction is attributed to the non-magnetic nature of the COF coatings, which affect the composite microspheres' magnetic behavior. Despite this decrease, the COF-coated microspheres ($Fe_3O_4$@HMN-COF, $Fe_3O_4$@MAN-COF, and $Fe_3O_4$@SIN-COF) retain sufficient magnetic properties, enabling rapid collection from aqueous solutions within 5, 8, and 10 seconds, respectively, using an external magnet, as illustrated in FIG. 13. Images on the right of the figure indicate the rapid magnetic response with the magnetic separation times of 5 seconds, 8 seconds, and 10 seconds for $Fe_3O_4$@HMN-COF, $Fe_3O_4$@MAN-COF, and $Fe_3O_4$@SIN-COF, respectively. This capability highlights their potential for magnetic separation applications, such as environmental cleanup, biomedical separations, and catalyst recovery.

In addition, XPS spectra of $Fe_3O_4$@ COF composites are analysed in another embodiment. FIGS. 14A, 14B and 14C show XPS spectra of Fe 2p for $Fe_3O_4$@MAN-COF, $Fe_3O_4$@HMN-COF, and $Fe_3O_4$@SIN-COF respectively, showing the binding energy peaks at Fe $2p_{1/2}$ and Fe $2p_{3/2}$ for each sample compared to $Fe_3O_4$. The deconvolution of the XPS spectra for $Fe_3O_4$@MAN-COF, $Fe_3O_4$@HMN-COF, and $Fe_3O_4$@SIN-COF shows peaks at 724.8 eV and 711.3 eV, which can be assigned to Fe in Fe $2p_{1/2}$ and Fe $2p_{3/2}$, respectively. Additionally, peaks at 732.0 eV and 716.8 eV are identified as the satellite peaks of Fe. The shifts in binding energy indicate the incorporation of $Fe_3O_4$ into the COFs structures, further confirming the successful construction of all three COFs.

In an embodiment of the invention, the adsorption properties of the magnetic COFs ($Fe_3O_4$@MAN-COF, $Fe_3O_4$@HMN-COF, and $Fe_3O_4$@SIN-COF) for imidacloprid are analysed. This is to evaluate the efficiency and effectiveness of these COFs in adsorbing imidacloprid, aiming to highlight their potential application in environmental remediation. In one such embodiment, the effect of pH on the adsorption efficiency of imidacloprid by $Fe_3O_4$@MAN-COF, $Fe_3O_4$@HMN-COF, and $Fe_3O_4$@SIN-COF composites is investigated. This investigation explores the influence of pH on the adsorption efficiency of imidacloprid, focusing on the interaction mechanisms between the COFs and the amphoteric nature of imidacloprid across a pH range of 2 to 9 employing LC-MS/MS to quantify residual concentrations post-adsorption. The electrostatic attraction or repulsion mainly depends on the surface charge of adsorbent and adsorbate species at different solution pH. The investigation process involves preparing buffer solutions with pH values of 2, 3, 5, 6, 7, 8, and 9, and measuring the zeta potential of each composite to determine the point of zero charge ($pH_{ZPC}$). Adsorption experiments are conducted by adding 50 mg of each COF composite to 50 mL of imidacloprid solution (10 mg/L) in the different buffer solutions and shaking at 200 rpm for 24 hours at room temperature to reach equilibrium. After centrifugation and filtration, the residual concentration of imidacloprid is quantified using LC-MS/MS. The adsorption capacity is calculated and plotted against pH to visualize the influence of pH on adsorption efficiency. FIG. 15 depicts the Zeta Potential vs. pH for $Fe_3O_4$@MAN-COF (red), $Fe_3O_4$@HMN-COF (green), and $Fe_3O_4$@SIN-COF (blue). The blue dashed line indicates the isoelectric point (IEP). The graph highlights the Zeta potential changes with pH for each COF, demonstrating their stability and charge behavior across different pH levels.

The zero potential charge point (pH/Pc) of $Fe_3O_4$@MAN-COF, $Fe_3O_4$@HMN-COF, and $Fe_3O_4$@SIN-COF are 6.35, 5.07 and 7.09, respectively. When the solution pH below the $pH_{ZPC}$ of adsorbent, its surface is protonated and positively charged, otherwise it is negatively charged. Imidacloprid, an amphoteric molecule, is hydrophilic (logKow=0.57), with its dominant species being $IMI^+$ at pH<1.56, $IMI^±$ at pH 1.56-11.12, and $IMI^-$ at pH>11.12. At pH levels below 1.56, imidacloprid predominantly exists as $IMI^+$, the protonated form carrying a positive charge; between pH 1.56 and 11.12, it exists as $IMI^±$, a mixture of protonated and neutral forms with a net charge close to neutral; and at pH levels above 11.12, imidacloprid predominantly exists as IMI, the deprotonated form carrying a negative charge. Each COF features specific functional groups that influence its adsorption properties: $Fe_3O_4$@MAN-COF incorporates carboxyl groups and a triazine moiety; $Fe_3O_4$@HMN-COF contains hydroxyl groups and ether linkages; and $Fe_3O_4$@SIN-COF is characterized by biphenyl, hydroxyl, and carboxylic acid functionalities. For $Fe_3O_4$@MAN-COF, optimal adsorption of imidacloprid occurs at pH 6.35 due to near-neutral zeta potential, facilitating favourable π-π interactions and hydrogen bonding. At low pH (2-3), the less negative surface charge reduces electrostatic repulsion, enhancing adsorption through strong electrostatic interactions and hydrogen bonding with the positively charged $IMI^+$. At higher pH (8-9), the shift towards the deprotonated $IMI^-$ species increases electrostatic repulsion with the negatively charged COF surface, limiting adsorption efficiency. $Fe_3O_4$@HMN-COF exhibits optimal adsorption at pH 5.07 due to its balanced surface charge, promoting efficient adsorption through hydrogen bonding and π-π stacking with imidacloprid. At acidic pH levels (2-3), its less negative surface charge enhances interactions with $IMI^+$ via hydrogen bonding and π-π stacking, increasing adsorption capacity. At higher pH levels (8-9), the increased negative surface charge enhances electrostatic repulsion with the negatively charged $IMI^-$, reducing adsorption efficiency. $Fe_3O_4$@SIN-COF achieves peak adsorption efficiency at pH 7 due to near-neutral zeta potential, which minimizes electrostatic repulsion and maximizes adsorption through strong π-π interactions and hydrogen bonding. At low pH (2-3), its biphenyl and carboxylic acid groups facilitate favorable interactions, enhancing adsorption through π-π stacking and hydrogen bonding. At higher pH levels (8-9), the increasing negative surface charge leads to enhanced electrostatic repulsion with the deprotonated $IMI^-$ species, diminishing adsorption efficiency despite the potential increase in adsorption sites.

FIG. 16A illustrates the effect of pH on the adsorption capacity ($q_e$) of $Fe_3O_4$@HMN-COF, $Fe_3O_4$@MAN-COF, and $Fe_3O_4$@SIN-CO. $Fe_3O_4$@HMN-COF is the most versatile and effective material for adsorbing imidacloprid, showing peak adsorption efficiency around pH 5 and performing well across a broad pH range (2-7). Its surface chemistry, with hydroxyl groups and ether linkages, facilitates hydrogen bonding and π-π stacking interactions with imidacloprid, balancing electrostatic forces effectively. This ensures robust adsorption across various pH levels, making it more adaptable to environmental fluctuations compared to $Fe_3O_4$@MAN-COF and $Fe_3O_4$@SIN-COF, which have narrower optimal pH ranges. $Fe_3O_4$@HMN-COF's ability to maintain efficient adsorption in diverse conditions highlights its potential for environmental remediation. Due to the slightly higher adsorption capability of $Fe_3O_4$@MAN-COF at pH 6, subsequent adsorption experiments are conducted at this pH. Similarly, $Fe_3O_4$@HMN-COF is tested at pH 5, and $Fe_3O_4$@SIN-COF at pH 7, where each demonstrates optimal adsorption.

In another embodiment of the invention, the effect of adsorbent dosage on the adsorption efficiency of imidacloprid by $Fe_3O_4$@MAN-COF, $Fe_3O_4$@HMN-COF, and $Fe_3O_4$@SIN-COF composites is investigated using concentrations of COFs ranging from 0.05 to 0.5 g/L. Imidacloprid solutions (10 mg/L) are prepared and each COF composite is added in varying amounts to achieve the desired dosages. The mixtures are shaken at 200 rpm for 24 hours at room temperature to reach equilibrium, after which the samples are centrifuged and filtered. The residual imidacloprid concentration is quantified using LC-MS/MS. Adsorption capacity and removal efficiency are calculated and plotted against adsorbent dosage. FIG. 16B-16D are graphs showing the relationship between adsorbent dosage and both adsorption capacity ($q_e$) and removal efficiency (%) for $Fe_3O_4$@HMN-COF, $Fe_3O_4$@MAN-COF, and $Fe_3O_4$@SIN-COF. FIG. 16B displays the data for $Fe_3O_4$@HMN-COF, FIG. 16C shows $Fe_3O_4$@MAN-COF, and FIG. 16D illustrates $Fe_3O_4$@SIN-COF. The x-axis represents the adsorbent dosage (g/L), while the left y-axis indicates the adsorption capacity (mg/g) and the right y-axis shows the removal efficiency (%). The trends depict a decrease in adsorption capacity and an increase in removal efficiency with increasing adsorbent dosage for each COF.

The study explores the effects of different concentrations of each COF (ranging from 0.05 to 0.5 g/L) on their adsorption capacity and removal efficiency for imidacloprid. At low dosages of $Fe_3O_4$@MAN-COF, $Fe_3O_4$@HMN-COF, and $Fe_3O_4$@SIN-COF, the concentration of imidacloprid is high relative to the available adsorption sites, resulting in a high adsorption capacity as most imidacloprid molecules find adsorption sites. However, the total number of imidacloprid molecules removed from the solution is lower, leading to lower removal efficiency. Conversely, at higher dosages, there are more adsorption sites available than necessary for capturing the available imidacloprid, which means many sites remain unoccupied, thereby reducing the adsorption capacity (mg of imidacloprid per g of COF). Despite this, the increased number of adsorption sites enhances the probability of capturing nearly all the imidacloprid molecules present, thus significantly improving the removal efficiency. $Fe_3O_4$@HMN-COF shows a notable higher removal efficiency compared to $Fe_3O_4$@MAN-COF due to its surface chemistry facilitating more effective interactions with imidacloprid. $Fe_3O_4$@SIN-COF, although demonstrating the same inverse relationship between concentration and adsorption capacity, exhibits the lowest removal efficiency among the three COFs. This discrepancy is attributed to the different functional groups and surface charges of each COF. Considering both adsorption capacity and removal efficiency, the optimal solid-liquid ratios are determined to be 0.22 g/L for $Fe_3O_4$@MAN-COF, 0.25 g/L for $Fe_3O_4$@HMN-COF, and 0.20 g/L for $Fe_3O_4$@SIN-COF. These ratios ensure a balance between effective adsorption and practical application across varying environmental conditions. This behavior highlights the balance between adsorption capacity and removal efficiency across different dosages for $Fe_3O_4$@MAN-COF, $Fe_3O_4$@HMN-COF, and $Fe_3O_4$@SIN-COF.

The effect of ionic strength on adsorption efficiency of COF composites is analyzed in another embodiment of this invention. In this process, salt solutions with varying concentrations (10-40 mg/L) are added to the imidacloprid solution to verify the anti-interference ability of $Fe_3O_4$@HMN-COF, $Fe_3O_4$@MAN-COF, and $Fe_3O_4$@SIN-COF. To evaluate the effect of ionic strength on the adsorption of imidacloprid by $Fe_3O_4$@HMN-COF, $Fe_3O_4$@MAN-COF, and $Fe_3O_4$@SIN-COF, imidacloprid solutions (10 mg/L) and NaCl solutions with varying concentrations (10, 20, 30, and 40 mg/L) are prepared. 50 mg of each COF composite is added to 50 mL of the imidacloprid solution in separate flasks, after which the NaCl solutions are added to achieve the desired salt concentrations. The flasks are shaken at 200 rpm for 24 hours at room temperature. After equilibrium, the samples are centrifuged at 4000 rpm for 10 minutes, the supernatant is filtered, and the residual imidacloprid concentration is measured using LC-MS/MS. FIG. 17 represents the adsorption capacity ($q_e$) of $Fe_3O_4$@HMN-COF, $Fe_3O_4$@MAN-COF, and $Fe_3O_4$@SIN-COF as a function of NaCl concentration ($C_{NaCl}$). The adsorption capacities are measured at various NaCl concentrations, demonstrating the stability and performance of the COFs in different ionic strength environments. The results indicate consistent adsorption capacities for all three COFs across the tested NaCl concentration range. As shown in the figure, the adsorption capacity of imidacloprid decreases slightly but remains largely unchanged overall. This indicates that electrostatic effects do not play a significant role in the adsorption process, which is consistent with experimental results observed under different pH conditions.

Another embodiment of the invention focuses on the adsorption kinetics by varying the adsorption time, for optimizing the design of COF-based adsorbents. To study the adsorption kinetics of imidacloprid onto $Fe_3O_4$@MAN-COF, $Fe_3O_4$@HMN-COF, and $Fe_3O_4$@SIN-COF, imidacloprid solutions (10 mg/L) are prepared, and 50 mg of each COF composite is added to 50 mL of the solution. The mixtures are shaken at 200 rpm at room temperature, and samples are collected at varying time intervals (1, 3, 5, 10, 20, 30, 60, and 120 minutes). After centrifugation at 4000 rpm for 10 minutes and filtration, the residual imidacloprid concentration is measured using LC-MS/MS. FIG. 18A-18D shows the adsorption properties of $Fe_3O_4$@HMN-COF, $Fe_3O_4$@MAN-COF, and $Fe_3O_4$@SIN-COF.

FIG. 18A shows the adsorption kinetics of $Fe_3O_4$@HMN-COF, $Fe_3O_4$@MAN-COF, and $Fe_3O_4$@SIN-COF. The adsorption amount of imidacloprid onto $Fe_3O_4$@MAN-COF, $Fe_3O_4$@HMN-COF, and $Fe_3O_4$@SIN-COF increases sharply, reaching equilibrium within 5 minutes for $Fe_3O_4$@HMN-COF and 10 minutes for both $Fe_3O_4$@MAN-COF and $Fe_3O_4$@SIN-COF. This rapid adsorption is attributed to the large number of vacant sites available during the initial adsorption stage. As contact time is extended, the maximum adsorption capacity reaches as the adsorption sites become saturated. The kinetic model is fitted using the following formulas, including the pseudo-first-order model (Equation (1)) and pseudo-second-order model (Equation (2)):

$$\ln(Q_e - Q_t) = \ln Q_e - k_1 t \quad (1)$$

$$\frac{t}{Q_t} = \frac{1}{k_2 Q_e^2} + \frac{t}{Q_e} \quad (2)$$

where ($q_e$) and ($q_t$) (mg/g) are the equilibrium adsorption capacity and adsorption capacity at time (t) (min), respectively. ($k_1$) (min$^{-1}$) is the first-order constant and ($k_2$) (g/(mg min)) is the second-order constant.

In the different embodiments of the invention, the adsorption kinetics of imidacloprid onto $Fe_3O_4$@HMN-COF, $Fe_3O_4$@MAN-COF, and $Fe_3O_4$@SIN-COF are analyzed using both Pseudo-First-Order and Pseudo-Second-Order kinetic models. FIG. 19A-19F depict the kinetic models for adsorption of imidacloprid on three different composites: $Fe_3O_4$@MAN-COF, $Fe_3O_4$@HMN-COF, and $Fe_3O_4$@SIN-COF. FIG. 19A and FIG. 19B present the pseudo-second-order and pseudo-first-order diffusion model plots for $Fe_3O_4$@MAN-COF, respectively. FIG. 19C and FIG. 19D illustrate the pseudo-second-order and pseudo-first-order diffusion model plots for $Fe_3O_4$@HMN-COF, respectively. FIG. 19 E and FIG. 19 F show the pseudo-second-order and pseudo-first-order diffusion model plots for $Fe_3O_4$@SIN-COF, respectively.

The experimental adsorption capacities ($q_e$,exp) are 600 mg/g, 480 mg/g, and 375 mg/g for $Fe_3O_4$@HMN-COF, $Fe_3O_4$@MAN-COF, and $Fe_3O_4$@SIN-COF, respectively. The Pseudo-First-Order model shows moderate fits, with correlation coefficients ($R^2$) around 0.8 and significantly lower calculated adsorption capacities ($q_e$,cal) than the experimental values. Specifically, the ($R^2$) values are 0.7921, 0.8005, and 0.7983, and the ($q_e$,cal) values are 35.48 mg/g, 27.33 mg/g, and 20.12 mg/g for $Fe_3O_4$@HMN-COF, $Fe_3O_4$@MAN-COF, and $Fe_3O_4$@SIN-COF, respectively. In contrast, the Pseudo-Second-Order model demonstrates a much better fit, with ($R^2$) values near 1.0 (0.9998, 0.9997, and 0.9996) and ($q_e$,cal) values closely matching the experimental data (598.5 mg/g, 478.0 mg/g, and 372.5 mg/g). This indicates that the adsorption process is more accurately described by the Pseudo-Second-Order model, suggesting that the process is likely controlled by chemisorption involving electron sharing or exchange between the adsorbent and adsorbate. Therefore, the Pseudo-Second-Order model is more suitable for describing the adsorption kinetics of these COFs, providing valuable insights for optimizing the design of COF-based adsorbents for practical applications. Table 1 depicts the adsorption kinetics parameters for $Fe_3O_4$@MAN-COF, $Fe_3O_4$@HMN-COF, and $Fe_3O_4$@SIN-COF for the adsorption of Imidacloprid.

In another embodiment to evaluate the adsorption properties of COFs, the adsorption isotherms of imidacloprid onto $Fe_3O_4$@MAN-COF, $Fe_3O_4$@HMN-COF, and $Fe_3O_4$@SIN-COF are analysed to understand the adsorption capacity and surface characteristics of the COFs. To study the adsorption isotherms of imidacloprid onto $Fe_3O_4$@MAN-COF, $Fe_3O_4$@HMN-COF, and $Fe_3O_4$@SIN-COF, imidacloprid solutions with varying concentrations (5, 10, 20, 30, 40, 50 mg/L) are prepared. Each COF composite of 50 mg is added to 50 mL of the imidacloprid solutions in separate flasks and shaken at 200 rpm for 24 hours at room temperature to reach equilibrium. After centrifugation and filtration, the residual imidacloprid concentration is measured using LC-MS/MS, and the adsorption capacity (mg/g) is subsequently calculated. FIG. 18B represents the adsorption isotherms of $Fe_3O_4$@HMN-COF, $Fe_3O_4$@MAN-COF, and $Fe_3O_4$@SIN-COF, showing higher equilibrium adsorption capacities ($q_e$) for $Fe_3O_4$@HMN-COF compared to the other COFs.

The experimental data are analysed using both the Langmuir and Freundlich isotherm models. The Langmuir isotherm is represented by the Equation (3):

$$Q_e = \frac{Q_m k_L C_e}{1 + k_L C_e} \quad (3)$$

where $C_e$ is the equilibrium concentration of the adsorbate, $q_e$ is the amount of adsorbate adsorbed per unit mass of adsorbent, $q_m$ is the maximum adsorption capacity, and $k_L$ is the Langmuir constant related to the affinity of the binding sites.

The Freundlich isotherm is represented by Equation (4):

$$Q_e = K_F C_e^{1/n} \quad (4)$$

where $K_F$ and n Freundlich constants indicative of the adsorption capacity and adsorption intensity, respectively.

In the present embodiment of the invention, the adsorption isotherms of imidacloprid onto $Fe_3O_4$@HMN-COF, $Fe_3O_4$@MAN-COF, and $Fe_3O_4$@SIN-COF are analysed using both Langmuir and Freundlich models. FIG. 20A-20F represent the adsorption isotherms for imidacloprid on three different composites: $Fe_3O_4$@MAN-COF, $Fe_3O_4$@HMN-COF, and $Fe_3O_4$@SIN-COF. FIG. 20A shows the Linearized Langmuir isotherms and FIG. 20B depicts Linearized Freundlich isotherms for iodine adsorption on $Fe_3O_4$@MAN-COF. FIG. 20C illustrates Linearized Langmuir isotherms and FIG. 20D shows Linearized Freundlich isotherms for iodine adsorption on $Fe_3O_4$@HMN-COF. FIG. 20E and FIG. 20F represent Linearized Langmuir isotherms and

TABLE 1

Adsorption kinetics parameters for $Fe_3O_4$@MAN-COF, $Fe_3O_4$@HMN-COF, and $Fe_3O_4$@SIN-COF for adsorption of Imidaclopird.

| COFs | $q_{e,exp}$ (mg/g) | Pseudo-First-Order Model | | | Pseudo-Second-Order Model | | |
|---|---|---|---|---|---|---|---|
| | | $q_{e,cal}$ (mg/g) | $k_1$ (min$^{-1}$) | $R^2$ | $q_{e,cal}$ (mg/g) | $k_2$ (g/(mg min)) | $R^2$ |
| $Fe_3O_4$@HMN-COF | 600.0 | 35.48 | 0.01145 | 0.7921 | 598.5 | 0.00423 | 0.9998 |
| $Fe_3O_4$@MAN-COF | 480.0 | 27.33 | 0.01235 | 0.8005 | 478.0 | 0.00489 | 0.9997 |
| $Fe_3O_4$@SIN-COF | 375.0 | 20.12 | 0.01329 | 0.7983 | 372.5 | 0.00511 | 0.9996 |

Linearized Freundlich isotherms respectively for iodine adsorption on $Fe_3O_4$@SIN-COF.

The Langmuir model provides a superior fit for all three COFs, indicated by higher $R^2$ values (0.995, 0.993, and 0.990) compared to the Freundlich model (0.95, 0.94, and 0.93). This suggests monolayer adsorption on a homogeneous surface. The maximum adsorption capacities $q_{max}$ from the Langmuir model are 630.0 mg/g for $Fe_3O_4$@HMN-COF, 500.0 mg/g for $Fe_3O_4$@MAN-COF, and 400.0 mg/g for $Fe_3O_4$@SIN-COF, indicating high affinity for imidacloprid. The n values for the Freundlich model are all greater than 1, classifying the isotherms as L-type, suggesting favorable adsorption conditions as shown in Table 2, which provides the adsorption isotherm parameters for $Fe_3O_4$@HMN-COF, $Fe_3O_4$@MAN-COF, and $Fe_3O_4$@SIN-COF. Additionally, smaller 1/n values indicate moderate adsorption heterogeneity. These results confirm the effectiveness and somewhat heterogeneous nature of the COFs as adsorbents for imidacloprid, providing valuable insights for optimizing COF-based adsorbents in environmental remediation.

The relevant equations for determining the thermodynamic parameters—Gibbs free energy $\Delta G$, enthalpy change $\Delta H$, and entropy change $\Delta S$—are Equations (5), (6) and (7) as follows:

$$\Delta G = -RT \ln K \qquad (5)$$

$$\ln K = \frac{\Delta S}{R} - \frac{\Delta H}{RT} \qquad (6)$$

$$K = \frac{Q_e}{C_e} \qquad (7)$$

where R is the gas constant (8.314 J/(mol·K)), T is the temperature (K), and K is the thermodynamic equilibrium constant.

The values of $\Delta G$, $\Delta H$ and $\Delta S$ are calculated for $Fe_3O_4$@HMN-COF, $Fe_3O_4$@MAN-COF, and $Fe_3O_4$@SIN-COF. Table 3 summarizes the thermodynamic parameters for the adsorption of Imidacloprid ($Fe_3O_4$@HMN-COF, $Fe_3O_4$@MAN-COF, and $Fe_3O_4$@SIN-COF) at different temperatures. Parameters include Gibbs free energy ($\Delta G$), enthalpy ($\Delta H$), and entropy ($\Delta S$). As seen in Table 3, the Gibbs free energy $\Delta G$ is generally less than 0 across the

| COFs | Langmuir $q_{max}$ (mg/g) | Langmuir $k_L$ (L/mg) | Langmuir $R^2$ | Freundlich $K_F$ | Freundlich n | Freundlich $R^2$ |
|---|---|---|---|---|---|---|
| $Fe_3O_4$@HMN-COF | 630.0 | 0.12 | 0.995 | 10.0 | 1.5 | 0.95 |
| $Fe_3O_4$@MAN-COF | 500.0 | 0.15 | 0.993 | 8.0 | 1.6 | 0.94 |
| $Fe_3O_4$@SIN-COF | 400.0 | 0.18 | 0.990 | 6.0 | 1.7 | 0.93 |

Table 2. Adsorption Isotherm Parameters for $Fe_3O_4$@HMN-COF, $Fe_3O_4$@MAN-COF, and $Fe_3O_4$@SIN-COF In an embodiment of the invention, the adsorption properties of COF composites are investigated by analyzing their adsorption thermodynamics. The adsorption thermodynamics are studied by varying the adsorption temperature across four specific temperatures: 283.0 K, 288.0 K, 298.0 K, and 308.0 K. To study the of imidacloprid onto $Fe_3O_4$@MAN-COF, $Fe_3O_4$@HMN-COF, and $Fe_3O_4$@SIN-COF, imidacloprid solutions (10 mg/L) are prepared, and 50 mg of each COF composite is added to 50 mL of the solution. The mixtures are shaken at 200 rpm in a thermostatic water bath at four temperatures: 283.0 K, 288.0 K, 298.0 K, and 308.0 K for 24 hours to reach equilibrium. After centrifugation and filtration, the residual imidacloprid concentration is measured using LC-MS/MS, and the adsorption capacity (mg/g) is calculated.

temperatures, indicating that the adsorption process is spontaneous for all three COFs. The enthalpy change $\Delta H$ values, ranging from 15.4 kJ/mol to 22.1 kJ/mol, suggest that the adsorption is endothermic, meaning the adsorption capacity increases with temperature. The enthalpy values also distinguish between physical and chemical adsorption. When $2.1 < |\Delta H| < 20.9$ kJ/mol, the adsorption process is mainly physisorption; when $20.9 < |\Delta H| < 418.4$ kJ/mol, it is dominated by chemisorption. The $\Delta H$ values for $Fe_3O_4$@HMN-COF and $Fe_3O_4$@MAN-COF indicate physisorption, while $Fe_3O_4$@SIN-COF exhibits chemisorption characteristics. The entropy change $\Delta S$ values are positive, indicating an increase in entropy during the adsorption process. This is likely due to the disruption and reorganization of the adsorbent surface as imidacloprid molecules are captured by the COFs. These thermodynamic parameters provide critical insights into the adsorption mechanism, highlighting the spontaneous, endothermic nature of the process and aiding in the optimization of COF-based adsorbents for environmental remediation applications.

TABLE 3

Thermodynamic parameters for the adsorption of Imidacloprid on $Fe_3O_4$-functionalized COFs ($Fe_3O_4$@HMN-COF, $Fe_3O_4$@MAN-COF, and $Fe_3O_4$@SIN-COF) at different temperatures. Parameters include Gibbs free energy ($\Delta G$), enthalpy ($\Delta H$), and entropy ($\Delta S$).

| COFs | $\Delta G$ (kJ/mol) at 283.0K | $\Delta G$ (kJ/mol) at 288.0K | $\Delta G$ (kJ/mol) at 298.0K | $\Delta G$ (kJ/mol) at 308.0K | $\Delta H$ (kJ/mol) | $\Delta S$ (J/(mol·K)) |
|---|---|---|---|---|---|---|
| $Fe_3O_4$@HMN-COF | −16.2 | −15.7 | −15.0 | −14.3 | 15.4 | 101.0 |
| $Fe_3O_4$@MAN-COF | −13.8 | −13.3 | −12.5 | −11.8 | 18.2 | 102.0 |
| $Fe_3O_4$@SIN-COF | −11.4 | −10.9 | −10.0 | −9.2 | 22.1 | 108.0 |

These values indicate that the adsorption of imidacloprid onto these COFs is spontaneous, as evidenced by the negative $\Delta G$ values. The positive $\Delta H$ values confirm that the adsorption process is endothermic, meaning that it requires heat absorption, and the adsorption capacity increases with temperature. Additionally, the positive $\Delta S$ values suggest an increase in entropy, likely due to the disruption and reorganization of the adsorbent surface as imidacloprid molecules are captured by the COFs. FIG. 18C shows the effect of temperature on $q_e$ revealing an endothermic adsorption process, with $q_e$ increasing as the temperature rises. FIG. 18D represents the Van't Hoff plot confirms the endothermic nature of the adsorption process across all three COFs. These insights are crucial for understanding the adsorption mechanism and optimizing the conditions for practical applications of COF-based adsorbents in environmental remediation.

Table 4 presents the adsorption capacities ($q_{exp}$) of various adsorbents, highlighted in different studies. The data showcases the performance of a wide range of materials used for adsorption purposes, comprising Covalent Organic Frameworks (COFs), Metal-Organic Frameworks (MOFs), biochars, and composites.

TABLE 4

Adsorption capacities ($q_{exp}$) of various adsorbents as reported in different studies. The data highlights the performance of a wide range of materials used for adsorption purposes, including COFs, MOFs, biochars, and composites.

| Adsorbent | $q_{exp}$ (mg/g) | References |
|---|---|---|
| UiO-66-NH$_2$ | 83.26 | [1] |
| COF-300 | 39.37 | [2] |
| KOH-activated Magnetic Biochar | 313 | [3] |
| Eucalyptus Woodchip Biochar | 14.75 | [4] |
| Phosphoric Acid-Activated Carbon | 35.7 | [5] |
| ZIF-67@ MPPOP | 80.53 | [6] |
| MIL-101(Cr) | 50.38 | [7] |
| ZIF-67/CS@C | 189 | [8] |
| HY4 zeolite | 165.8 | [9] |
| U-COF | 217.2 | [10] |
| $Fe_3O_4$@HMN-COF | 598.5 | This work |
| $Fe_3O_4$@MAN-COF | 478.0 | This work |
| $Fe_3O_4$@SIN-COF | 372.5 | This work |

Among the adsorbents listed, $Fe_3O_4$@HMN-COF, $Fe_3O_4$@MAN-COF, and $Fe_3O_4$@SIN-COF from the current disclosure exhibit exceptionally high adsorption capacities of 598.5 mg/g, 478.0 mg/g, and 372.5 mg/g, respectively. These values significantly surpass those of other materials reported. For instance, UiO-66-NH$_2$, a well-known MOF, has an adsorption capacity of 83.26 mg/g, while COF-300, a representative COF, shows a capacity of 39.37 mg/g. Biochars and activated carbons, despite their diverse sources and activation methods, generally exhibit lower adsorption capacities compared to the $Fe_3O_4$-functionalized COFs. For example, KOH-activated magnetic biochar has a capacity of 313 mg/g, whereas eucalyptus woodchip biochar only achieves 14.75 mg/g. Phosphoric acid-activated carbon shows a capacity of 35.7 mg/g. Other notable materials include ZIF-67@MPPOP and ZIF-67/CS@C composites, with adsorption capacities of 80.53 mg/g and 189 mg/g, respectively, and MIL-101 (Cr) at 50.38 mg/g. HY4 zeolite and U-COF also demonstrate relatively high capacities of 165.8 mg/g and 217.2 mg/g, respectively. The superior performance of $Fe_3O_4$@HMN-COF, $Fe_3O_4$@MAN-COF, and $Fe_3O_4$@SIN-COF are attributed to the synergistic effect of $Fe_3O_4$ nanoparticles and the COF matrix. The $Fe_3O_4$ nanoparticles enhance the adsorption process by improving electron-hole separation and generating reactive oxygen species (ROS), which significantly increase the interaction with the adsorbate. Moreover, the COF structure provides a high surface area and numerous active sites for adsorption, leading to higher capacities.

In another embodiment of this invention, the ratio of magnetic COF composites is optimized for enhanced Imidacloprid adsorption. The study evaluates the effectiveness of various COFs and their magnetic composites in adsorbing imidacloprid from aqueous environments by examining their adsorption capacities, starting with an initial concentration of 10 mg/kg of imidacloprid. For an enhanced imidacloprid adsorption, imidacloprid solutions are prepared with an initial concentration of 10 mg/L. Pure COFs (HMN-COF, MAN-COF, and SIN-COF) and their magnetic composites are tested with different ratios of COF to magnetic iron nanoparticles (1:1, 2:1, 1:2). 50 mg of each COF composite is added to 50 mL of the imidacloprid solution in separate flasks and shaken at 200 rpm for 24 hours at room temperature. After equilibrium is reached, the samples are centrifuged at 4000 rpm for 10 minutes to separate the adsorbent. The supernatant is filtered through a 0.22 μm syringe filter and the residual imidacloprid concentration is analysed using LC-MS/MS.

FIG. 21 shows the percentage removal efficiency of different COF samples and their mixtures with iron nanoparticles. The graph compares pure HMN-COF, MAN-COF, and SIN-COF with $Fe_3O_4$ nanoparticles and their respective mixtures at ratios of 1:1, 2:1, and 1:2. The results show the removal efficiency for HMN-COF, MAN-COF, and SIN-COF individually and in combination with magnetic iron nanoparticle, indicating the tunability of COF and iron nanoparticle compositions for optimal removal efficiency in various applications. Among the pure COFs— HMN-COF, MAN-COF, and SIN-COF—HMN-COF exhibits the highest efficiency, achieving a final concentration of 0.10 mg/kg (99% removal). MAN-COF follows with a final concentration of 0.90 mg/kg (91% removal), and SIN-COF with 1.30 mg/kg (87% removal). These findings highlight the superior adsorption capabilities of HMN-COF, attributed to its nitrogen-rich structure and extensive π-electron systems, which enhance π-π interactions, hydrophobic interactions, and hydrogen bonding with imidacloprid molecules. The performance of magnetic iron nanoparticles alone is considerably less effective, with a final imidacloprid concentration of 2.00 mg/kg (80% removal), highlighting their limited adsorption capacity. This result underscores the necessity of combining magnetic properties with COFs to enhance adsorption efficiency while retaining the practical benefits of easy separation and recovery from water sources. The incorporation of magnetic iron nanoparticles into the COFs significantly impact their adsorption capabilities. The composite HMN-COF+Magnetic Iron (1:1) shows no detectable levels of imidacloprid, indicating an exceptionally high adsorption efficiency (100% removal). Similarly, the HMN-COF+Magnetic Iron (2:1) composite maintains a low imidacloprid concentration of 0.04 mg/kg (99.6% removal), confirming the effectiveness of HMN-COF when combined with magnetic iron in appropriate ratios. However, when the proportion of magnetic iron is increased (1:2), the efficiency decreases, resulting in a higher imidacloprid concentration of 1.00 mg/kg (90% removal). This trend suggests that an optimal ratio of COF to magnetic iron is crucial for maximizing adsorption performance.

The MAN-COF composites exhibits comparable trends. The MAN-COF+Magnetic Iron (1:1) and (2:1) composites achieve low imidacloprid concentrations of 0.30 mg/kg (97% removal) and 1.00 mg/kg (90% removal), respectively. In contrast, the (1:2) ratio composite shows a significantly higher concentration of 1.50 mg/kg (85% removal), indicating diminished adsorption efficiency with excess magnetic iron. For the SIN-COF composites, the (1:1) and (2:1) ratios yield imidacloprid concentrations of 0.70 mg/kg (93% removal) and 1.20 mg/kg (88% removal), respectively, demonstrating effective adsorption. However, the SIN-COF+ Magnetic Iron (1:2) composite shows the highest imidacloprid concentration of 2.50 mg/kg (75% removal) among all samples, suggesting a considerable reduction in adsorption efficiency with increased magnetic iron content. The invention in the embodiment, demonstrates that varying the ratios of COF to magnetic iron nanoparticles significantly impacts adsorption efficiency. Optimal ratios such as 1:1 or 2:1 enhance adsorption performance by providing adequate support to the COF structure, increasing surface area, and maintaining porosity, which are essential for effective imidacloprid capture. These ratios also facilitate easy separation due to magnetic properties. However, higher ratios of magnetic iron (1:2) result in excess nanoparticles that can block COF pores and cause agglomeration, reducing the available surface area and accessibility of active sites, thus decreasing adsorption efficiency. The findings underscore the importance of a balanced COF to magnetic iron ratio for optimal adsorption performance.

Figure 22:
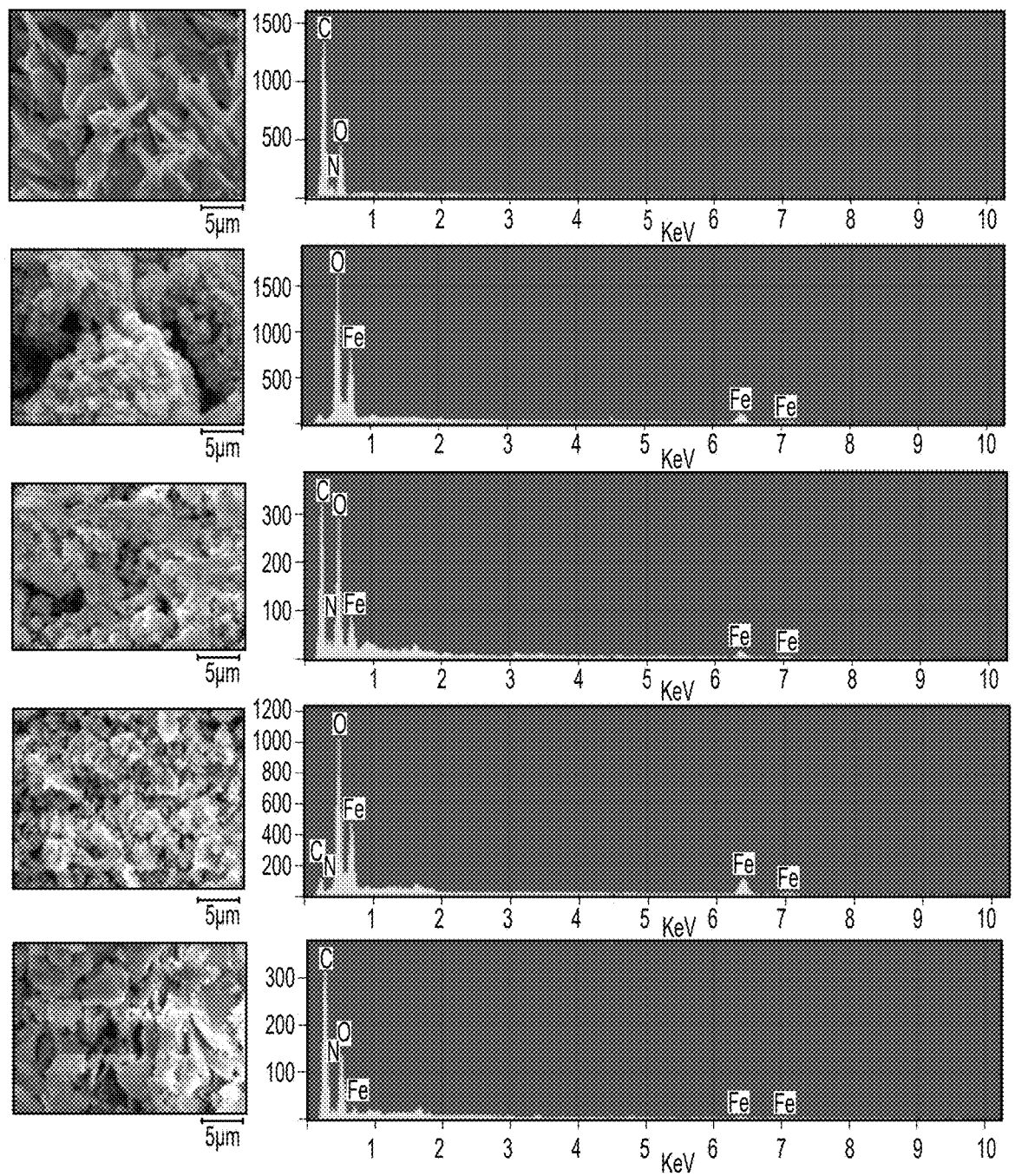
FIG. 22 shows the EDX analysis of HMN-COF, pure iron nanoparticles, and their mixtures with iron nanoparticles at ratios of 1:1, 2:1, and 1:2, in accordance with the present invention.

In an embodiment of the invention, HMN-COF emerges as the most effective adsorbent when combined with magnetic iron in a balanced ratio, offering a promising solution for removing imidacloprid from water and addressing environmental and health risks. The SEM analysis of HMN-COF, performed in another embodiment of the invention, reveals significant morphological differences when mixed with iron nanoparticles in various ratios. Pure HMN-COF shows a highly porous, layered structure with uniform sheet-like formations and numerous voids, contributing to its high surface area. In contrast, pure iron nanoparticles form densely packed clusters of small, spherical particles with a rough, sponge-like texture, indicating high aggregation due to magnetic interactions. In mixed ratios, distinct structures are found to emerge: the 1:2 HMN-COF ratio is predominantly iron-rich, with large, irregular particles and significant aggregation; the 2:1 HMN-COF ratio maintains the COF's characteristic porosity with well-dispersed iron particles; and the 1:1 mixture presents a balanced structure with moderate porosity and aggregation. These observations highlight the influence of varying iron concentrations on the structural integrity and porosity of HMN-COF, which are crucial for imidacloprid adsorption. Pure HMN-COF's extensive surface area is ideal for adsorption, while iron nanoparticles enable magnetic separation despite causing lower adsorption efficiency. Among the mixtures, the 2:1 HMN-COF ratio is optimal for imidacloprid adsorption, balancing high adsorption capacity with ease of separation, while the 1:1 mixture combines sufficient adsorption sites with effective magnetic separation. In another embodiment, the EDX analysis of HMN-COF, pure iron nanoparticles, and their mixtures with iron nanoparticles at ratios of 1:1, 2:1, and 1:2 reveals distinct elemental compositions, as shown in FIG. 22.

Sample A is pure HMN-COF, showing a highly structured morphology with EDX (Graph A) revealing predominant peaks for carbon (C), oxygen (O), and nitrogen (N), indicating its rich elemental composition. Sample B consists of pure iron nanoparticles, with EDX (Graph B) exhibiting a granular structure of prominent iron peaks, with minimal presence of other elements carbon (C) and oxygen (O), highlighting their purity. Sample C has a 1:1 ratio of HMN-COF to iron nanoparticles sample and Graph C showing a mixed morphology of balanced peaks for carbon (C), oxygen (O), nitrogen (N), and iron (Fe), indicating an equal mix of HMN-COF and iron. Sample E has a 2:1 ratio of HMN-COF to iron, featuring a layered structure with peaks for carbon (C), oxygen (O), nitrogen (N), and iron (Fe). Graph E is COF-dominant, with higher peaks for carbon and oxygen and lower iron peaks, suggesting improved adsorption properties due to the enhanced COF content. Conversely, Sample D having 1:2 ratio of HMN-COF to iron, displays a porous texture with peaks for carbon (C), oxygen (O), and iron (Fe). Graph D shows prominent iron peaks, indicating a higher iron content suitable for applications requiring strong magnetic properties. These results demonstrate the tunability of HMN-COF and iron nanoparticle compositions for various applications by adjusting their ratios, optimizing both adsorption efficiency and magnetic separation properties.

In an embodiment of the invention, the reusability of $Fe_3O_4$@COF adsorbents is analysed as it is a crucial feature for evaluating their practicability. To evaluate the reusability of $Fe_3O_4$@HMN-COF, $Fe_3O_4$@MAN-COF, and $Fe_3O_4$@SIN-COF for imidacloprid adsorption, the adsorption-desorption process is repeatedly conducted over five cycles using ethanol as the eluent. Initially, imidacloprid solutions (10 mg/L) are prepared and about 50 mg of each COF composite is added to 50 mL of the solution in separate flasks. The flasks are shaken at 200 rpm for 24 hours at room temperature, then centrifuged at 4000 rpm for 10 minutes. The supernatant is filtered to measure the residual imidacloprid concentration using LC-MS/MS. For desorption, the adsorbed COF composites are washed with ethanol, shaken for 24 hours, centrifuged, and then filtered. The regenerated COFs are reused for the next adsorption cycle. This process is repeated for a total of five cycles. After each cycle, the adsorption capacity and retention percentage of the initial capacity are calculated. In this embodiment, FT-IR analyses are performed on the COFs before and after the cycles to confirm imidacloprid adsorption and to assess the stability.

FIG. 23A shows the adsorption capacity ($q_e$, mg/g) of $Fe_3O_4$@HMN-COF, $Fe_3O_4$@MAN-COF, and $Fe_3O_4$@SIN-COF over multiple cycling times. As shown in FIG. 23A, the adsorption capacity of these COFs for imidacloprid remains essentially unchanged after five cycles of adsorption-desorption. $Fe_3O_4$@HMN-COF retains the highest percentage of its initial adsorption capacity over five cycles, maintaining approximately 93.3% of its initial capacity. $Fe_3O_4$@MAN-COF follows next with about 85.0% retention, while $Fe_3O_4$@SIN-COF shows the most significant decrease, retaining around 79.0% of its initial capacity. These results highlight the robustness and efficiency of $Fe_3O_4$@HMN-COF in adsorbing imidacloprid over multiple cycles, making it the most suitable candidate for practical applications requiring high reusability and stability. FIGS. 23B, 23C and 23D illustrate FT-IR spectra of $Fe_3O_4$@HMN-COF, $Fe_3O_4$@MAN-COF, and $Fe_3O_4$@SIN-COF respectively, before and after adsorption of imidacloprid and showing characteristic peaks indicating successful adsorption. FT-IR analyses thereby confirm successful imidacloprid adsorption by showing characteristic peaks of the nitro group (1578-1588 $cm^{-1}$) and nitrile group (2180-2225 $cm^{-1}$) in the COFs, with minimal peak displacement indicating high stability. These combined mechanisms and stability suggest that these COFs are effective and practical for removing imidacloprid from aqueous solutions.

An embodiment of the present invention analyses the adsorption of Imidacloprid by the $Fe_3O_4$@COF composites in actual samples. The practical applicability of $Fe_3O_4$@HMN-COF, $Fe_3O_4$@MAN-COF, and $Fe_3O_4$@SIN-COF in adsorbing Imidacloprid is evaluated by testing their performance in honey and fruit samples, comprising apples, pears, and strawberries. For the sample preparation, environmental water samples from wells in an agricultural irrigation system and tap water from the laboratory are collected. All water samples are filtered through a 0.45 μm membrane to eliminate particles and are stored in brown glass bottles at 4° C. before undergoing the extraction process. For honey samples, the samples are dilute with high-purity water at a 1:20 ratio, followed by filtration using a 0.45 μm filter membrane. For fruit samples, 1 g of homogenized sample is weighed into a 50 mL centrifuge tube and 10 mL of methanol is added to perform ultrasonic extraction for 10 minutes. The mixture is centrifuged at 8000 rpm for 5 minutes and the resulting supernatant is filtered. FIG. 24 demonstrates the adsorption capacities ($q_e$, mg/g) of $Fe_3O_4$@HMN-COF, $Fe_3O_4$@MAN-COF, and $Fe_3O_4$@SIN-COF in honey, apple, pear, and strawberry, with error bars indicating consistent and reproducible measurements.

The adsorption results, illustrated in FIG. 24, showcase the potential of these COFs for real-world applications. All three COFs demonstrate excellent adsorption performance in honey, maintaining high efficacy similar to that observed in pure water. This indicates a robust interaction between the COFs and Imidacloprid, which is unaffected by the complex matrix of honey. On examining the fruit samples, including apples, pears, and strawberries, a slight decrease in adsorption capacity is observed compared to pure water. This reduction can be attributed to the presence of natural organic substances inherent to the fruits. For instance, organic acids present in apples, pears, and strawberries can alter the pH of the adsorption environment. Such pH changes can affect the surface charge and the interaction dynamics between the COFs and Imidacloprid, leading to a decrease in adsorption efficiency. Despite the reduction, the decrease in adsorption capacity remains less than 10% for all COFs across all fruit samples. This minor decrease significantly underscores the universal applicability of $Fe_3O_4$@HMN-COF, $Fe_3O_4$@MAN-COF, and $Fe_3O_4$@SIN-COF in diverse and complex matrices. The consistent performance across different fruit samples highlights the adaptability of these COFs, making them suitable for broad-spectrum applications in agricultural and food safety sectors. These results presented herein suggest that $Fe_3O_4$@HMN-COF, $Fe_3O_4$@MAN-COF, and $Fe_3O_4$@SIN-COF are effective adsorbents for Imidacloprid, even in the presence of competing natural substances.

The bar chart in FIG. 24 illustrates the adsorption capacities ($q_e$, mg/g) of $Fe_3O_4$-functionalized COFs (HMN-COF, MAN-COF, and SIN-COF) for honey, apple, pear, and strawberry. $Fe_3O_4$@HMN-COF consistently demonstrates the highest adsorption capacities across all substances, particularly for honey, with values around 600 mg/g. For apples and pears, $Fe_3O_4$@HMN-COF maintains a slight edge over $Fe_3O_4$@MAN-COF and $Fe_3O_4$@SIN-COF, though all COFs show similar adsorption for strawberries, indicating comparable interactions. The relatively small error bars suggest consistent and reproducible measurements. Overall, $Fe_3O_4$@HMN-COF's superior adsorption performance highlights its potential as the most versatile COF for diverse adsorption applications. This emphasizes the importance of substance-specific interactions and suggests $Fe_3O_4$@HMN-COF as an advantageous choice for high adsorption capacities.

In another embodiment of the present invention, the adsorption mechanism of $Fe_3O_4$@MAN-COF, $Fe_3O_4$@HMN-COF, and $Fe_3O_4$@SIN-COF is analysed thoroughly. Imidacloprid is a highly polar compound with numerous hydrogen bonding sites and electron-withdrawing groups, such as nitrile and nitro groups, which have a strong affinity for ligands with electron-rich groups. The present invention, in order to enhance adsorption of this compound, has designed adsorbents so as to incorporate electron-rich groups, such as amino or hydroxyl groups, which improve hydrophilicity and provide more specific interactions. The adsorption mechanisms of imidacloprid on $Fe_3O_4$@MAN-COF, $Fe_3O_4$@HMN-COF, and $Fe_3O_4$@SIN-COF involve a combination of electrostatic interactions, hydrogen bonding, and π-π interactions. $Fe_3O_4$@MAN-COF, with carboxyl groups and triazine moieties, primarily relies on electrostatic attraction at low pH, hydrogen bonding, and π-π stacking with imidacloprid's aromatic rings. $Fe_3O_4$@HMN-COF, featuring hydroxyl groups and ether linkages, exhibits strong hydrogen bonding and π-π interactions across a wide pH range, making it highly effective for imidacloprid adsorption. $Fe_3O_4$@SIN-COF, containing biphenyl, hydroxyl, and carboxylic acid functionalities, utilizes electrostatic interactions at low pH, hydrogen bonding, and π-π stacking to achieve effective adsorption. These combined mechanisms enable efficient removal of imidacloprid from aqueous solutions by all three COFs. To analyse the adsorption mechanism of imidacloprid onto $Fe_3O_4$@MAN-COF, $Fe_3O_4$@HMN-COF, and $Fe_3O_4$@SIN-COF, an embodiment of the invention characterizes the adsorbents before and after adsorption using XPS (X-ray photoelectron spectroscopy). FIG. 25A-25F illustrate XPS spectra of $Fe_3O_4$@MAN-COF, $Fe_3O_4$@HMN-COF, and $Fe_3O_4$@SIN-COF composites. According to these figure, FIGS. 25A, 25B and 25C show the spectra and atomic percentages of C 1S, N 1S, and O 1S for $Fe_3O_4$@MAN-COF, $Fe_3O_4$@HMN-COF, and $Fe_3O_4$@SIN-COF, respectively. FIGS. 25D, 25E and 25F depict the same composites with additional peaks for Cl 2p, confirming the adsorption of imidacloprid. An increase in nitrogen content is also observed, further indicating successful adsorption of imidacloprid onto the COF materials.

It can be observed that the XPS spectra also reveal changes in atomic percentages, with decreases in carbon content ($Fe_3O_4$@MAN-COF: 80.75% to 78.27%, $Fe_3O_4$@HMN-COF: 80.19% to 78.65%, $Fe_3O_4$@SIN-COF: 80.75% to 78.90%). It also shows an increase in nitrogen content ($Fe_3O_4$@MAN-COF: 10.01% to 10.40%, $Fe_3O_4$@HMN-COF: 9.90% to 10.80%, $Fe_3O_4$@SIN-COF: 8.78% to 10.30%), and an appearance of chlorine peaks ($Fe_3O_4$@MAN-COF: 0.50%, $Fe_3O_4$@HMN-COF: 0.53%, $Fe_3O_4$@SIN-COF: 0.46%), which further confirm the successful adsorption of imidacloprid. In another embodiment, FIG. 26A-26B, FIG. 26C-26D and FIG. 26E-26F depict XPS C 1s spectra for $Fe_3O_4$@HMN-COF, $Fe_3O_4$@MAN-COF, and $Fe_3O_4$@SIN-COF before and after adsorption of Imidacloprid respectively. The binding energy and relative percentage of various carbon species (C—C/C═C, C—N/C═N, C═O, π-π*) are indicated for each sample. Changes in peak intensities and binding energies are observed which highlight the interactions between Imidacloprid and the COFs. These changes in binding energy and peak intensities indicate strong π-π* interactions between the aromatic rings of imidacloprid and the COF frameworks, along with possible hydrogen bonding or electrostatic interactions. Overall, the XPS analysis demonstrates the effective adsorption of imidacloprid onto $Fe_3O_4$@MAN-COF, $Fe_3O_4$@HMN-COF, and $Fe_3O_4$@SIN-COF, facilitated by multiple interaction mechanisms. As a result, these magnetic COFs present as suitable adsorbents for pesticide removal.

The XPS high-resolution C 1s spectra shown in FIG. 26A-26F as described above, provide valuable insights into the chemical interactions between the three magnetic COFs ($Fe_3O_4$@MAN-COF, $Fe_3O_4$@HMN-COF, and $Fe_3O_4$@SIN-COF) and imidacloprid. Before adsorption, the spectra for all three COFs exhibit distinct peaks assigned to C—C/C═C at 284.6 eV ($Fe_3O_4$@MAN-COF: 55.74%, $Fe_3O_4$@HMN-COF: 56.01%, $Fe_3O_4$@SIN-COF: 57.23%), C—N/C═N at 286.0 eV ($Fe_3O_4$@MAN-COF: 29.00%, $Fe_3O_4$@HMN-COF: 28.75%, $Fe_3O_4$@SIN-COF: 27.65%), C—O at 288.4 eV ($Fe_3O_4$@MAN-COF: 11.08%, $Fe_3O_4$@HMN-COF: 10.80%, $Fe_3O_4$@SIN-COF: 10.30%), and π-π* shake-up satellite at 291.1 eV ($Fe_3O_4$@MAN-COF: 4.18%, $Fe_3O_4$@HMN-COF: 4.35%, $Fe_3O_4$@SIN-COF: 4.82%). This represents various carbon environments within the COF structures. After adsorption, notable changes are observed: the C—C/C═C peaks slightly shift and reduce in intensity to 284.6 eV ($Fe_3O_4$@MAN-COF: 53.26%, $Fe_3O_4$@HMN-COF: 54.12%, $Fe_3O_4$@SIN-COF: 55.34%), indicating interactions with imidacloprid. The C—N/C═N peaks remain relatively constant at 286.1 eV ($Fe_3O_4$@MAN-COF: 29.43%, $Fe_3O_4$@HMN-COF: 29.15%, $Fe_3O_4$@SIN-COF: 29.35%), suggesting stable nitrogen interactions. The C═O peaks increase slightly to 288.0 eV ($Fe_3O_4$@MAN-COF: 11.28%, $Fe_3O_4$@HMN-COF: 11.15%, $Fe_3O_4$@SIN-COF: 11.20%), and the π-π* shake-up satellite peaks shift to 290.8 eV with higher intensities ($Fe_3O_4$@MAN-COF: 6.03%, $Fe_3O_4$@HMN-COF: 5.58%, $Fe_3O_4$@SIN-COF: 6.02%), indicating enhanced π-π* interactions.

In an embodiment of the present disclosure, the photocatalytic degradation of imidacloprid by $Fe_3O_4$@COF composites is subjected to analysis. The process involves optimizing various parameters such as time, catalyst dose, the concentration of pesticide, temperature, and pH in the presence of $Fe_3O_4$@MAN-COF, $Fe_3O_4$@HMN-COF, and $Fe_3O_4$@SIN-COF as catalysts. The photocatalytic degradation of imidacloprid is investigated using solutions of varying concentrations (10, 20, 30, 40, and 50 mg/L). These solutions are stirred under UV light with $Fe_3O_4$@HMN-COF, $Fe_3O_4$@MAN-COF, and $Fe_3O_4$@SIN-COF composites for specific intervals and further analysed using a UV-visible spectrophotometer at 268 nm to measure the residual imidacloprid concentration. Control experiments are conducted in the dark and without COF composites. Parameters such as irradiation time, initial concentration, catalyst dose, pH, and temperature are varied to study their impact on the degradation efficiency.

In one embodiment, an optimum composition of the catalysts is investigated. The COFs are synthesized by adding $Fe_3O_4$ nanoparticles in ratios of 1:1, 1:2, and 2:1. FIG. 27 shows percentage degradation of Imidacloprid using $Fe_3O_4$@HMN-COF, $Fe_3O_4$@MAN-COF, and $Fe_3O_4$@SIN-COF at different catalyst compositions (1:1, 1:2, and 2:1). $Fe_3O_4$@HMN-COF demonstrates the highest degradation efficiency across all compositions in the figure. Results show that the 1:1 ratio of $Fe_3O_4$ nanoparticles provides the best degradation efficiency across all COFs. The presence of $Fe_3O_4$ significantly enhances degradation by improving electron-hole separation and generating reactive oxygen species (ROS). For $Fe_3O_4$@MAN-COF, the optimal 1:1 ratio achieves a maximum efficiency of 87.9%. $Fe_3O_4$@HMN-COF exhibits the highest overall efficiency, with 97.5% degradation at the 1:1 ratio. Similarly, $Fe_3O_4$@SIN-COF reaches 84.2% efficiency at the 1:1 ratio, with decreased performance at other ratios due to charge recombination. These findings emphasize the importance of optimizing $Fe_3O_4$ content, particularly at a 1:1 ratio, to enhance the photocatalytic performance of COFs for effective environmental remediation.

In an embodiment, the effect of time on the photocatalytic degradation of imidacloprid using $Fe_3O_4$@MAN-COF, $Fe_3O_4$@HMN-COF, and $Fe_3O_4$@SIN-COF is analyzed. It involves adding 0.02 g of each $Fe_3O_4$-doped COF (1:1 ratio) to 25 mL of imidacloprid solution and stirring the samples for intervals ranging from 1 to 5 hours. In one such embodiment, the effect of UV irradiation time on the photocatalytic degradation is evaluated by stirring the imidacloprid solution at different time intervals of 60, 120, 180, 240, and 300 minutes in the presence of the catalysts under UV light. FIG. 28A, FIG. 28B, FIG. 28C and FIG. 28D illustrate the degradation of Imidacloprid over time using $Fe_3O_4$@HMN-COF, $Fe_3O_4$@MAN-COF, $Fe_3O_4$@SIN-COF, and without catalyst respectively, under light and dark conditions. The results indicate that the presence of light significantly enhances the degradation efficiency for all COFs, with $Fe_3O_4$@HMN-COF showing the highest degradation rates. The control sample without catalyst exhibits minimal degradation.

In the absence of a catalyst, 21.8% degradation of imidacloprid is observed in dark conditions, increasing to 27.4% under visible light, indicating that visible light slightly promotes the degradation process. The presence of $Fe_3O_4$@MAN-COF significantly enhances degradation, achieving 50.2% after 1 hour in dark, progressively increasing to 88.9% after 5 hours, and peaking at 95.4% under visible light. $Fe_3O_4$@HMN-COF exhibits the highest degradation efficiency, reaching 72.0% after 1 hour in the dark and 98.5% after 5 hours, with slight enhancement under visible light to 99.2%. $Fe_3O_4$@SIN-COF shows 48.0% degradation after 1 hour in the dark, increasing to 86.2% after 5 hours, and slightly higher under visible light at 89.3%. The degradation patterns with catalysts differ from those without a catalyst. In the absence of a catalyst, degradation increases slowly up to 2 hours, then rapidly to 3 hours, with little or no further degradation observed. In the presence of catalysts, degradation rapidly increases up to 2 hours, followed by a non-significant increase. These results indicate that $Fe_3O_4$-doped COFs significantly enhance the photocatalytic degradation of imidacloprid under both dark and visible light conditions, with $Fe_3O_4$@HMN-COF being the most effective, followed by $Fe_3O_4$@MAN-COF and $Fe_3O_4$@SIN-COF. This process's main advantage is the relatively lower reaction time, reducing construction and operating costs, which highlights the potential for practical applications in environmental remediation.

In one of the embodiments presented herein, the effect of different concentrations of imidacloprid on its photocatalytic degradation is investigated using $Fe_3O_4$@MAN-COF, $Fe_3O_4$@HMN-COF, and $Fe_3O_4$@SIN-COF. The initial concentration of imidacloprid is varied (10 mg/L, 20 mg/L, 30 mg/L, 40 mg/L, and 50 mg/L) in the process to study its effect on degradation. A 0.01 g portion of each $Fe_3O_4$-functionalized COF catalyst is further added to 50 mL volumes of these solutions. The samples are stirred for a specific time interval under UV light and analyzed for imidacloprid concentration. Control experiments are conducted in the dark. FIG. 29A, FIG. 29B and FIG. 29C depict the degradation efficiency of Imidacloprid at various concentrations (10-50 mg/L) under light and dark conditions using $Fe_3O_4$@HMN-COF, $Fe_3O_4$@MAN-COF, and $Fe_3O_4$@SIN-COF respectively. As per these results, all COFs show higher degradation under light conditions, with efficiency decreasing as the concentration of Imidacloprid increases and further $Fe_3O_4$@HMN-COF exhibits the highest overall degradation efficiency across all concentrations. For $Fe_3O_4$@MAN-COF, maximum degradation is observed as 74.8% at 10 mg $L^{-1}$ under UV light and 69% in the dark. Degradation decreases with higher concentrations due to increased adsorption equilibrium on active sites. $Fe_3O_4$@HMN-COF shows similar trends, with 80.1% degradation under UV light and 73.8% in the dark at 10 mg $L^{-1}$. For $Fe_3O_4$@SIN-COF, maximum degradation is 74.7% under UV light and 65.4% in the dark at the same concentration. Higher concentrations result in decreased degradation efficiency for all three COFs. $Fe_3O_4$@HMN-COF demonstrates the highest overall degradation efficiency across all concentrations. This observation highlights the importance of optimizing pesticide concentration for maximum photocatalytic performance, indicating that 10 mg $L^{-1}$ imidacloprid is optimal for effective environmental remediation using $Fe_3O_4$@MAN-COF, $Fe_3O_4$@HMN-COF, and $Fe_3O_4$@SIN-COF.

An embodiment of the invention also analyses the effect of dose of catalyst. The effect of varying doses of magnetic COFs on the photocatalytic degradation of 10 mg $L^{-1}$ imidacloprid is evaluated using catalyst amounts of 0.01, 0.02, 0.03, 0.04, and 0.05 g. Various amounts of $Fe_3O_4$@HMN-COF, $Fe_3O_4$@MAN-COF, and $Fe_3O_4$@SIN-COF composites like 0.01 g, 0.02 g, 0.03 g, 0.04 g, and 0.05 g are added to 50 mL volumes of imidacloprid solutions. The degradation is studied under UV light for a specific time interval. FIGS. 30A, 30B and 30C show the degradation efficiency of Imidacloprid at various catalyst dosages (0.01-0.05 g) under light and dark conditions using $Fe_3O_4$@HMN-COF, $Fe_3O_4$@MAN-COF, and $Fe_3O_4$@SIN-COF respectively. All COFs show higher degradation under light conditions, with efficiency decreasing as the dose of the catalyst increases. $Fe_3O_4$@HMN-COF consistently demonstrates the highest degradation efficiency across all dosages. The data presented in the above figures, show significant results, with the maximum degradation for $Fe_3O_4$@MAN-COF being achieved at 0.01 g of catalyst, resulting in 80.2% degradation under UV light and 77.4% in the dark. Increasing the catalyst dose beyond this optimal amount reduces degradation efficiency due to particle clustering and increased turbidity, which diminishes light penetration and active site availability. Similarly, $Fe_3O_4$@HMN-COF shows the highest degradation efficiency of 85.5% under UV light and 82.9% in the dark at 0.01 g of catalyst. $Fe_3O_4$@SIN-COF also demonstrates similar results, with maximum degradation efficiencies of 79.8% under UV light and 76.2% in the dark at the same catalyst dose. Increasing the dose for both $Fe_3O_4$@HMN-COF and $Fe_3O_4$@SIN-COF leads to decreased degradation due to similar issues. These findings highlight that the optimal dose of imidacloprid for maximum photocatalytic degradation is 0.01 g using $Fe_3O_4$@MAN-COF, $Fe_3O_4$@HMN-COF, and $Fe_3O_4$@SIN-COF. This analysis emphasizes the importance of optimizing catalyst dose for effective photocatalytic performance in environmental remediation and supports the potential of these magnetic COFs in achieving efficient and promising results in pollutant breakdown.

In a further embodiment of the invention, the effect of pH on photocatalytic degradation is studied. In this embodiment, the effect of different pH values on the photocatalytic degradation of 10 mg $L^{-1}$ imidacloprid using $Fe_3O_4$@MAN-COF, $Fe_3O_4$@HMN-COF, and $Fe_3O_4$@SIN-COF is investigated. The degradation process is examined by adjusting the pH of the imidacloprid solution to 3, 5, 7, 9, and 11 using HCl or NaOH solutions in the presence of 0.01 g of each catalyst. The solutions are stirred for an optimum time under both UV light and dark conditions. FIGS. 31A, 31B and 31C show the degradation efficiency of Imidacloprid at various PH levels (2-10) under light and dark conditions using $Fe_3O_4$@HMN-COF, $Fe_3O_4$@MAN-COF, and $Fe_3O_4$@SIN-COF respectively. All COFs are observed to show higher degradation under light conditions, with efficiency increasing as the pH increases and $Fe_3O_4$@HMN-COF is demonstrating the highest degradation efficiency across all pH levels.

Referring these figures, for $Fe_3O_4$@MAN-COF, degradation under dark conditions is 66.1% at pH 3, and increasing to 82.8% at pH 11. Under UV light, it increases from 75.15% at pH 3 to 88% at pH 11. $Fe_3O_4$@HMN-COF shows similar trends, with efficiencies rising from 67.3% (dark) and 76.2% (UV) at pH 3 to 75.5% (dark) and 87.3% (UV) at pH 11. $Fe_3O_4$@SIN-COF has degradation increasing from 68.7% (dark) and 76.8% (UV) at pH 3 to 79.2% (dark) and 86.4% (UV) at pH 11. Therefore, the degradation of imidacloprid is significantly influenced by pH levels, with higher pH levels accelerating the degradation process. This is primarily due to the increased concentration of hydroxide ($OH^-$) ions at higher pH, which enhances the hydrolysis of imidacloprid. The structure of imidacloprid includes an imidazolidine ring with a —C=N— bond and an electron-withdrawing —$NO_2$ group. This configuration induces a small positive charge on the molecule, making it more reactive with OH ions in alkaline solutions, thereby increasing hydrolysis and subsequent degradation. Previous studies have demonstrated that imidacloprid degrades faster at pH 10 compared to pH 7. Their study showed a 48% reduction in imidacloprid concentration at pH 10, compared to a 12% reduction at pH 7 in paddy water. Similarly, in the present invention, $Fe_3O_4$@HMN-COF demonstrates increasing degradation efficiencies with rising pH levels. At pH 3, the degradation efficiency is 67.3% under dark conditions and 76.2% under UV light. These efficiencies increase at pH 11, reaching 75.5% under dark conditions and 87.3% under UV light. This corresponds to a 12.18% increase in degradation efficiency under dark conditions and a 14.57% increase under UV light, indicating a significant enhancement in degradation efficiency at higher pH levels for $Fe_3O_4$@HMN-COF. These results confirm the importance of pH optimization for enhancing the photocatalytic degradation performance of magnetic COFs in environmental remediation.

In another embodiment of the present invention, the effect of temperature on the photocatalytic degradation of imidacloprid is analysed by varying the temperature of the pesticide solution from 20° C. to 40° C. in the presence of 0.01 g of each catalyst. The impact of temperature on the photocatalytic degradation of a 10 mg $L^{-1}$ imidacloprid solution using $Fe_3O_4$@MAN-COF, $Fe_3O_4$@HMN-COF, and $Fe_3O_4$@SIN-COF is explored at various temperatures (20° C., 25° C., 30° C., 35° C., and 40° C.) under optimal conditions. Each sample, containing 0.01 g of catalyst, is stirred for 3 hours, with degradation monitored under both UV light and dark conditions. FIGS. 32A, 32B and 32C illustrate the degradation efficiency of Imidacloprid at various temperatures (20° C. to 40° C.) under light and dark conditions using $Fe_3O_4$@HMN-COF, $Fe_3O_4$@MAN-COF, and $Fe_3O_4$@SIN-COF respectively. All COFs show higher degradation under light conditions, with efficiency generally increasing with temperature. It is also observed that $Fe_3O_4$@HMN-COF demonstrates the highest degradation efficiency, particularly at 30° C. and 35° C.

Detailed analysis shows that for all three COFs, the maximum degradation is consistently observed at 30° C., demonstrating that the degradation efficiency initially increases with rising temperatures. At 30° C., degradation efficiencies peaks at 92% for $Fe_3O_4$@MAN-COF, 96% for $Fe_3O_4$@HMN-COF, and 91% for $Fe_3O_4$@SIN-COF under UV light, while in dark conditions, efficiencies are slightly lower. Beyond 30° C., no further increase in degradation efficiency is observed, confirming a similar temperature-dependent behavior as reported in previous studies. This highlights the importance of maintaining controlled temperature conditions to maximize the photocatalytic degradation capabilities of these COFs for efficient pollutant breakdown.

Another embodiment presented herein involves a kinetic study of photocatalytic degradation. The kinetic study of imidacloprid degradation using $Fe_3O_4$@MAN-COF, $Fe_3O_4$@HMN-COF, and $Fe_3O_4$@SIN-COF is conducted over a period of 20 to 300 minutes, following first-order kinetics as depicted in FIG. 33A-33E. These figures represent the kinetic plots for the degradation of imidacloprid using $Fe_3O_4$-functionalized COFs under light and dark conditions. FIG. 33A shows the kinetic plots without a catalyst in the dark, FIG. 33B shows the kinetic plots without a catalyst in light, FIG. 33C shows the Second-order kinetic plots for $Fe_3O_4$@MAN-COF (light and dark), FIG. 33D shows the Second-order kinetic plots for $Fe_3O_4$@HMN-COF (light and dark), FIG. 33E shows the Second-order kinetic plots for $Fe_3O_4$@SIN-COF (light and dark). The plots show the natural logarithm of the concentration of imidacloprid ($\ln(C/C_0)$) versus time, indicating the rate constants and correlation coefficients ($R^2$) for each condition. The data illustrate the enhanced degradation kinetics under light conditions for all COFs.

Figure 34A:
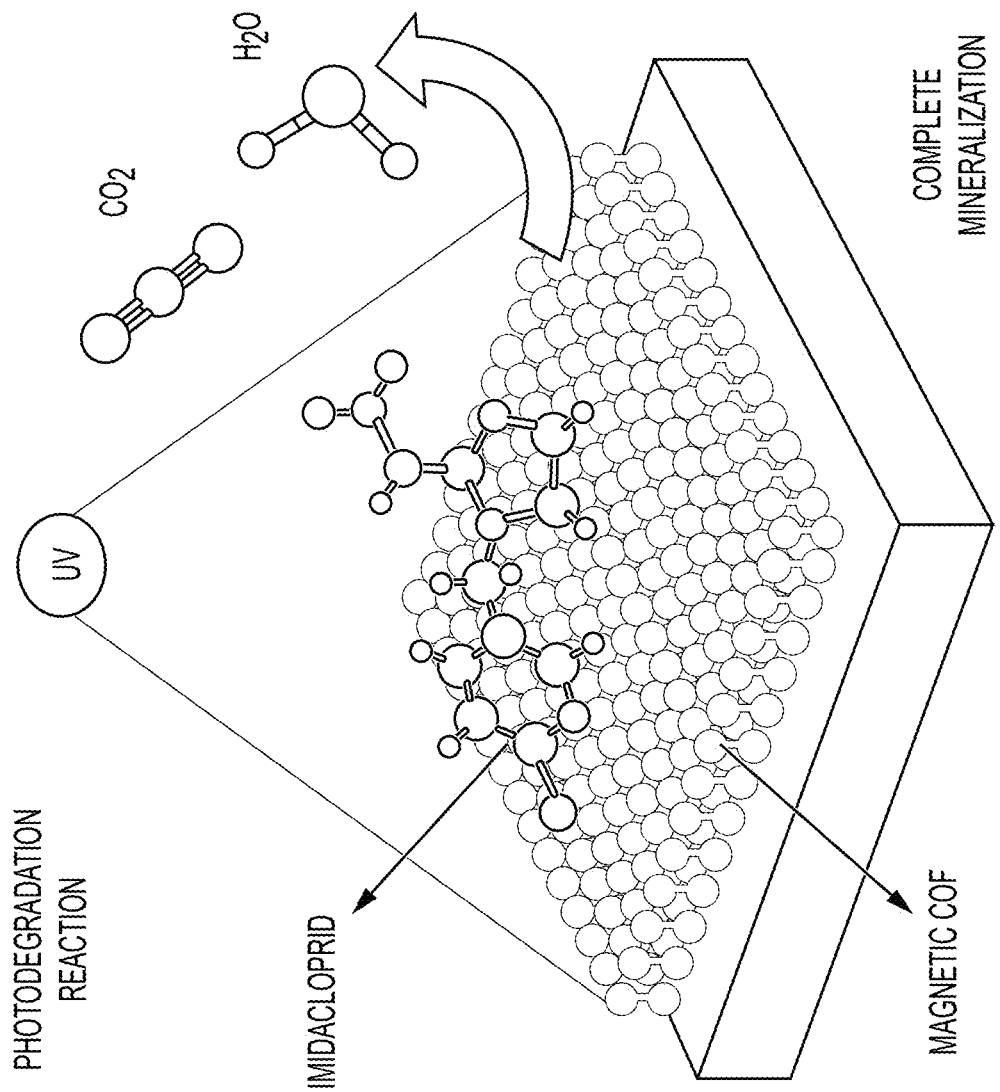
FIG. 34A is a schematic diagram illustrating the photocatalytic degradation of imidacloprid using magnetic COFs, with UV light shining on the catalyst and showing the interaction leading to degradation products.

Without a catalyst, the degradation rate of imidacloprid is 0.036 $h^{-1}$ under dark conditions and 0.046 $h^{-1}$ under UV light, resulting in half-lives of 20 hours and 14 hours, respectively. In the presence of $Fe_3O_4$@MAN-COF, the degradation rate increases to 0.070 $h^{-1}$ in the dark, reducing the half-life to 10 hours. Under UV light, the degradation rate further increases to 0.179 $h^{-1}$, with a significantly reduced half-life of 2 hours. For $Fe_3O_4$@HMN-COF, the degradation rate in the dark is 0.096 $h^{-1}$, corresponding to a half-life of 8 hours, and under UV light, the rate is 0.186 $h^{-1}$, with a half-life of 1.5 hours. $Fe_3O_4$@SIN-COF shows a degradation rate of 0.070 $h^{-1}$ in the dark, reducing the half-life to 10.7 hours, and under UV light, the rate is 0.175 $h^{-1}$, with a half-life of 2.5 hours. The improved performance of these catalysts is consistent with previous studies, which reported a half-life of 4.5 hours for imidacloprid degradation using ZnO and $TiO_2$. In comparison, the magnetic COFs in the present invention demonstrates better degradation efficiency, with a half-life of 2 hours under UV light for $Fe_3O_4$@MAN-COF, 1.5 hours for $Fe_3O_4$@HMN-COF, and 2.5 hours for $Fe_3O_4$@SIN-COF. GC-MS analysis is performed to identify possible degradation products of imidacloprid and to understand its degradation pathway. Notably, no metabolites of imidacloprid are detected, indicating that the magnetic COFs facilitate complete mineralization of the pesticide. The schematic diagram for pesticide degradation in the presence of these COFs is illustrated in FIG. 34A. The figure illustrates the photocatalytic degradation of imidacloprid using magnetic COFs, with UV light shining on the catalyst and showing the interaction leading to degradation products. The $Fe_3O_4$ nanoparticles exhibit a narrow bandgap, which can lead to easy recombination of photo-generated electron-hole pairs. However, the incorporation of COFs improves the bandgap and restricts the electron-hole recombination rate, thereby enhancing charge separation and overall photocatalytic efficiency. These results emphasize the effectiveness of $Fe_3O_4$@MAN-COF, $Fe_3O_4$@HMN-COF, and $Fe_3O_4$@SIN-COF in the photocatalytic degradation of imidacloprid, providing a promising approach for environmental remediation.

Reusability and stability of $Fe_3O_4$@COF composites is analyzed in an embodiment of this disclosure. The reusability of $Fe_3O_4$@MAN-COF, $Fe_3O_4$@HMN-COF, and $Fe_3O_4$@SIN-COF is tested over five successive cycles to evaluate the stability and activity of these magnetic COFs, as shown in FIG. 34B. In the present embodiment, the reusability of the catalysts is evaluated over five consecutive cycles by regenerating the catalysts after each cycle. The stability of the catalysts is also assessed through leaching experiments to ensure minimal loss of active components. Initially, each catalyst achieves maximum degradation efficiencies of 92.3%, 98.5%, and 91.7%, respectively, under optimum conditions. After each cycle, the catalyst is filtered, thoroughly washed, and dried at 100° C. In the second cycle, $Fe_3O_4$@MAN-COF demonstrates a degradation efficiency of 90.1%, while $Fe_3O_4$@HMN-COF and $Fe_3O_4$@SIN-COF shows efficiency of 96.3% and 89.8%, respectively. By the third cycle, degradation efficiencies are 87.4% for $Fe_3O_4$@MAN-COF, 93.0% for $Fe_3O_4$@HMN-COF, and 86.7% for $Fe_3O_4$@SIN-COF. In the fourth cycle, efficiencies are maintained at 84.6%, 90.2%, and 83.5%, respectively. In the fifth and final cycle, the degradation efficiencies remain at 80.9% for $Fe_3O_4$@MAN-COF, 87.5% for $Fe_3O_4$@HMN-COF, and 78.6% for $Fe_3O_4$@SIN-COF. In one of the embodiments, XRD spectra of the catalysts after five cycles is analyzed to reveal their structural stability, as shown in FIG. 35. The said figure represents the XRD patterns of $Fe_3O_4$@HMN-COF, $Fe_3O_4$@SIN-COF, and $Fe_3O_4$@MAN-COF before and after cycling. The comparison illustrates the structural stability of the COFs after repeated adsorption-desorption cycles. The consistent peak positions indicate that the COFs maintain their crystalline structure after cycling. These findings, therefore, indicate that $Fe_3O_4$@MAN-COF, $Fe_3O_4$@HMN-COF, and $Fe_3O_4$@SIN-COF maintain high photocatalytic activity and structural stability over multiple uses, demonstrating their potential for long-term application in environmental remediation.

The present invention demonstrates that magnetic Covalent Organic Frameworks (COFs) functionalized with $Fe_3O_4$ nanoparticles ($Fe_3O_4$@HMN-COF, $Fe_3O_4$@MAN-COF, and $Fe_3O_4$@SIN-COF) are highly efficient adsorbents for removing imidacloprid (IMI) from water. It involves $Fe_3O_4$-functionalized COFs engineered with nitrogen-rich structures and extensive π-electron systems. These COFs exhibit superior adsorption via π-π interactions, hydrophobic interactions, and hydrogen bonding. Among the COFs analysed, $Fe_3O_4$@HMN-COF displays the highest adsorption capacity. Conducting kinetic studies confirms that the adsorption process involves chemisorption, with $Fe_3O_4$@HMN-COF exhibiting an adsorption capacity of 600 mg/g, $Fe_3O_4$@MAN-COF at 480 mg/g for, and $Fe_3O_4$@SIN-COF at 375 mg/g. Thermodynamic analyses indicate that the adsorption process is both spontaneous and endothermic. Reusability tests further demonstrate minimal capacity loss over multiple cycles, confirming their efficiency over extended use. Practical applications in honey and fruit samples also validate the high efficacy of these materials. Moreover, conducting optimized photocatalytic degradation of imidacloprid using these COFs proves highly effective, with $Fe_3O_4$@HMN-COF achieving 98.5% degradation efficiency under optimal conditions. These results emphasize the potential of $Fe_3O_4$-functionalized COFs, particularly $Fe_3O_4$@HMN-COF, as promising solutions for reducing pesticide contamination in water and ensuring environmental sustainability.

The present invention offers numerous advantages, such as rapid magnetic separation, high adsorption capacity, reusability, versatility in different matrices, comprehensive remediation, wide pH range adaptability, high stability and efficiency. Enabling rapid magnetic separation, the magnetic properties of the COFs facilitate swift and efficient separation from water within 5 to 10 seconds using an external magnetic field, significantly reducing treatment time compared to traditional methods. Another advantage is that these COFs exhibit high adsorption capacities, with $Fe_3O_4$@HMN-COF showing a capacity of 600 mg/g, $Fe_3O_4$@MAN-COF at 480 mg/g, and $Fe_3O_4$@SIN-COF at 375 mg/g, which are considerably higher than conventional adsorbents like activated carbon. This ensures more effective removal of imidacloprid (IMI) from contaminated water. Furthermore, the magnetic COFs demonstrate excellent reusability, with minimal capacity loss over multiple adsorption cycles, making them both cost-effective and sustainable by reducing the need for frequent replacements. In addition, these COFs offer versatility across different matrices, having proven their effectiveness not only in water treatment but also in real-world applications such as honey and fruit samples, highlighting their adaptability and applicability to diverse scenarios beyond standard water treatment. Another advantage of these COFs is that the dual functionality of adsorption and photocatalytic degradation provides a comprehensive and robust solution to pesticide remediation, achieving 98.5% degradation efficiency and complete mineralization of IMI under optimal conditions. $Fe_3O_4$@ COFs possess adaptability to a wide pH range. Notably, $Fe_3O_4$@HMN-COF, exhibits excellent performance across a broad pH range, making it suitable for diverse environmental conditions, further enhancing its practical application. Additionally, the COFs are highly stable and efficient, and characterized by high hydrophilicity and large surface areas which contribute to their stable performance and structural integrity over extended periods. This results in the COFs having a significant advantage over less stable materials in similar applications.

The development of magnetic COFs with nitrogen-rich frameworks and specific functionalization is an advanced process, and it involves intricate synthesis. Ongoing optimization, advancements in production methods and economics of scale can effectively reduce costs and streamline the manufacturing process. Research into more cost-effective synthesis routes and materials helps to align with long-term goal of making these materials more accessible and cost-effective without compromising their efficiency. To ensure the consistent performance of magnetic COFs in diverse environments, implementing pre-treatment steps is advisable as they remove organic matter and other fouling agents from water before applying magnetic COFs. This process helps to maintain their efficiency over time and extend their lifespan. Furthermore, research into utilizing visible light or alternative, more readily available light sources for photocatalytic degradation is underway as a futuristic embodiment of the invention, reducing the reliance on UV light and minimizing energy consumption. Developing COFs that utilizes visible light or other more readily available light sources for optimized photocatalytic degradation further enhances the efficiency of the COFs as they reduce the dependency on UV light and lower energy costs. This can broaden the applicability of the technology, making it suitable for a wider range of environments. When it comes to scalability, targeted pilot testing and the development of robust scaling strategies ensure a smooth transition from laboratory settings to industrial-scale production and applications. Collaboration with industry partners can facilitate this transition and enable significant optimization, that overcomes potential scaling challenges and ensures consistent quality and performance at larger scales. Through continuous research and strategic approaches, the full potential of this technology can be realized, offering a highly effective and practical solution for the remediation of pesticide-contaminated water.

The invention of $Fe_3O_4$@COFs invention holds significant market interest across various sectors due to its advanced capabilities in environmental remediation, particularly for the removal of persistent organic pollutants like imidacloprid. Key potential markets include Agriculture and Agro-Industries, Water Treatment and Management Companies, Environmental Agencies and Non-Governmental Organizations (NGOs), Chemical and Material Manufacturing Companies, and Food and Beverage Industry. The agriculture and agro-industries sector represent a key market, including potential customers such as large-scale agricultural operations, agrochemical companies, and agricultural cooperatives. This sector, with a global agrochemical market valued at approximately $224.2 billion in 2020 and projected to grow to $286.2 billion by 2027 at a CAGR of 3.5%, is increasingly focusing on sustainable farming practices and mitigating pesticide impact. $Fe_3O_4$@COFs can play a crucial role in managing pesticide residues in irrigation and runoff water, helping these stakeholders comply with environmental regulations. Water treatment and management companies, including municipal and private water treatment facilities, as well as environmental remediation firms, also constitute a significant market. The global water treatment market, valued at $281.75 billion in 2021 and expected to reach $489.07 billion by 2029 at a CAGR of 7.1%, is actively seeking efficient and cost-effective solutions for contaminant removal. $Fe_3O_4$@COFs offer an innovative approach for eliminating pesticide residues, improving water quality and safety. Government environmental protection agencies and non-governmental organizations (NGOs) and research institutions focused on environmental conservation, are also likely to show strong interest in $Fe_3O_4$@COFs, given their commitment to monitoring and improving environmental health. Governmental and non-governmental entities could deploy this technology in large-scale environmental cleanup projects, and the COFs could provide valuable data for environmental impact studies.

Moreover, chemical and material manufacturing companies include manufacturers of advanced materials, chemical companies specializing in environmental solutions, and companies producing water purification technologies. These companies, on seeing potential for integrating $Fe_3O_4$@COFs into their product lines, may be interested in licensing the technology or collaborating on production and distribution. With the global advanced materials market valued at $61.5 billion in 2020 and projected to reach $81.8 billion by 2025 at a CAGR of 4.3%, $Fe_3O_4$@COFs offer promising integration into product lines focusing on sustainable and innovative environmental solutions. The food and beverage industry also presents a significant market for $Fe_3O_4$@COFs, particularly companies involved in production and processing of food and beverages, that are concerned with pesticide residues in raw materials. With the global food and beverage market valued at $5.9 trillion in 2019 and expected to grow to $7.5 trillion by 2023, ensuring food safety is a critical concern. $Fe_3O_4$@COFs can be utilized to purify water used in food processing, reducing the risk of pesticide contamination in final products, thus appealing to a broad range of stakeholders in this sector. According to the quantification and sources, the global agrochemical market is valued at approximately $224.2 billion in 2020 and is projected to reach $286.2 billion by 2027, growing at a compound annual growth rate (CAGR) of 3.5% from 2020 to 2027. Similarly, the global water treatment market, valued at $281.75 billion in 2021, is expected to grow significantly, reaching $489.07 billion by 2029, with a CAGR of 7.1%. The advanced materials market is estimated at USD 61.35 billion in 2022 and is projected to reach USD 112.7 billion by 2032, reflecting a CAGR of 6.27% from 2023 to 2032. Meanwhile, the food and beverage market, valued at $5.9 trillion in 2019, is anticipated to expand to $7.5 trillion by 2023, demonstrating the significant potential for growth and demand across these sectors.

Amid growing concerns over pesticide contamination, a new solution has been developed to address this critical environmental issue. The newly developed technology utilizes magnetic covalent organic frameworks (COFs) to efficiently remove the persistent pesticide imidacloprid (IMI) from water sources. This technology employs a dual-action mechanism of adsorption and photocatalytic degradation. These advanced materials not only offer rapid and effective separation and high adsorption capacity but also leverage light to break down harmful pesticide residues, further ensuring thorough decontamination. With versatility across diverse applications, this technology significantly improves water quality, promotes safer agricultural practices and reduces the environmental footprint of pesticide use. The scalability, cost-effectiveness, and adaptability of this innovative approach make it an invaluable resource for water treatment facilities, agricultural sectors, environmental remediation firms, municipal water authorities, and the food and beverage industry. The proposed invention grounded in sustainability and public health, underscores its potential to create a cleaner and safer environment for future generations.

This patent application discloses a series of hydrophilic magnetic covalent organic frameworks (COFs) for efficient adsorption and photocatalytic degradation of imidacloprid (IMI), a widely used neonicotinoid insecticide, from water and other matrices. The invention provides a novel and comprehensive solution for environmental remediation of IMI-contaminated water, which poses serious threats to biodiversity, ecosystem services, and human health. The invention also offers advantages over existing methods of water treatment, such as high adsorption capacity, rapid magnetic separation, reusability, versatility, and adaptability.

The invention relates to the field of water treatment and management, specifically to the removal and degradation of organic pollutants using magnetic COFs as adsorbents and photocatalysts. The invention addresses the problem of IMI pollution, which is a persistent and toxic compound that can accumulate in soil, water, plants, and animals, and cause adverse effects on the nervous system, reproduction, and development of various organisms. The invention also overcomes the limitations of conventional methods of water treatment, such as activated carbon, ion exchange, and membrane filtration, which are often costly, inefficient, or generate secondary waste. The invention discloses a series of magnetic COFs functionalized with $Fe_3O_4$ nanoparticles, namely $Fe_3O_4$@HMN-COF, $Fe_3O_4$@MAN-COF, and $Fe_3O_4$@SIN-COF, which are synthesized by a solvothermal method using different nitrogen-rich building blocks. The magnetic COFs have a porous and crystalline structure that enhances the adsorption capacity of IMI through various interactions, such as π-π stacking, hydrophobic interactions, and hydrogen bonding. The magnetic COFs also have a hydrophilic surface that facilitates the dispersion and stability of the COFs in water. The magnetic COFs can be easily separated from water by applying an external magnetic field, which reduces the operation time and energy consumption. The magnetic COFs can also act as photocatalysts under UV light, which can degrade IMI into harmless products, such as $CO_2$, $NH_3$, and $NO_3$. The magnetic COFs can be reused for multiple cycles with minimal capacity loss, which indicates their cost-effectiveness and sustainability. The magnetic COFs can also be applied to different matrices, such as honey and fruit, which demonstrate their versatility and practicality. The magnetic COFs can also work across a wide pH range, which makes them suitable for various water conditions.

The invention is supported by experimental data and results, which show the synthesis, characterization, adsorption studies, photocatalytic degradation, reusability, stability, and practical applications of the magnetic COFs. The invention has a potential market interest across various sectors, such as agriculture and agro-industries, water treatment and management companies, environmental agencies and NGOs, chemical and material manufacturing companies, and the food and beverage industry. The invention can provide a scalable, cost-effective, and adaptable technology for the remediation of IMI-contaminated water and other matrices, which can benefit the environment and human health.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims, which follow.

The invention claimed is:

1. A magnetic covalent organic framework (COF) composition comprising:
a covalent organic framework (COF) functionalized with $Fe_3O_4$ nanoparticles, selected from the group consisting of $Fe_3O_4$@HMN-COF, $Fe_3O_4$@MAN-COF, and $Fe_3O_4$@SIN-COF, wherein HMN-COF, MAN-COF and SIN-COF are:

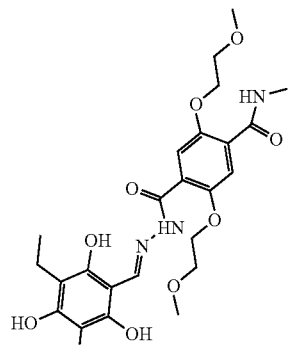

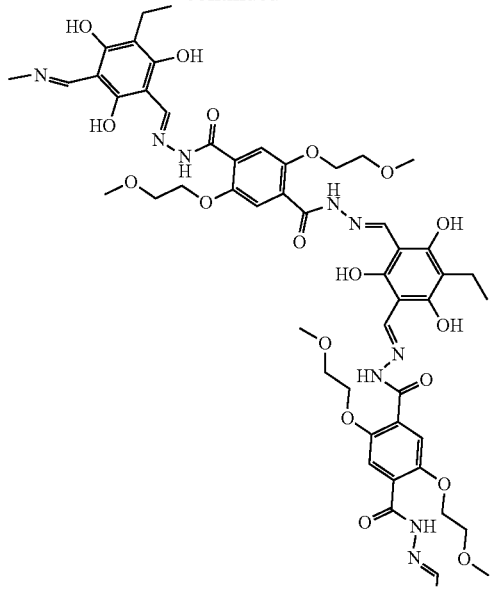

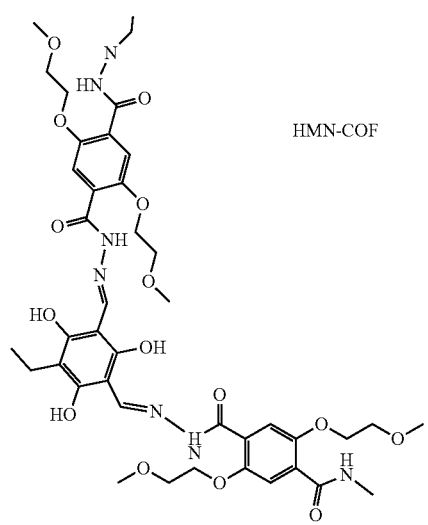

HMN-COF

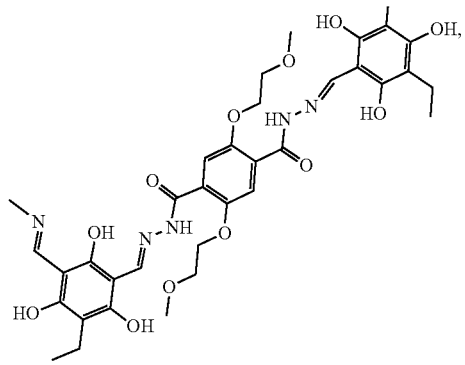

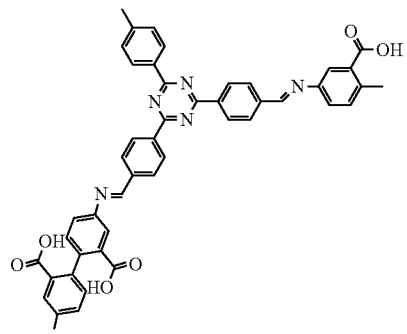

-continued

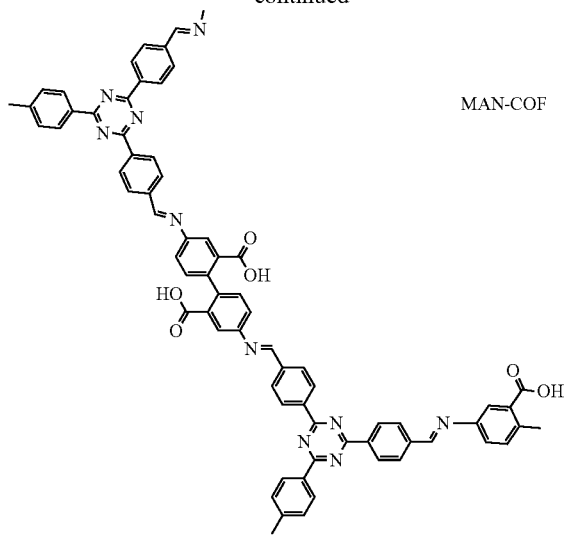

MAN-COF

-continued

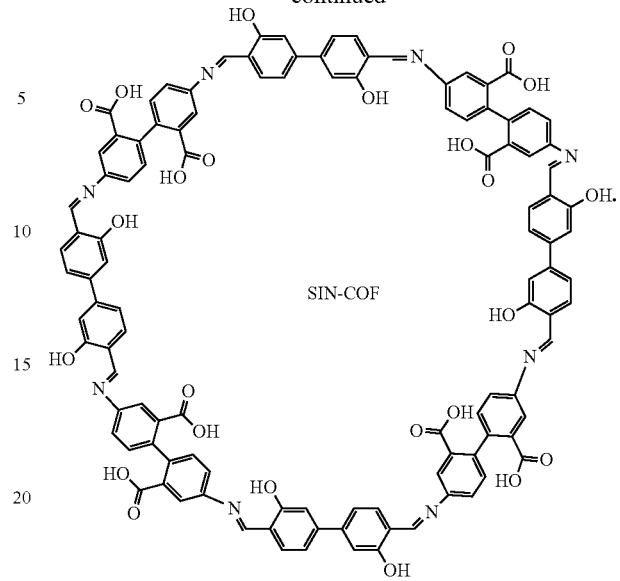

SIN-COF

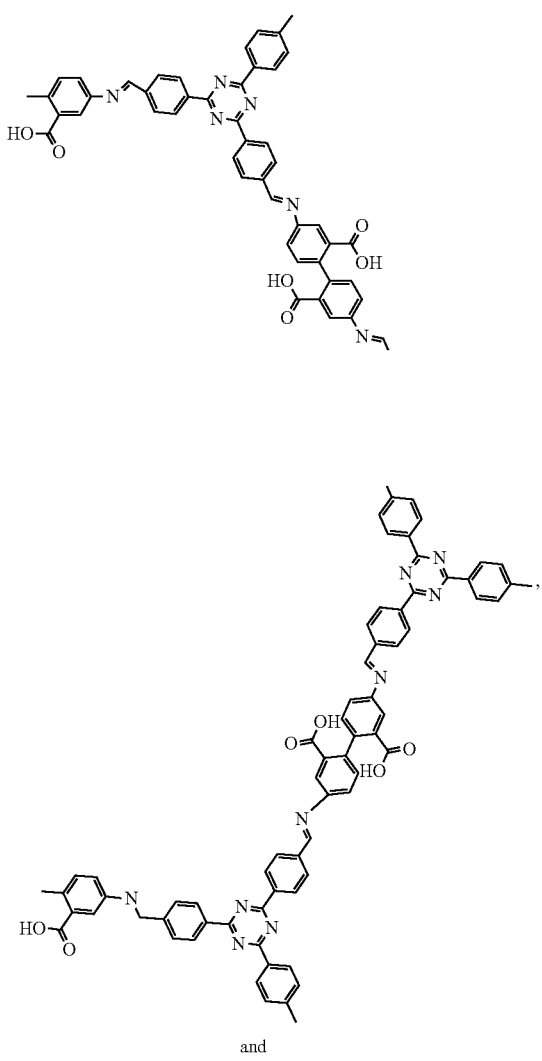

and

2. The magnetic COF composition of claim 1, wherein the magnetic COF exhibits a high surface area, with a BET surface area of 910 m$^2$/g for Fe$_3$O$_4$@HMN-COF, 840 m$^2$/g for Fe$_3$O$_4$@MAN-COF, and 670 m$^2$/g for Fe$_3$O$_4$@SIN-COF.

3. The magnetic COF composition of claim 1, wherein the pH is in the range between pH 5 and pH 7.

4. The magnetic COF composition of claim 1, wherein the magnetic COF maintains structural integrity up to 400° C. in nitrogen and in various solvents including boiling water, ethanol, N,N-dimethylformamide, dimethyl sulfoxide, 3 M HCl, and 3 M NaOH.

5. A method for removal and degradation of imidacloprid (IMI) from an aqueous solution, the method comprising:
obtaining a magnetic covalent organic framework (COF) composition according to claim 1;
adsorbing the IMI onto the magnetic COF;
employing magnetic separation using an external magnetic field to isolate the magnetic COF along with the adsorbed IMI from the aqueous solution; and
subjecting the adsorbed IMI to photocatalytic degradation under light irradiation,
wherein the IMI is adsorbed via π-π interactions, hydrophobic interactions, and hydrogen bonding, facilitated by the magnetic COF's nitrogen-rich framework and π-electron system, and
wherein the magnetic separation is enabled by the Fe$_3$O$_4$ nanoparticles providing magnetic properties to the COF.

6. The method of claim 5, wherein the adsorption kinetics follow a pseudo-second-order model, indicating chemisorption as dominant adsorption mechanism.

7. The method of claim 5, wherein the magnetic COF achieves an adsorption capacity of at least 600 mg/g for Fe$_3$O$_4$@HMN-COF, 480 mg/g for Fe$_3$O$_4$@MAN-COF, or 375 mg/g for Fe$_3$O$_4$@SIN-COF and exhibits a BET surface area of 910 m$^2$/g for Fe$_3$O$_4$@HMN-COF, 840 m$^2$/g for Fe$_3$O$_4$@MAN-COF, and 670 m$^2$/g for Fe$_3$O$_4$@SIN-COF.

8. The method of claim 5, wherein Fe$_3$O$_4$@HMN-COF achieves a photocatalytic degradation efficiency of 98.5% comprising a catalyst dose of 0.01 g, a pH of 11, and a temperature of 30° C. under UV light.

9. Use of a magnetic covalent organic framework (COF) composition according to claim 1, for the removal and degradation of imidacloprid (IMI) from an aqueous solution.

10. The magnetic COF composition of claim 1, wherein the covalent organic framework (COF) functionalized with $Fe_3O_4$ nanoparticles is $Fe_3O_4$@HMN-COF.

11. The magnetic COF composition of claim 1, wherein the covalent organic framework (COF) functionalized with $Fe_3O_4$ nanoparticles is $Fe_3O_4$@MAN-COF.

12. The magnetic COF composition of claim 1, wherein the covalent organic framework (COF) functionalized with $Fe_3O_4$ nanoparticles is $Fe_3O_4$@SIN-COF.

13. A method of synthesizing a magnetic covalent organic framework (COF) composition according to claim 1, comprising:

obtaining a COF selected from the group consisting of HMN-COF, MAN-COF, and SIN-COF; and functionalizing the COF with at least two $Fe_3O_4$ nanoparticles.

14. The method according to claim 13, wherein the COF is synthesized through Schiff base reactions and solvothermal techniques.

\* \* \* \* \*